United States Patent
Farmer et al.

(10) Patent No.: US 6,856,694 B2
(45) Date of Patent: Feb. 15, 2005

(54) DECISION ENHANCEMENT SYSTEM FOR A VEHICLE SAFETY RESTRAINT APPLICATION

(75) Inventors: Michael E. Farmer, West Bloomfield, MI (US); Mark L. Dell' Eva, Grand Blanc, MI (US); Christopher N. St. John, Northville, MI (US); Galen E. Ressler, White Lake, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/703,957

(22) Filed: Nov. 7, 2003

(65) Prior Publication Data

US 2004/0151344 A1 Aug. 5, 2004

Related U.S. Application Data

(63) Continuation-in-part of application No. 10/663,521, filed on Sep. 16, 2003, and a continuation-in-part of application No. 10/625,208, filed on Jul. 23, 2003, and a continuation-in-part of application No. 10/619,035, filed on Jul. 14, 2003, and a continuation-in-part of application No. 10/457,625, filed on Jun. 9, 2003, and a continuation-in-part of application No. 10/375,946, filed on Feb. 28, 2003, and a continuation-in-part of application No. 10/269,237, filed on Oct. 11, 2002, and a continuation-in-part of application No. 10/269,308, filed on Oct. 11, 2002, and a continuation-in-part of application No. 10/269,357, filed on Oct. 11, 2002, and a continuation-in-part of application No. 10/052,152, filed on Jan. 17, 2002, now Pat. No. 6,662,093, and a continuation-in-part of application No. 10/023,787, filed on Dec. 17, 2001, and a continuation-in-part of application No. 10/006,564, filed on Nov. 5, 2001, now Pat. No. 6,577,936, and a continuation-in-part of application No. 09/901,805, filed on Jul. 10, 2001.

(51) Int. Cl.[7] .............................................. G06K 9/00
(52) U.S. Cl. .................................................. 382/107
(58) Field of Search ................................ 382/107, 291; 352/39; 307/10.1; 701/36, 45, 49; 280/728.1; 348/94, 169, 143, 154, 155; 700/13, 56, 64, 66; 340/686.1, 815.58; 356/614; 731/1.79

(56) References Cited

U.S. PATENT DOCUMENTS

| | | | |
|---|---|---|---|
| 4,179,696 A | 12/1979 | Quesinberry et al. | 342/75 |
| 4,625,329 A | 11/1986 | Ishikawa et al. | 382/104 |
| 4,985,835 A | 1/1991 | Sterler et al. | 701/46 |

(List continued on next page.)

FOREIGN PATENT DOCUMENTS

| | | | |
|---|---|---|---|
| GB | 2 236 419 A | 4/1991 | G08B/21/00 |
| JP | 61-66905 | 4/1986 | G01B/11/00 |
| JP | 61-66906 | 4/1986 | G01B/11/00 |
| WO | WO 02/30717 | 4/2002 | B60R/21/01 |

OTHER PUBLICATIONS

Greg Welch and Gary Bishop, "An Introduction to the Kalman Filter," Sep. 4, 1997.
"GPS–Based Vehicle Tracking" by Jeffrey Pusan from www.securitydriver.com/aic/stories/article–97.com.

*Primary Examiner*—Andrew W. Johns
*Assistant Examiner*—Shervin Nakhjavan
(74) *Attorney, Agent, or Firm*—Rader, Fishman & Grauer PLLC

(57) ABSTRACT

The disclosure describes systems and methods that pertain to interactions between a vehicle and an occupant within the vehicle. More specifically, various systems and methods for enhancing the decisions of automated vehicle applications (collectively "decision enhancement system") are disclosed. In a safety restraint embodiment, a sensor is used to capture various sensor readings. Sensor readings are typically in the form of images. Occupant information, such as location attributes, motion attributes, and occupant category attributes can be obtained from the sensor readings. If the system concludes that the deployment of a safety restraint is potentially justified, an at-risk-zone detector can be used to determine whether or not the occupant will be too close to the deploying safety restraint at the time of deployment for the safety restraint to be safely deployed.

28 Claims, 29 Drawing Sheets

U.S. PATENT DOCUMENTS

| | | | |
|---|---|---|---|
| 5,051,751 A | 9/1991 | Gray | 342/107 |
| 5,074,583 A | 12/1991 | Fujita et al. | 280/730.1 |
| 5,229,943 A | 7/1993 | Eigler et al. | 701/46 |
| 5,256,904 A | 10/1993 | Tohbaru | 307/18.1 |
| 5,257,336 A | 10/1993 | Dautartas | 385/193 |
| 5,298,988 A | 3/1994 | Everett et al. | 348/87 |
| 5,366,241 A | 11/1994 | Kithil | 280/735 |
| 5,398,185 A | 3/1995 | Omura | 701/45 |
| 5,413,378 A | 5/1995 | Steffens, Jr. et al. | 280/735 |
| 5,446,661 A | 8/1995 | Gioutsos et al. | 701/45 |
| 5,490,069 A | 2/1996 | Gioutsos et al. | 701/45 |
| 5,528,698 A | 6/1996 | Kamei et al. | 382/100 |
| 5,537,204 A | 7/1996 | Woodhouse | 356/243.1 |
| 5,890,085 A | 3/1999 | Corrado et al. | 701/47 |
| 5,983,147 A | 11/1999 | Krumm | 701/45 |
| 6,005,958 A | 12/1999 | Farmer et al. | 382/103 |
| 6,018,693 A | 1/2000 | Blackburn et al. | 701/45 |
| 6,026,340 A | 2/2000 | Corrado et al. | 701/47 |
| 6,043,877 A | 3/2000 | Land | 356/243.1 |
| 6,055,055 A | 4/2000 | Toh | 356/609 |
| 6,116,640 A | 9/2000 | Tanaka et al. | 280/735 |
| 6,198,998 B1 | 3/2001 | Farmer et al. | 701/45 |
| 6,272,411 B1 | 8/2001 | Corrado et al. | 701/45 |
| 6,292,727 B1 * | 9/2001 | Norton | 701/45 |
| 6,431,592 B2 * | 8/2002 | Seip | 280/735 |
| 6,459,974 B1 | 10/2002 | Baloch et al. | 701/45 |
| 6,493,620 B2 * | 12/2002 | Zhang | 701/45 |
| 6,577,936 B2 | 6/2003 | Farmer | 701/45 |
| 6,662,093 B2 | 12/2003 | Farmer | 701/45 |
| 6,678,058 B2 | 1/2004 | Baldwin et al. | 382/103 |
| 6,757,009 B1 * | 6/2004 | Simon et al. | 348/148 |
| 6,766,036 B1 * | 7/2004 | Pryor | 382/103 |
| 2003/0016845 A1 | 1/2003 | Farmer | 382/103 |
| 2003/0031345 A1 | 2/2003 | Farmer | 382/103 |
| 2003/0123704 A1 | 7/2003 | Farmer et al. | 382/103 |
| 2003/0133595 A1 | 7/2003 | Farmer et al. | 702/150 |
| 2003/0135346 A1 | 7/2003 | Farmer et al. | 702/130 |
| 2003/0234519 A1 | 12/2003 | Farmer | 280/728.1 |

* cited by examiner

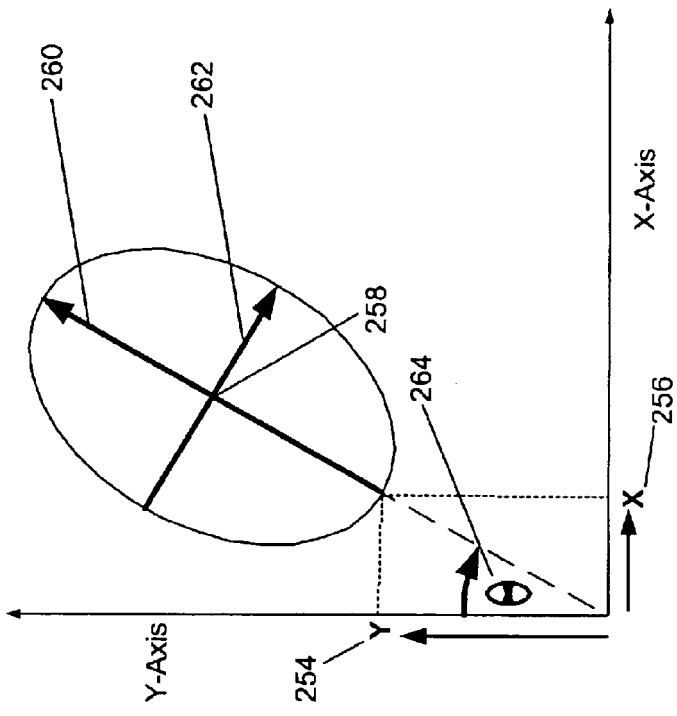
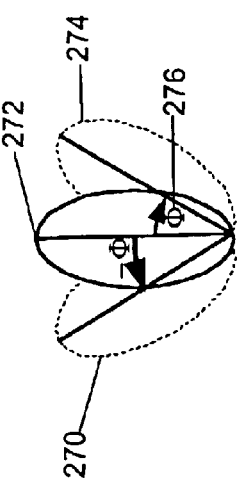
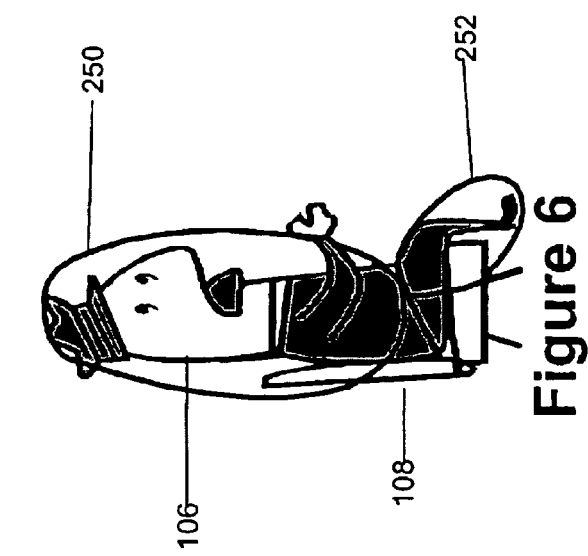

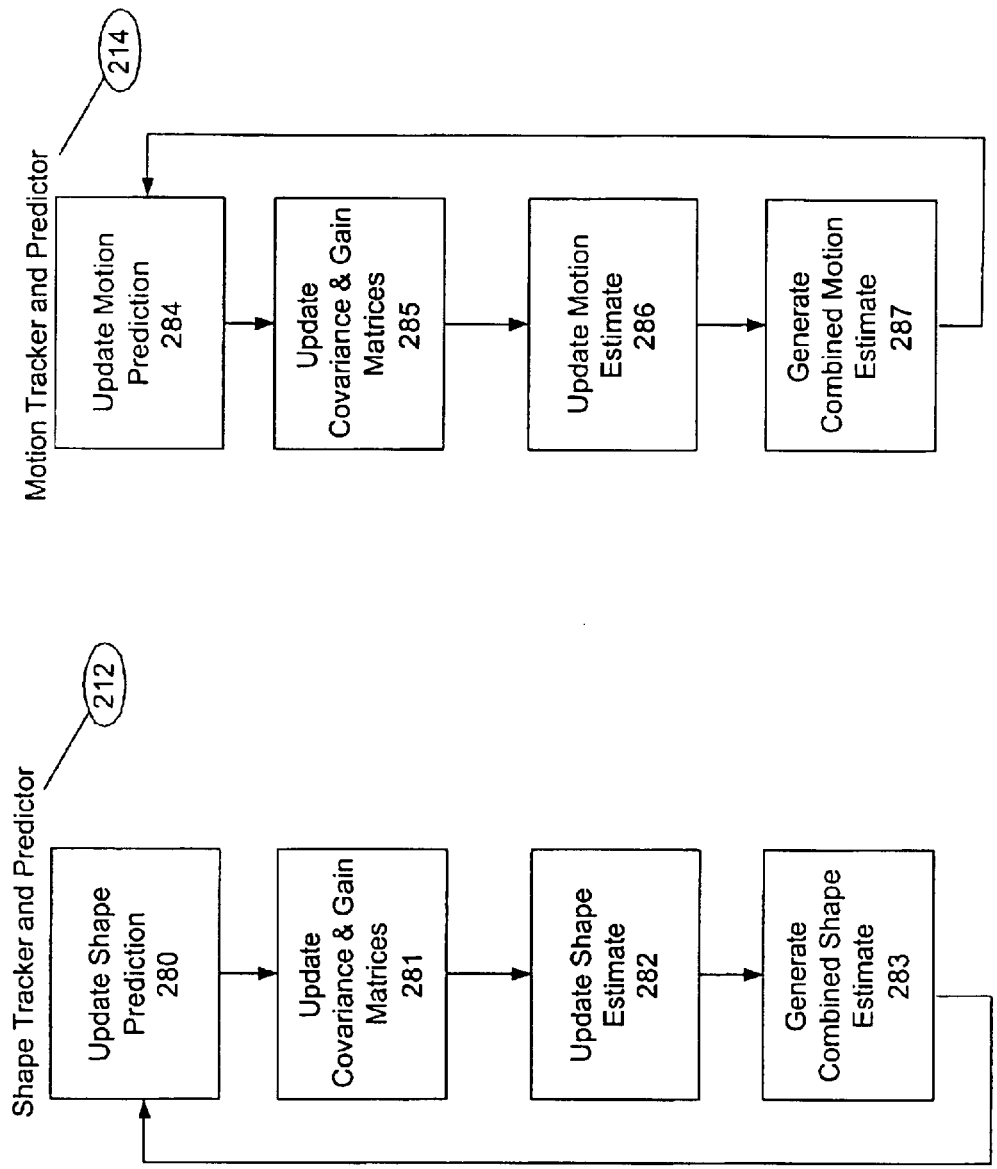

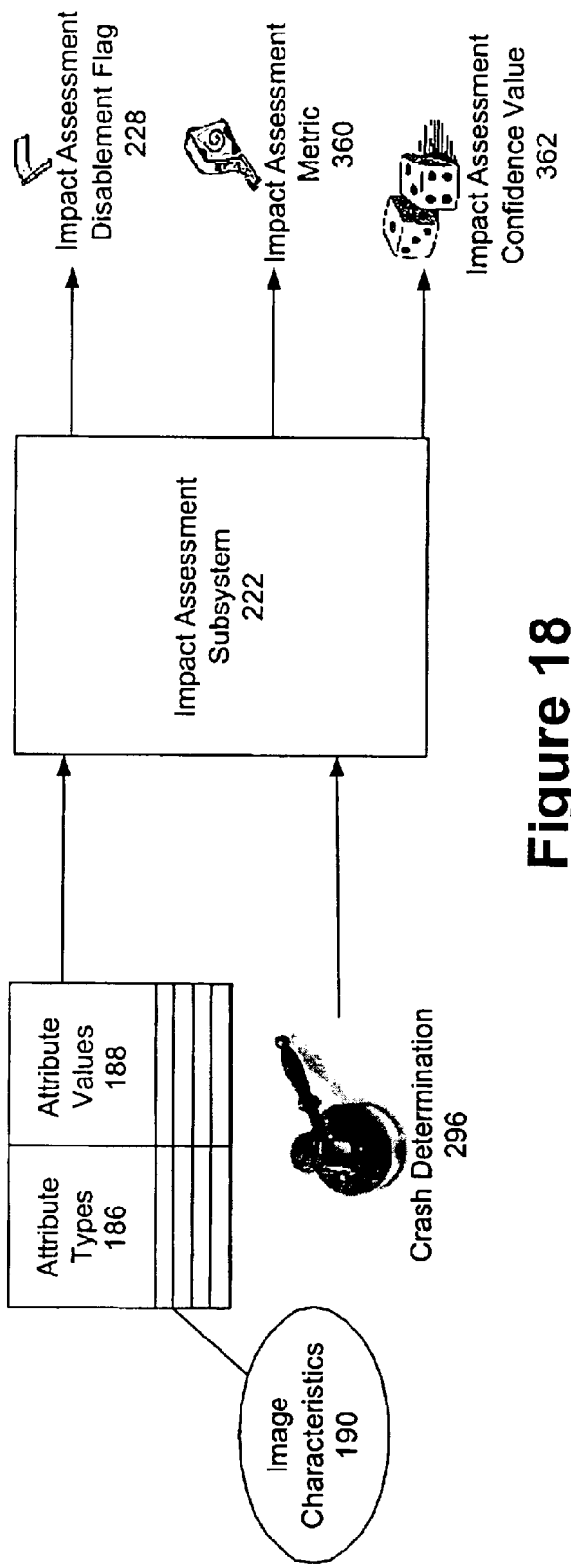

DECISION ENHANCEMENT SYSTEM FOR A VEHICLE SAFETY RESTRAINT APPLICATION

RELATED APPLICATIONS

This application is continuation in part of application Ser. No. 09/901,80 filed on Jul. 10, 2001; and is continuation in part of application Ser. No. 10/006,564 filed on Nov. 5, 2001 now U.S. Pat. No. 6,577,936; and is continuation in part of application Ser. No. 10/023,787 filed on Dec. 17, 2001; and is continuation in part of application Ser. No. 10/052,152 filed on Jan. 17, 2002 now U.S. Pat. No. 6,662,093; and is continuation in part of application Ser. No. 10/269,237 filed on Oct. 11, 2002; and is continuation in part of application Ser. No. 10/269,308 filed on Oct. 11, 2002; and is continuation in part of application Ser. No. 10/269,357; and is continuation in part of application Ser. No. 10/375,946 filed on Feb. 28, 2003; and is continuation in part of application Ser. No. 10/457,625, filed on Jun. 9, 2003; and is continuation in part of application Ser. No. 10/619,035 filed on Jul. 14, 2003; and is continuation in part of application Ser. No. 10/625,208 filed on Jul. 23, 2003; and is continuation in part of application Ser. No. 10/663,521 filed on Sep. 16, 2003; which are all incorporated by reference in their entirety.

BACKGROUND OF THE INVENTION

The invention relates generally to systems and methods that pertain to interactions between a vehicle and an occupant within the vehicle. More specifically, the invention is a system or method for enhancing the decisions (collectively "decision enhancement system") made by automated vehicle applications, such as safety restraint applications.

Automobiles and other vehicles are increasingly utilizing a variety of automated technologies that involve a wide variety of different vehicle functions and provide vehicle occupants with a diverse range of benefits. Some of those functions are more central to the function of the vehicle, as a vehicle, than other more ancillary functions. For example, certain applications may assist vehicle drivers to "parallel-park" the vehicle. Other automated applications focus on occupant safety. Safety restraint applications are one category of occupant safety applications. Airbag deployment mechanisms are a common example of a safety restraint application in a vehicle. Automated vehicle applications can also include more discretionary functions such as navigation assistance, and environmental controls, and even purely recreational options such as DVD players, Internet access, and satellite radio. Automated devices are an integral and useful part of modern vehicles. However, the automated devices embedded into vehicles need to do a better job of taking into account the context of the particular vehicle, and the person(s) or occupant(s) involved in using the particular vehicular user. In particular, such devices typically fail to fully address the interactions between the occupants within the vehicle and the internal environment of the vehicle. It would be desirable for automated applications within vehicles to apply more occupant-centric and context-based "intelligence" to enhance the functionality of automated applications within the vehicle.

One example of such omissions is in the field of safety restraint applications, such as airbag deployment mechanisms. Airbags provide a significant safety benefit for vehicle occupants in many different contexts. However, the deployment decisions made by such airbag deployment mechanisms could be enhanced if additional "intelligence" were applied to the process. For example, in several contexts, the deployment of the airbag is not desirable. The seat corresponding to the deploying airbag might be empty, rendering the deployment of the airbag an unnecessary hassle and expense. With respect to certain types of occupants, such as small children or infants, deployment of the airbag may be undesirable in most circumstances. Deployment of the airbag can also be undesirable if the occupant is too close to the deploying airbag, e.g. within an at-risk-zone. Thus, even with the context of a particular occupant, deployment of the airbag is desirable in some contexts (e.g. when the occupant is not within the at-risk-zone) while not desirable in other contexts (e.g. when the occupant is within the at-risk-zone). Automated vehicle applications such as safety restraint applications can benefit from "enhanced" decision-making that applies various forms of "intelligence."

With respect to safety restraint applications, such as airbag deployment mechanisms, it is useful for automated applications to obtain information about vehicle occupants. With respect to airbag deployment mechanisms, the existing art typically relies on "weight-based" approaches that utilize devices such as accelerometers which can often be fooled by sudden movements by the occupant. Vehicle crashes and other traumatic events, the type of events for which safety applications are most needed, are precisely the type of context most likely to result in inaccurate conclusions by the automated system. Other existing deployment mechanisms rely on various "beam-based" approaches to identify the location of an occupant. While "beam-based" approaches do not suffer from all of the weaknesses of "weight-based" approaches, "beam-based" approaches fail to distinguish between the outer extremities of the occupant, such as a flailing hand or stretched out leg, and the upper torso of the occupant. Moreover, "beam-based" approaches are not able to distinguish between or categorize different types of occupants, such as adults versus infants in baby chairs versus empty seats, etc. It may be desirable for vehicle safety applications (and other applications that would benefit from obtaining occupant information) to obtain both location information (including by derivation, velocity and acceleration) about the occupant as well as information relating to the characteristics of the occupant that are independent of location and motion, such as the "type" of occupant, the estimated mass of the occupant, etc. It may be desirable for decision enhancement systems in vehicles to utilize an image of the occupant in obtaining contextual information about the occupant and the environment surrounding the occupant. Although the existing art does not teach or even suggest an "image-based" approach to safety restraint applications, an "image-based" approach can provide both location information as well as occupant categorization information.

Image processing can provide increasingly useful possibilities for enhancing the decision-making functionality or "intelligence" of automated applications in vehicles and other applications. The cost of image-based sensors including digitally based image-based sensors continues to drop. At the same time, their capabilities continue to increase. Unfortunately, the process of automatically interpreting images and otherwise harvesting images for information has not kept pace with developments in the sensor technology. Unlike the human mind, which is particularly adept at making accurate conclusions about a particular image, automated applications typically have a much harder time to correctly utilize the context of an image in accurately interpreting the characteristics of the image. For example, even a small child will understand that person pulling a sweater over their head is still a person. The fact that a face and head are temporarily not visible will not cause a human being to misinterpret the image. In contrast, an automated device looking for a face or head will likely conclude in that same context that no person is present. It would be desirable for decision enhancement systems to apply meaningful contextual information to the interpretation of images and other forms of sensor readings. One way to apply a meaningful context for image processing is to integrate past images and potentially other sensor readings into the process that evaluates the current or most recent sensor readings. Past determinations, including past determinations associated with probability values or some other form of confidence values can also be integrated into the decision making process. The use of Kalman filters can provide one potential means by which the past can be utilized to evaluate the present.

Another obstacle to effective information gathering from images and other forms of sensor readings is the challenge of segmenting the focus of the inquiry (e.g. the "segmented image" of the occupant) from the area in the image that surrounds the occupant (e.g. the "ambient image"). Automated applications are not particularly effective at determining whether a particular pixel in an image is that of the occupant, the vehicle interior, or representative of something outside the vehicle that is visible through a window in the vehicle. It can be desirable for a decision enhancement system to apply different segmentation heuristics depending on different lighting conditions and other environmental and contextual attributes. It may also be desirable for a decision enhancement to utilize template or reference images of the vehicle without the occupant so that the system can compare ambient images that include the occupant with ambient images that do not include the occupant.

The varieties of occupant behavior and vehicle conditions can be voluminous, and each situation is in many respects unique. Such a divergent universe of situations and contexts can overwhelm vehicle applications and other automated devices. It would be a desirable approach to define various conditions, modes, or states that relate to information that is relevant to the particular context. For example, with respect to safety restraint applications, the occupant within the vehicle can be considered to be in a state of being at rest, in a state of normal human movement, or in a state of experiencing pre-crash breaking. It can be desirable for the decision enhancement system to associate a probability with each of the predefined conditions in making decisions or applying intelligence to a particular situation. For example, in the context of a deploying airbag, it can be desirable for the decision enhancement system to calculate probabilities that the occupant is in a state of pre-crash breaking, is asleep, or is riding normally in the vehicle.

Various cost-benefit tradeoffs preclude effective decision enhancement systems in vehicles. For example, standard video cameras do not typically capture images quickly enough for existing safety restraint applications to make timely deployment decisions. Conversely, specialized digital cameras can be too expensive to be implemented in various vehicles for such limited purposes. It would be desirable for the heuristics and other processing applied by the decision enhancement system to generate timely "intelligence" from images captured from standard video cameras. This can be accomplished by focusing on certain aspects of the image, as well as by generating future predictions based on past and present data. An approach that attempts to integrate general image processing techniques with context specific vehicle information can succeed where general image processing techniques would otherwise fail.

The solutions to the limitations discussed above and other limitations relating to automated vehicle applications are not adequately addressed in the existing art. Moreover, the existing art does not suggest solutions to the above referenced obstacles to decision enhancements. The "general purpose" nature of image processing tools and the "general purpose" goals of the persons developing those tools affirmatively teach away from the highly context-specific processing needed to effectively enhance the decision-making of automated vehicle safety restraint applications.

SUMMARY OF INVENTION

The invention relates generally to systems and methods that pertain to interactions between a vehicle and an occupant within the vehicle. More specifically, the invention is a system or method for enhancing the decisions (collectively "decision enhancement system") made by automated vehicle applications, such as safety restraint applications.

The decision enhancement system can obtain information from sensor readings such as video camera images that can assist safety restraint applications make better decisions. For example, the decision enhancement system can determine whether or not a vehicle occupant will be too close (e.g. within the at-risk-zone) to a deploying airbag such that it would be better for the airbag not to deploy.

A sensor subsystem can be used to capture various sensor readings for the system. A tracking subsystem can utilize those sensor readings to track and predict occupant characteristics that are relevant to determining whether the vehicle is in a condition of crashing, pre-crash braking, or some similar condition generally indicative of potentially requiring deployment of the safety restraint. Upon the determination that a deployment might be merited by the circumstances, a detection subsystem can be invoked to determine whether or not the occupant is within the at-risk-zone such that the deployment of the safety restraint mechanism should be impeded or precluded based on the occupants current or even anticipated proximity to the safety restraint application.

The present invention will be more fully understood upon reading the following detailed description in conjunction with the accompanying drawings.

BRIEF DESCRIPTION OF THE DRAWINGS

FIG. 6 is diagram of illustrating an example of the results generated by an ellipse-fitting heuristic.

FIG. 7 is a diagram illustrating an example of occupant tracking attributes that can be tracked and predicted from the ellipse generated using the ellipse-fitting heuristic.

FIG. 8 is a diagram illustrating an example of an occupant tilt angle that can be derived to generate a "three-dimensional view" from a two-dimensional image.

FIG. 9 is a flow chart illustrating an example of the processing that can be performed by a shape tracker and predictor module.

FIG. 10 is a flow chart illustrating an example of the processing that can be performed by a motion tracker and predictor module.

FIG. 18 is an input-output diagram illustrating an example of the types of inputs and outputs that relate to an impact assessment subsystem.

FIGS. 19a, 19b, and 19c are examples of reference tables utilized by an impact assessment subsystem to generate an impact metric by including values representing the width, volume, or mass of the occupant.

DETAILED DESCRIPTION

The invention relates generally to systems and methods that pertain to interactions between a vehicle and an occupant within the vehicle. More specifically, the invention is a system or method for enhancing the decisions (collectively "decision enhancement system") made by automated vehicle applications, such as safety restraint applications. Automated vehicle systems can utilize information to make better decisions, benefiting vehicle occupants and their vehicles.

I. Introduction of Elements

A. Environmental View for a Decision Enhancement System

Figure 1:
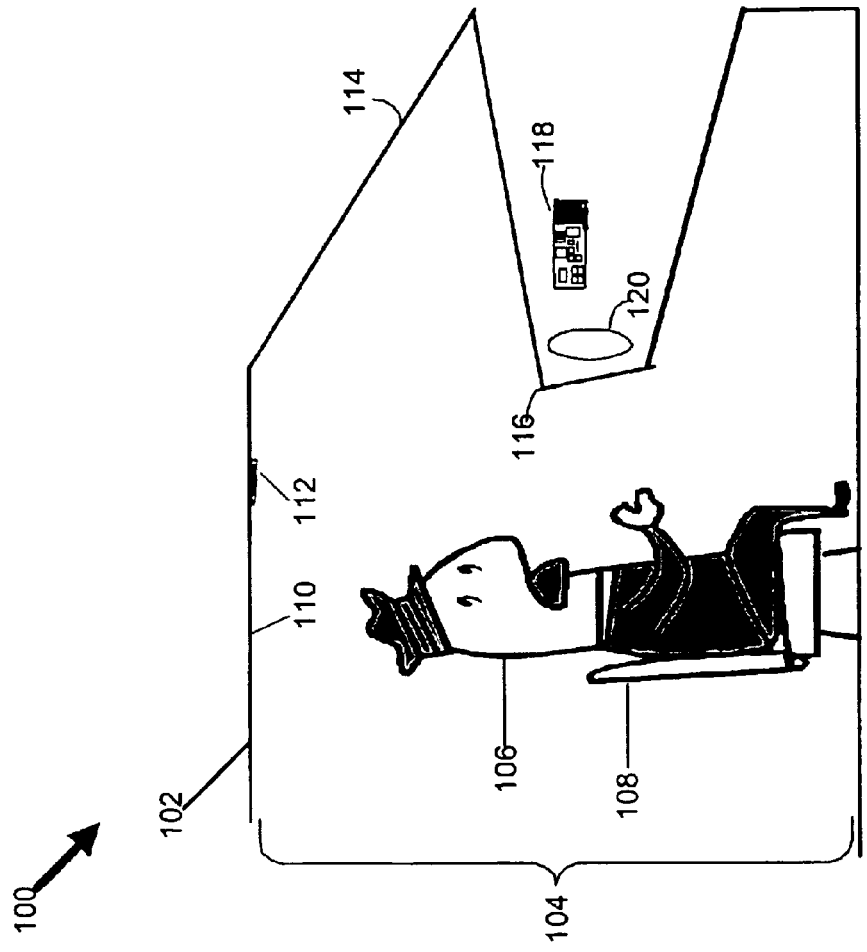
FIG. 1 is an environmental diagram illustrating one embodiment of a decision enhancement system being use within the interior of a vehicle.

FIG. 1 is an environmental diagram illustrating one embodiment of a decision enhancement system (the "system") 100 being use within the interior of a vehicle 102. Different embodiments of the system 100 can involve a wide variety of different types of vehicles 102. In a preferred embodiment, the vehicle 102 is an automobile and the automated application being enhanced by the intelligence of the system 100 is a safety restraint application such as an airbag deployment mechanism. The focus of a safety restraint embodiment of the system 100 is a vehicle interior area 104 in which an occupant 106 may occupy.

If an occupant 106 is present, the occupant 106 sits on a seat 108. In a preferred embodiment, a decision enhancement device ("enhancement device" or simply the "device") 112 is located within the roof liner 110 of the vehicle 102, above the occupant 106 and in a position closer to a front windshield 114 than the occupant 106. The location of the decision enhancement device 112 can vary widely from embodiment to embodiment of the system 100. In many embodiments, there will be two or more enhancement devices 112. Examples of different decision enhancement device 112 components can include but is not limited to, a power supply component, an analysis component, a communications component, a sensor component, an illumination component, and a diagnosis component. These various components are described in greater detail below. In a safety restraint embodiment, the enhancement device 112 will typically include some type of image-based sensor component, and that component should be located in such a way as to capture useful occupant images.

The sensor component(s) of the decision enhancement device 112 in a safety restraint embodiment should preferably be placed in a slightly downward angle towards the occupant 106 in order to capture changes in the angle and position of the occupant's upper torso resulting from a forward or backward movement in the seat 108. There are many other potential locations for a sensor component that are well known in the art. Similarly, the analysis component(s) of the decision enhancement devices 112 could be located virtually anywhere in the vehicle 102. In a preferred embodiment, the analysis component(s) is located near the sensor component(s) to avoid sending sensor readings such as camera images through long wires.

A safety restraint controller 118 such as an airbag controller is shown in an instrument panel 116, although the safety restraint controller 118 could be located virtually anywhere in the vehicle 102. An airbag deployment mechanism 120 is shown in the instrument panel 116 in front of the occupant 106 and the seat 108, although the system 100 can function with the airbag deployment mechanism 120 in alternative locations.

B. High-Level Component View

Figure 2:
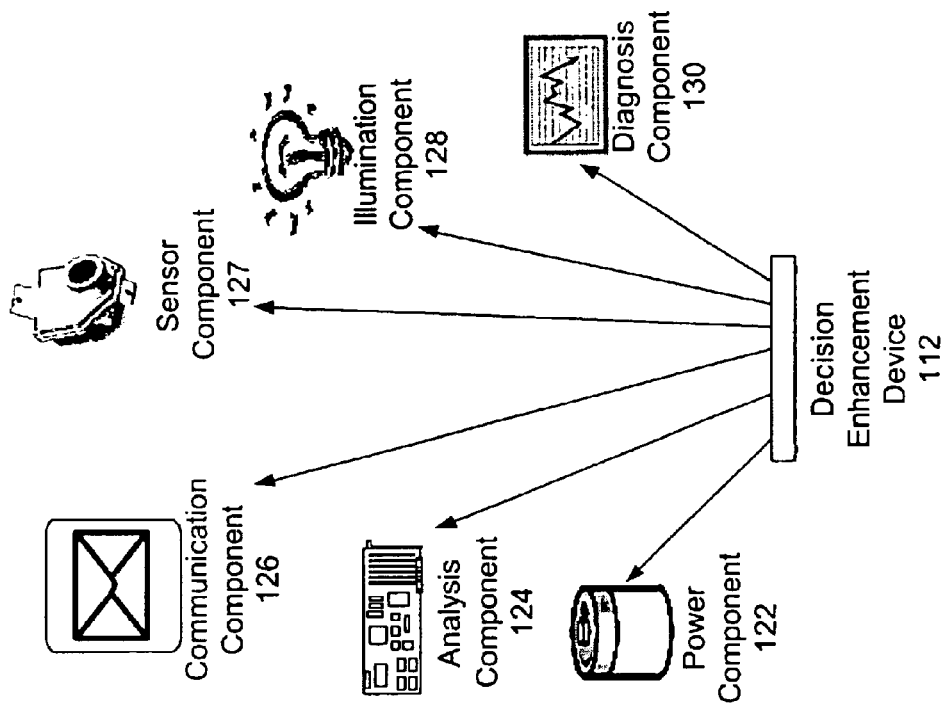
FIG. 2 is a block diagram illustrating several examples of physical components that can be included in a decision enhancement device.

FIG. 2 is a block diagram illustrating several examples of physical components that can be included in the one or more decision enhancement devices 112 as discussed above.

1. Power Supply Component

A power supply component ("power component") 122 can be used to provide power to the system 100. In some embodiments, the system 100 can rely on the power supply of the vehicle 102. However, in safety-related embodiments, such as a safety restraint application, it is preferable for the system 100 and the underlying application to have the ability to draw power from an independent power source in a situation where the power source for the vehicle 102 is impaired.

2. Analysis Component

An analysis component 124 can be made up of one or more computers that perform the various heuristics used by the system 100. The computers can be any device or combination of devices capable of performing the application logic utilized by the decision enhancement system 100.

3. Communication Component

A communication component 126 can be responsible for all interactions between the various components, as well as interactions between the system 100 and the applications within the vehicle 102 that interface with the system 100 in order to receive the decision enhancement functionality of the system 100.

In a safety restraint embodiment, it is the communication component 126 that is typically responsible for communicating with the safety restraint controller 118 and the safety restraint deployment mechanism 120.

4. Sensor Component

A sensor component 127 is the mechanism through which information is obtained by the system 100. The sensor component 127 includes one or more sensors, and potentially various sub-components that assist in the functionality performed by the sensor component 127, such as computer devices to assist in certain image processing functions.

In a preferred safety restraint embodiment, the sensor component 127 includes a video camera configured to capture images that include the occupant 106 and the area in the vehicle 102 that surrounds the occupant 106. In some embodiments of the system 100, the video camera used by the system 100 can be a high-speed camera that captures between roughly 250 and 1000 images each second. Such a sensor can be particularly desirable if the system 100 is being relied upon to identify affirmative deployment situations, instead of merely modifying, impeding, or disabling situations where some other sensor (such as an accelerometer or some type of beam-based sensor) is the initial arbiter of whether deployment of the safety restraint is necessary.

However, the heuristics applied by the system 100 can negate the need for specialized sensors. The heuristics applied by the system 100 can predict future occupant 106 attributes by detecting trends from recent sensor readings and applying multiple-model probability-weighted processing. Moreover, the heuristics applied by the system 100 can in certain embodiments, focus on relatively small areas within the captured sensor readings, mitigating the need for high speed cameras. A standard off-the-shelf video camera typically captures images at a rate of 40 images per second.

In some embodiments of the system 100, the sensor operates at different speeds depending on the current status of the occupant 106. For example, in an At-Risk-Zone detection/intrusion embodiment (an ARZ embodiment) of the system 100, the purpose of the decision enhancement system 100 is to determine whether or not the occupant 106 is too close (or will be too close by the time of deployment) to the deploying safety restraint 120 such that the deployment should be precluded. In an ARZ embodiment, a lower speed mode (between 6 and 12 frames a second, and preferably 8 frames per second) can be used before a crash or pre-crash determination is made that would other result in deployment of the safety restraint 120. A higher speed mode (between 25 and 45 frames per second) can then be used to determine if an ARZ intrusion should then preclude, disable, impede, or modify what would otherwise be a deployment decision by the safety restraint application.

5. Illumination Component

An illumination component 128 can be incorporated into the system 100 to aid in the functioning of the sensor component 127. In a preferred safety restraint application embodiment, the illumination component 128 is an infrared illuminator that operates at a wavelength between 800 nm and 960 nm. The wavelength of 880 nm may be particularly well suited for the goals of spectral sensitivity, minimizing occupant 106 distractions, and incorporating commercially available LED (light emitting diode) technologies.

Some embodiments that involve image based-sensors need not include the illumination component 128. Certain embodiments involving non-image-based sensors can include "illumination" components 128 that assist the sensor even though the "illumination" component 128 has nothing to do with visual light.

6. Diagnosis Component

A diagnosis component 130 can be incorporated into the system 100 to monitor the functioning of the system 100. This can be particularly desirable in embodiments of the system 100 that relate to safety. The diagnosis component 130 can be used to generate various status metrics, diagnostic metrics, fault detection indicators, and other internal control processing.

7. Combinations of Components

The various components in FIG. 2 can be combined into a wide variety of different components and component configurations used to make up the decision enhancement device. For example, an analysis component and a sensor component could be combined into a single "box" or unit for the purposes of certain image processing functionality. A single embodiment of the system 100 could have multiple sensor components 127, but no diagnosis component.

The minimum requirements for the system 100 include at least one analysis component 124. In a minimalist embodiment, the system 100 can be configured to utilize sensor readings from a sensor that already exists within the vehicle 102, allowing the decision enhancement device 112 to "piggy-back" off that sensor. In other embodiments, the system 100 will typically include at least one sensor component 127.

C. High-Level Process Flow View

Figure 3:
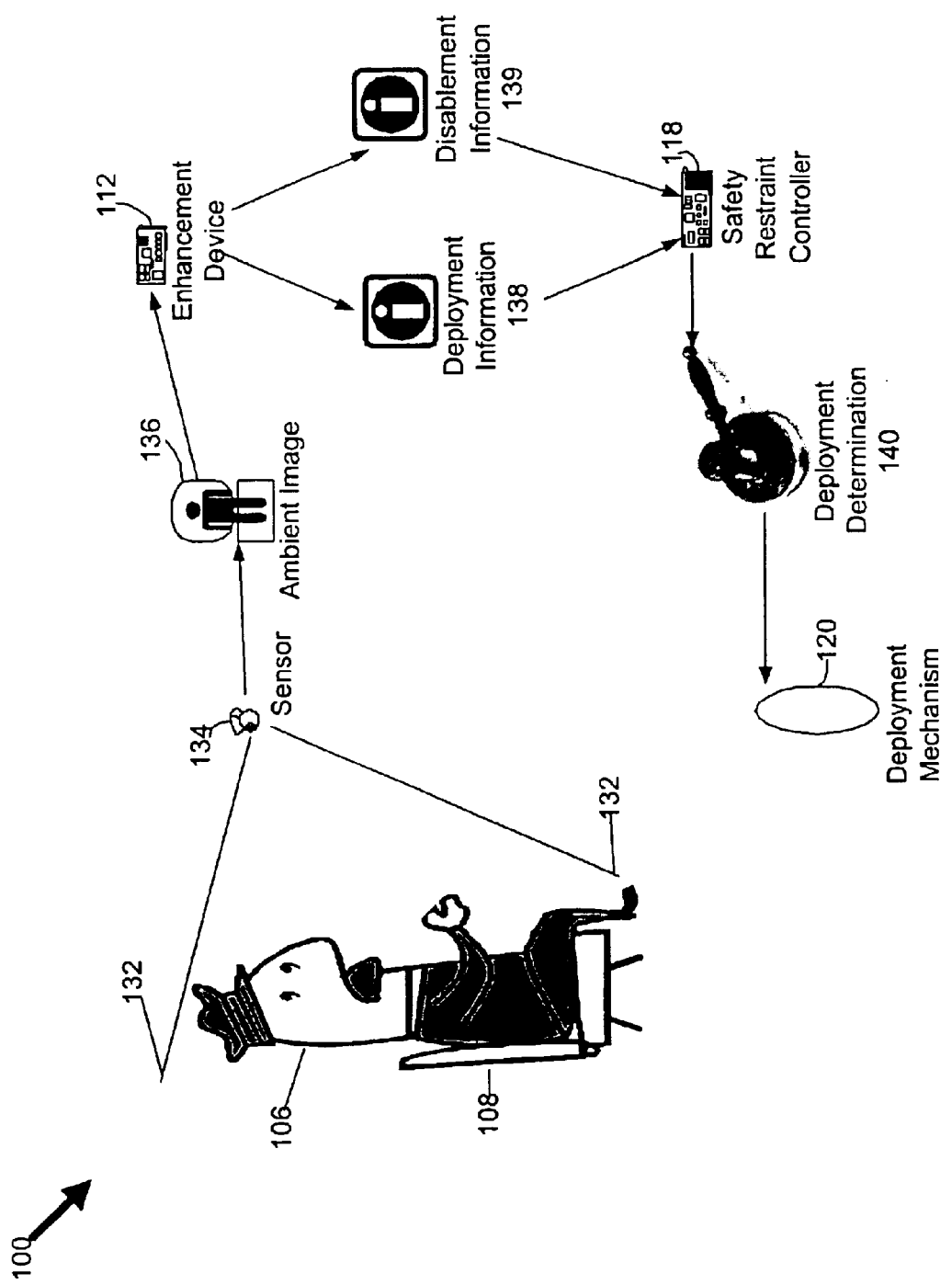
FIG. 3 is a process flow diagram illustrating an example of a decision enhancement system being utilized in conjunction with a safety restraint application.

FIG. 3 is a process flow diagram illustrating an example of a decision enhancement system 100 being utilized in conjunction with a safety restraint application.

An incoming image ("ambient image") 136 of a seat area 132 that includes both the occupant 106, or at least certain portions of the occupant 106, and some portions of the seat area 132 that surround the occupant 106.

The incoming ambient image 136 is captured by a sensor 134 such as a video or any other sensor capable of rapidly capturing a series of images. In some embodiments, the sensor 134 is part of the sensor component 127 that is part of the decision enhancement device 112. In other embodiments, the system 100 "piggy-backs" off of a sensor 134 for some other automated application.

In the Figure, the seat area 132 includes the entire occupant 106. Under some circumstances and embodiments, only a portion of the occupant 106 image will be captured within the ambient image 136, particularly if the sensor 134 is positioned in a location where the lower extremities may not be viewable. The ambient image 136 is then sent to some type of computer device within the decision enhancement device 112, such as the analysis component 124 discussed above.

The internal processing of the decision enhancement device 112 is discussed in greater detail below. In a safety restraint embodiment of the system 100, two important categories of outputs are deployment information 138 and disablement information 139. Deployment information 138 and disablement information 139 relate to two different questions in the context of a safety restraint embodiment of the system 100. Deployment information 138 seeks to answer the question at to whether or not an event occurred such that the deployment of a safety restraint might be desirable. For example, disablement information 139 may address the questions as to whether or not a crash has occurred. In contrast, disablement information 139 assists the system 100 in determining whether or not in the context of a situation where deployment may be desirable (e.g. a crash is deemed to have occurred), should deployment of the safety restraint be disabled, precluded, impeded or otherwise constrained. For example, if the occupant 106 is too close to the deploying device, or of a particular occupant type classification, it might be desirable for the safety restraint not to deploy.

Deployment information 138 can include a crash determination, and attributes related to a crash determination such as a confidence value associated with a particular determination, and the basis for a particular crash determination. Disablement information 139 can include a disablement determination, and attributes related to a disablement determination such as a confidence value associate with a particular determination, and the basis for a particular disablement determination (e.g. such a determination could be based on an occupant type classification, an at-risk-zone determination, an impact assessment metric, or some other attribute). In a preferred embodiment, a deployment determination 140 (e.g. a decision to either activate or not activate the safety restraint mechanism 120 is made using both deployment information 138 and disablement information 139.

In some embodiments, the decision enhancement device 112 can be configured to provide such information to the safety restraint controller 118 so that the safety restrain controller 118 can make an "informed" deployment determination 140 relating to the deployment mechanism 120 for the safety restraint application. In other embodiments, the decision enhancement device 112 can be empowered with full-decision making authority. In such an embodiment, the decision enhancement device 112 generates the deployment determination 140 that is implemented by the deployment mechanism 120.

The deployment determination 140 can include the timing of the deployment, the strength of the deployment (for example, an airbag could be deployed at half-strength), or any other potential course of action relating to the deployment of the safety restraint.

Deployment information 138 can include any information, and especially any occupant 106 attribute, that is useful in making an affirmative determination as to whether a crash has or is about to occur (for example, the occupant 106 could be in a state of pre-crash braking, as discussed below) such that the safety restraint mechanism 120 should be deployed so long as none of the disablement information 140 "vetoes" such a deployment determination 140.

Disablement information 140 can include any information that is useful in making determinations that the deployment of the safety restraint should be impeded, modified, precluded, or disabled on the basis of some "veto" factor. Examples of disablement conditions include an occupant 106 within a predefined At-Risk-Zone or an occupant 106 impact with the deploying restraint that is estimated to be to severe to for a desirable deployment.

Deployment information 138, disablement information 140, and deployment determinations 140 are discussed in greater detail below.

D. Processing-Level Hierarchy

Figure 4:
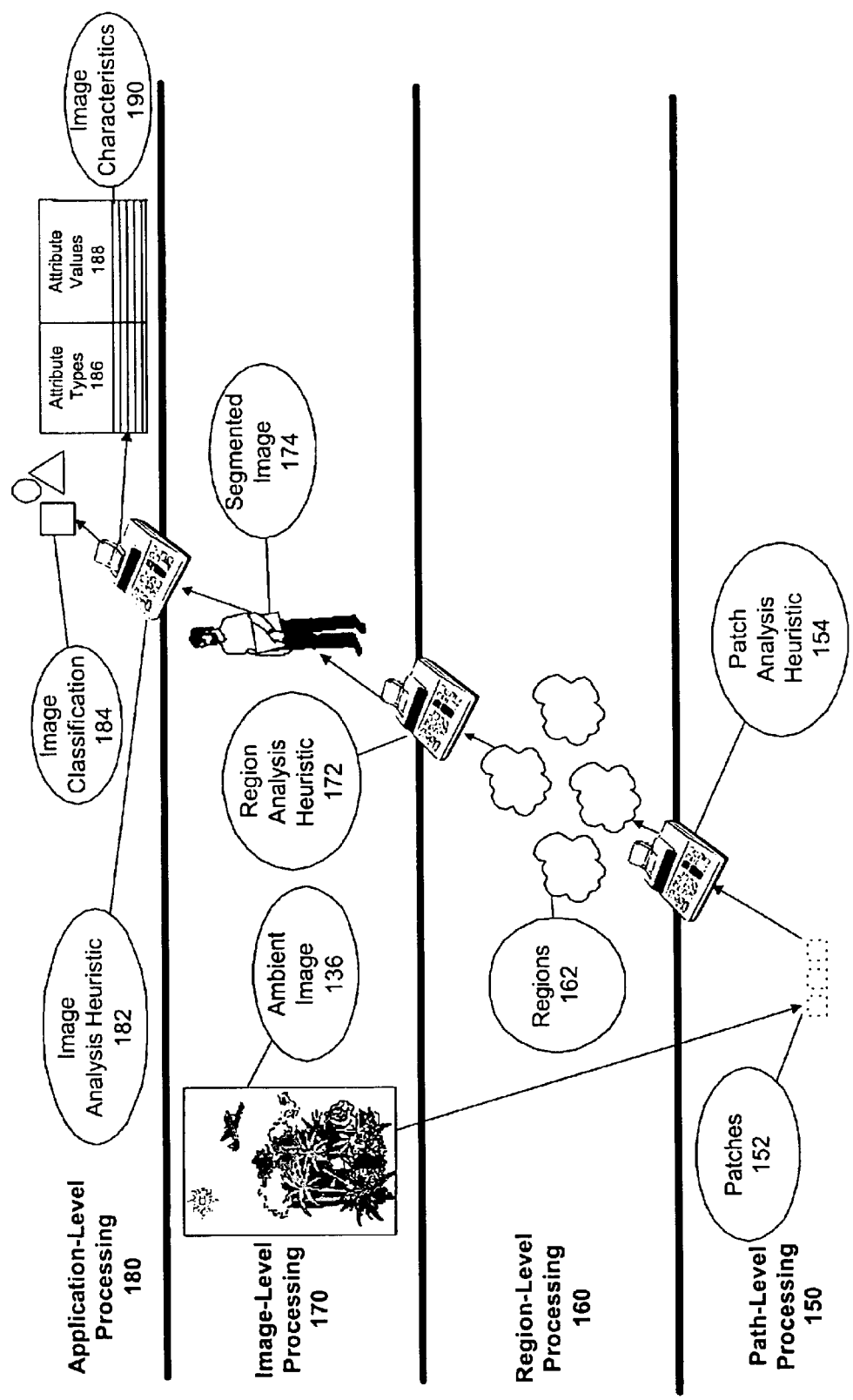
FIG. 4 is layer-view diagram illustrating an example of different processing levels that can be incorporated into the system.

FIG. 4 is layer-view diagram illustrating an example of different processing levels that can be incorporated into the system 100. The process-level hierarchy diagram illustrates the different levels of processing that can be performed by the system 100. These processing levels typically correspond to the hierarchy of image elements as processed by the system 100 at different parts of the processing performed by the system 100.

As disclosed in FIG. 4, the processing of the system 100 can include patch-level processing 150, region-level processing 160, image-level processing 170, and application-level processing 180. The fundamental building block of an image-based embodiment is a pixel. Images are made up of various pixels, with each pixel possession various values that reflect the corresponding portion of the image.

Patch-level processing 150, region-level processing 160, and image-level processing can involve performing operations on individual pixels. However an image-level process 170 performs functionality on the image as a whole, and a region-level process 160 performs operations on a region as a whole. Patch-level processing 150 can involve the modification of a single pixel value.

There is typically a relationship between the level of processing and the sequence in which processing is performed. Different embodiments of the system 100 can incorporate different sequences of processing, and different relationships between process level and processing sequence. In a typical embodiment, image-level processing 170 and application-level processing 180 will typically be performed at the end of the processing of the particular ambient image 136.

In the example in FIG. 4, processing is performed starting at the left side of the diagram, moving continuously to the right side of the diagram as the particular ambient image 136 is processed by the system 100. Thus, in the illustration, the system 100 begins with image-level processing 170 relating to the capture of the ambient image 136.

1. Initial Image-Level Processing

The initial processing of the system 100 relates to process steps performed immediately after the capture of the ambient image 136. In many embodiments, initial image-level processing includes the comparing of the ambient image 136 to one or template images. This can be done to isolate the segmented image 174 of the occupant 106 (an image that does not include the area surrounding the occupant 106) from the ambient image 136 (at image that does include the area adjacent to the occupant 106). The segmentation process is described below.

2. Patch-Level Processing.

Patch-level processing 150 includes processing that is performed on the basis of small neighborhoods of pixels referred to as patches 152. Patch-level processing 150 includes the performance of a potentially wide variety of patch analysis heuristics 154. A wide variety of different patch analysis heuristics 154 can be incorporated into the system 100 to organize and categorize the various pixels in the ambient image 136 into various regions 162 for region-level processing 160. Different embodiments may use different pixel characteristics or combinations of pixel characteristics to perform patch-level processing 150.

One example of a patch-level process is the ARZ heuristic described in greater detail below. The ARZ heuristic provides for dividing a detection window into a variety of patches.

3. Region-Level Processing

A wide variety of different region analysis heuristics 172 can be used to determine which regions 162 belong to a particular region of interest, such as the ARZ detection window described below. Region-level processing 160 is especially important to the segmentation process described below. Region analysis heuristics 172 can be used to make the segmented image 174 available to image-level processing 170 performed by the system 100.

D. Subsequent Image-Level Processing

The segmented image 174 can then be processed by a wide variety of potential image analysis heuristics 182 to identify a variety of image classifications 184 and image characteristics 190 that are used for application-level processing 180. The nature of the automated application should have an impact on the type of image characteristics 190 passed to the application.

1. Image Characteristics

The segmented image 174 (or some type of representation of the segmented image 174 such as a ellipse) is useful to the system 100 because certain image characteristics 190 can be obtained from the segmented image 174. Image characteristics 190 can include a wide variety of attribute types 186, such as color, height, width, luminosity, area, etc. and attribute values 188 that represent the particular trait of the segmented image 174 with respect to the particular attribute type 186. Examples of attribute values 188 corresponding to the attribute types of 186 of color, height, width, and luminosity can be blue, 20 pixels, 0.3 inches, and 80 Watts. Image characteristics 190 can include any attribute relating to the segmented image 174 or a representation of the segmented image 174, such as the ellipses discussed below. Image characteristics 190 also include derived image characteristics 190 that can include any attribute value 188 computed from two or more attribute values 188. For example, the area of the occupant 106 can be computed by multiplying height times width. Some derived imaged characteristics 190 can be based on mathematical and scientific relationships known in the art. Other derived image characteristics 190 may be utilize relationships that are useful to the system 100 that have no particular significance in the known arts. For example, a ratio of width to height to pixels could prove useful to an automated application of the system 100 without having a significance known in the mathematical or scientific arts.

Image characteristics 190 can also include statistical data relating to an image or a even a sequence of images. For example, the image characteristic 190 of image constancy can be used to assist in the process of whether a particular portion of the ambient image 136 should be included as part of the segmented image 174.

In a vehicle safety restraint embodiment of the system 20, the segmented image 32 of the vehicle occupant can include characteristics such as relative location with respect to an at-risk-zone within the vehicle, the location and shape of the upper torso, and/or a classification as to the type of occupant.

In addition to being derived from the segmented image 174, expectations with respect to image characteristics 190 can be used to help determine the proper scope of the segmented image 174 within the ambient image 136. This "boot strapping" approach can be a useful way of applying some application-related context to the segmentation process implemented by the system 100.

2. Image Classification

In addition to various image characteristics 190, the segmented image 174 can also be categorized as belonging to one or more image classifications 184. For example, in a vehicle safety restraint embodiment, the segmented image 174 could be classified as an adult, a child, a rear facing child seat, etc. in order to determine whether an airbag should be precluded from deployment on the basis of the type of occupant. In addition to being derived from the segmented image 174, expectations with respect to image classification 184 can be used to help determine the proper boundaries of the segmented image 174 within the ambient image 136. This "boot strapping" process is a way of applying some application-related context to the segmentation process implemented by the system 100. Image classifications 184 can be generated in a probability-weighted fashion. The process of selectively combining image regions into the segmented image 174 can make distinctions based on those probability values.

E. Application-Level Processing

In an embodiment of the system 100 invoked by a vehicle safety restraint application, image characteristics 190 and image classifications 184 can be used to preclude airbag deployments when it would not be desirable for those deployments to occur, invoke deployment of an airbag when it would be desirable for the deployment to occur, and to modify the deployment of the airbag when it would be desirable for the airbag to deploy, but in a modified fashion.

There are many different application-level processes that can be enhanced by the system 100. In a automated safety restraint embodiment, such processing can include a wide variety of affirmative deployment heuristics and disablement heuristics. Deployment and disablement processing is discussed in greater detail below.

In other embodiments of the system 100, application-level processing 180 can include any response or omission by an automated application to the image classification 184 and/or image characteristics 190 provided to the application.

II. Capturing Occupant Characteristics for Decision Enhancement

Figure 5:
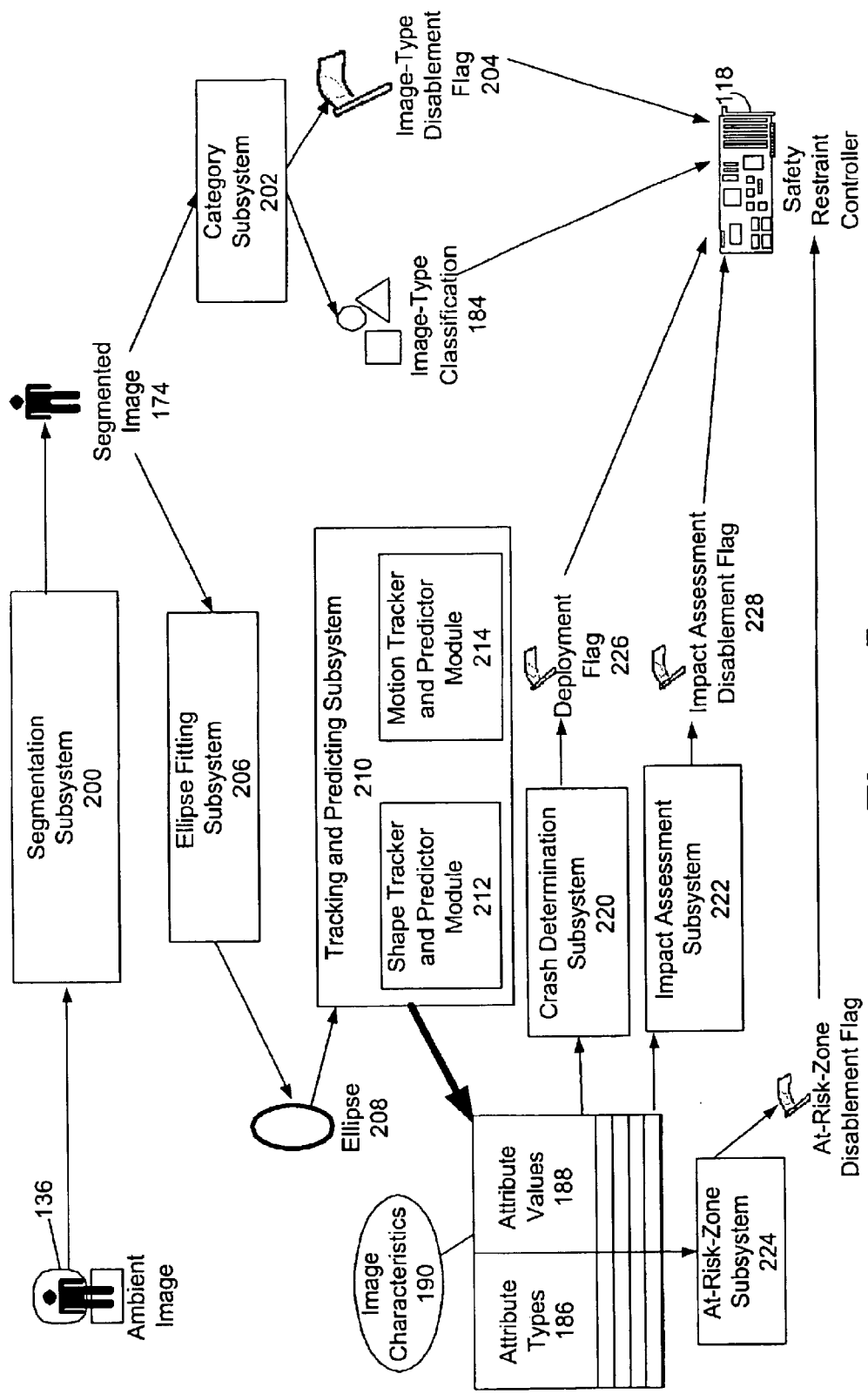
FIG. 5 is a subsystem-level diagram illustrating an example of a decision enhancement system in the context of a safety restraint application.

FIG. 5 is a subsystem-level diagram illustrating an example of a decision enhancement system 100 in the context of an automated safety restraint application.

A. Segmentation

In a preferred embodiment of the system 100, the first step in capturing occupant characteristics 190 is identifying the segmented image 174 within the ambient image 136. The system 100 can invoke a wide variety of different segmentation heuristics. Segmentation heuristics can be invoked in combination with other segmentation processes or as stand-alone processes. Segmentation heuristics can be selectively invoked on the basis of the current environmental conditions within the vehicle 102. For example, a particular segmentation heuristic or sequence of segmentation heuristics can be invoked in relatively bright conditions while a different segmentation heuristic or sequence of segmentation heuristics can be invoked in relatively dark conditions.

Examples of segmentation heuristics are disclosed in the following patent applications:

"IMAGE SEGMENTATION SYSTEM AND METHOD," Ser. No. 10/023,787, filed on Dec. 17, 2001; "MOTION-BASED IMAGE SEGMENTOR FOR OCCUPANT TRACKING," Ser. No. 10/269,237, filed on Oct. 11, 2002; "MOTION-BASED IMAGE SEGMENTOR FOR OCCUPANT TRACKING USING A HAUSDORF-DISTANCE HEURISTIC," Ser. No. 10/269,357, filed on Oct. 11, 2002; "SYSTEM OR METHOD FOR SELECTING CLASSIFIER ATTRIBUTE TYPES," Ser. No. 10/375,946, filed on Feb. 28, 2003; "SYSTEM OR METHOD FOR SEGMENTING IMAGES," Ser. No. 10/619,035, filed on Jul. 14, 2003; and "SYSTEM OR METHOD FOR IDENTIFYING A REGION-OF-INTEREST IN AN IMAGE," Ser. No. 10/663,521, filed on Sep. 16, 2003, the contents of which are hereby incorporated by reference in their entirety.

The segmented image 174 is an input for a variety of different application-level processes 180 in automated safety restraint embodiments of the system 100. As discussed above and illustrated in FIG. 4, the segmented image 174 can be an input for generating occupant classifications 184 and for generating image characteristics 190 (which can also be referred to as "occupant characteristics").

Different embodiments of the system 100 may include only a subset of the subsystems illustrated in FIG. 5.

B. Category Subsystem

A category subsystem 202 is a mechanism for classifying the segmented image 174 into one or more pre-defined classifications. The category subsystem 202 can generate an image-type classification 184. In some embodiments, the category subsystem 202 can set an image-type disablement flag 204 on the basis of the image-type classification 184. For example, if the occupant 106 is classified as an empty seat 108, the image-type disablement flag could be set to a value of "yes" or "disabled" which would preclude the deployment of the safety restraint. In other embodiments, the system 100 is not authorized to definitively set any type of disablement flags, and the information included in the image-type classification 184 is merely passed on to the mechanism that is authorized to make the final deployment determination 140, such as the safety restraint controller 118.

The category subsystem 202 can perform a wide variety of categorization or classification heuristics. Examples of categorization or classification heuristics are disclosed in the following patent applications:

"OCCUPANT LABELING FOR AIRBAG-RELATED APPLICATIONS," Ser. No. 10/269,308, filed on Oct. 11, 2002; "SYSTEM OR METHOD FOR SELECTING CLASSIFIER ATTRIBUTE TYPES," Ser. No. 10/375,946, filed on Feb. 28, 2003; and "SYSTEM OR METHOD FOR CLASSIFYING IMAGES," Ser. No. 10/625,208, filed on Jul. 23, 2003, the contents of which are hereby incorporated by reference in their entirety.

C. Ellipse Fitting

For many non-categorization purposes, it can be useful to use some type of geometric shape to represent the occupant 106. In particular, motion and location processing can benefit from such representations. Given the purposes and contexts of automated safety restraint applications, the use of one or more ellipses 208 can be particularly effective.

An ellipse fitting subsystem 206 can generate one or more ellipses 208 from the segmented image 174 provided by the segmentation subsystem 200. The ellipse fitting subsystem 206 can perform a wide variety of ellipse fitting heuristics. The patent application titled "OCCUPANT LABELING FOR AIRBAG-RELATED APPLICATIONS" (Ser. No. 10/269,308) that was filed on Oct. 11, 2002, the contents of which are incorporated herein in its entirety, discloses a number of difference ellipse fitting heuristics.

FIG. 6 is a diagram of illustrating an example of the results generated by an ellipse-fitting heuristic. The upper ellipse 250 preferably extends from the hips up to the head of the occupant 106. The lower ellipse 252 preferably extends down from the hips to include the feet of the occupant 106. If the entire area from an occupant's 106 hips down to the occupant's 106 feet is not visible, the lower ellipse 252 can be generated to represent what is visible. In a preferred embodiment, the lower ellipse 252 is not used by the system 100 and thus need not be generated by the system 100. Many characteristics of an ellipse or other geometric representation 208 can be tracked by the system 100 using a single point, preferably the centroid. In alternative embodiments, shapes other than ellipses can be used to represent the upper and lower parts of an occupant 106, and other points (such as the point closest to the deployment mechanism 120) can be used.

FIG. 7 is a diagram illustrating an example of occupant tracking attributes that can be tracked and predicted from the ellipse generated using the ellipse-fitting heuristic. Many different characteristics can be outputted from the ellipse fitting subsystem 206 for use by the system 100.

A centroid 258 of the upper ellipse 250 can be identified by the system 100 for tracking and predicting location and motion characteristics of the occupant 106. It is known in the art how to identify the centroid 258 of an ellipse. Motion characteristics can include an x-coordinate ("distance") 256 of the centroid 258 (or other point within the representation) and a forward tilt angle ("θ") 264. Shape measurements include a y-coordinate ("height") 254 of the centroid 258 (or other point within the representation), a length of the major axis of the ellipse ("major") 260 and a length of the minor axis of the ellipse ("minor") 262. Alternative embodiments may utilize a wide variety of different occupant characteristics or ellipse attributes. Rate of change information and other mathematical derivations, such as velocity (single derivatives) and acceleration (double derivatives), are preferably captured for all shape and motion measurements, so in the preferred embodiment of the invention there are nine shape characteristics (height, height', height", major, major', major", minor, minor', and minor") and six motion characteristics (distance, distance', distance", θ, θ', and θ"). A sideways tilt angle Φ is not shown because it is perpendicular to the image plane, and this the sideways title angle Φ is derived, not measured, as discussed in greater detail below. Motion and shape characteristics are the types of image characteristics 190 that can be used to perform many different deployment and disablement heuristics. Alternative embodiments may incorporate a greater or lesser number of motion and shape characteristics.

FIG. 8 is a diagram illustrating an example of an occupant tilt angle 276 that can be derived to generate a "three-dimensional view" from a two-dimensional image. A sideways tilt angle "(Φ)" 276 is the means by which a three-dimensional view can be derived, tracked, and predicted from two-dimensional image segmented images 174 captured from a single location and thus, sharing a similar perspective.

In a preferred embodiment of the system 100, there are three shape states, a state of leaning left towards the driver (left) 270, a sate of sitting relatively upright (center) 272, and a state of leaning right away from the driver (right) 274. A three shape state embodiment is typically assigned three pre-defined tilt sideways tilt angles of –Φ, 0, and Φ. In a preferred embodiment, Φ is set at a value between 15 and 40 degrees, depending on the nature of the vehicle being used. Alternative embodiments may incorporate a different number of shape states, and a different range of sideways tilt angles 276.

D. Tracking and Predicting

Returning to FIG. 5, the ellipse 208 (or other geometric representation) and the information contained in the geometric representation are provided to a tracking and predicting subsystem 210. In many embodiments, the tracking and predicting subsystem 210 includes a shape tracking and predicting module 212 ("shape tracker") for tracking and predicting shape characteristics, and a motion tracking a predicting module 214 ("motion tracker") for tracking and predicting motion characteristics.

In a preferred embodiment, a multiple-model probability-weighted Kalman filter is used to predict future characteristics by integrating current sensor readings with past predictions.

An academic paper entitled "An Introduction to the Kalman Filter" by Greg Welch and Gary Bishop is attached and incorporated by reference. The general equation for the Kalman filter is shown in Equation 1:

$$X_{(new\ prediction)} = X_{(old\ prediction)} + \text{Gain}[-X_{(old\ prediction)} + X_{(measured)}]$$

In a Kalman filter, "Gain" represents the perceived accuracy of the most recent measurement. A Gain of 0 indicates such a poor measurement that it is of no value, and thus the new estimate $X_{(new\ estimate)}$ is simply the value of the old estimate $X_{(old\ estimate)}$.

$$X_{(new\ estimate)} = X_{(old\ estimate)} + 0[-X_{(old\ estimate)} + X_{(measured)}]$$

$$X_{(new\ estimate)} = X_{(old\ estimate)} + 0$$

$$X_{(new\ estimate)} = X_{(old\ estimate)} \qquad \text{Equation 2:}$$

A Gain of 1 indicates such confidence in the most recent measurement $X_{(measured)}$ that the new prediction $X_{(new\ estimate)}$ is simply the value of the most recent measurement $X_{(measured)}$.

$$X_{(new\ estimate)} = X_{(old\ estimate)} + 1[-X_{(old\ estimate)} + X_{(measured)}]$$

$$X_{(new\ estimate)} = X_{(old\ estimate)} - X_{(old\ estimate)} + X_{(measured)}$$

$$X_{(new\ estimate)} = X_{(measured)} \qquad \text{Equation 3:}$$

In a real world application, the Gain is virtually always greater than 0 and less than 1. The Gain thus determines to what degree a new measurement can change the previous aggregate estimate or prediction of the location of an object, in the case of the instant invention, the occupant 106 is the object being tracked. Both the shape tracker 212 and the motion tracker 214 are described in greater detail below, along with FIGS. 9 and 10 respectively.

1. Shape Tracking and Predicting

FIG. 9 is a flow chart illustrating an example of the processing that can be performed by a shape tracker and predictor module 212.

Referring also to FIGS. 7 and 8, in some preferred embodiments of the system 100, the shape tracker and predictor module 212 tracks and predicts the major axis of the upper ellipse ("major") 260, the minor axis of the upper ellipse ("minor") 262, and the y-coordinate of the centroid ("height") 254. Returning to FIG. 9, each characteristic has a vector describing position, velocity, and acceleration information for the particular characteristic. The major vector is [major, major', major"], with major' representing the rate of change in the major or velocity and major" representing the rate of change in major velocity or acceleration. Accordingly, the minor vector is [minor, minor', minor"], and the height vector is [height, height', height"]. Any other shape vectors will similarly have position, velocity, and acceleration components. The first step in the shape tracking and prediction process is an update of the shape prediction at 280.

a. Update Shape Prediction

An update shape prediction process is performed at 280. This process takes the last shape estimate and extrapolates that estimate into a future prediction using a transition matrix.

Updated Vector Prediction=Transition Matrix*Last Vector Estimate    Equation 4:

The transition matrix applies Newtonian mechanics to the last vector estimate, projecting forward a prediction of where the occupant 106 will be on the basis of its past position, velocity, and acceleration. The last vector estimate is produced at 283 as described below. The process from 280 to 281, from 281 to 282, and from 282 to 283, loops back to 280. The process at 280 requires that an estimate be previously generated at 283, so processing at 280 and 283 is not invoked the first time through the repeating loop that is steps 280 through 283.

The following equation is then applied for all shape variables and for all shape states, where x is the shape variable, Δt represents change over time (velocity), and ½Δt² represents acceleration.

Equation 5:

$$\text{Updated Vector Prediction} = \begin{pmatrix} 1 & \Delta t & 1/2\Delta t^2 \\ 0 & 1 & \Delta t \\ 0 & 0 & 1 \end{pmatrix} * \begin{pmatrix} x \\ x' \\ x'' \end{pmatrix}$$

In a preferred embodiment of the system 100, there are nine updated vector predictions at 283 because there are three shape states and three non-derived shape variables in the preferred embodiment, and 3×3=9. The updated shape vector predictions are:
  Updated major for center state.
  Updated major for right state.
  Updated major for left state.
  Updated minor for center state.
  Updated minor for right state.
  Updated minor for left state.
  Updated height for center state.
  Updated height for right state.
  Updated height for left state.
  b. Update Covariance and Gain Matrices After the shape predictions are updated for all variables and all states at 280, the shape prediction covariance matrices, shape gain matrices, and shape estimate covariance matrices must be updated at 281. The shape prediction covariance accounts for error in the prediction process. The gain, as described above, represents the weight that the most recent measurement is to receive and accounts for errors in the measurement segmentation process. The shape estimate covariance accounts for error in the estimation process.

The prediction covariance is updated first. The equation to be used to update each shape prediction covariance matrix is as follows:

Shape Prediction Covariance Matrix=[State Transition Matrix*Old Estimate Covariance Matrix*transpose(State Transition Matrix)]+System Noise  Equation 6:

The state transition matrix is the matrix that embodies Newtonian mechanics used above to update the shape prediction. The old estimate covariance matrix is generated from the previous loop at 281. On the first loop from 280 through 283, step 281 is skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting noise constants are known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely solely on the past estimate instead. The role played by gain is evidenced in the basic Kalman filter equation of Equation 1.

$$X_{(new\ estimate)} = X_{(old\ estimate)} + \text{Gain}[-X_{(old\ estimate)} + X_{(measured)}]$$

The gain is not simply one number because one gain exists for each combination of shape variable and shape state. The general equation for updating the gain is Equation 7:

Gain=Shape Prediction Covariance Matrix*transpose(Measure Matrix)*inv(Residue Covariance)  Equation 7:

The shape covariance matrix is calculated above. The measure matrix is simply a way of isolating and extracting the position component of a shape vector while ignoring the velocity and acceleration components for the purposes of determining the gain. The transpose of the measure matrix is simply [1 0 0]. The reason for isolating the position component of a shape variable is because velocity and acceleration are actually derived components, only position can be measured by a snapshot. Gain is concerned with the weight that should be attributed to the actual measurement.

In the general representation of a Kalman filter, $X_{(new\ estimate)} = X_{(old\ estimate)} + \text{Gain}[-X_{(old\ estimate)} + X_{(measured)}]$, the residue represents the difference between the old estimate and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is Equation 8:

Residue Covariance=[Measurement Matrix*Prediction Covariance*transpose(Measurement Matrix)]+Measurement Noise The measurement matrix is a simple matrix used to isolate the position component of a shape vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 134 and the segmentation heuristics performed by the segmentation subsystem 200.

The last matrix to be updated is the shape estimate covariance matrix, which represents estimation error. As estimations are based on current measurements and past predictions, the estimate error will generally be less substantial than prediction error. The equation for updating the shape estimation covariance matrix is Equation 9:

Shape Estimate Covariance Matrix=(Identity Matrix−Gain Matrix*Measurement Matrix)*Shape Predictor Covariance Matrix An identity matrix is known in the art, and consists merely of a diagonal line of 1's going from top left to bottom right, with zeros at every other location. The gain matrix is computed and described above. The measure matrix is also described above, and is used to isolate the position component of a shape vector from the velocity and acceleration components. The predictor covariance matrix is also computed and described above.

c. Update Shape Estimate

An update shape estimate process is invoked at 282. The first step in this process is to compute the residue.

Residue=Measurement−(Measurement Matrix*Prediction Covariance)  Equation 10:

Then the shape states themselves are updated.

Updated Shape Vector Estimate=Shape Vector Prediction+(Gain*Residue)  Equation 11:

When broken down into individual equations, the results are as follows:

$$X^C_{(major\ at\ t)} = X^C_{(major\ at\ t)} + \text{Gain}[-X^C_{(major\ at\ t-1)} + X^C_{(measured\ major)}]$$

$$X^L_{(major\ at\ t)} = X^L_{(major\ at\ t)} + \text{Gain}[X^L_{(major\ at\ t-1)} + X^L_{(measured\ major)}]$$

$$X^R_{(major\ at\ t)} = X^R_{(major\ at\ t)} + \text{Gain}[-X^R_{(major\ at\ t-1)} + X^R_{(measured\ major)}]$$

$$X^C_{(minor\ at\ t)} = X^C_{(minor\ at\ t)} + \text{Gain}[-X^C_{(minor\ at\ t-1)} + X^C_{(measured\ minor)}]$$

$$X^L_{(minor\ at\ t)} = X^L_{(minor\ at\ t)} + \text{Gain}[X^L_{(minor\ at\ t-1)} + X^L_{(measured\ minor)}]$$

$$X^R_{(minor\ at\ t)} = X^R_{(minor\ at\ t)} + \text{Gain}[-X^R_{(minor\ at\ t-1)} + X^R_{(measured\ minor)}]$$

$X^C_{(height\ at\ t)} = X^C_{(height\ at\ t)} + \text{Gain}[-X^C_{(height\ at\ t-1)} + X^C_{(measured\ height)}]$ $X^L_{(height\ at\ t)} = X^L_{(height\ at\ t)} + \text{Gain}[-X^L_{(height\ at\ t-1)} + X^L_{(measured\ height)}]$ $X^R_{(height\ at\ t)} = X^R_{(height\ at\ t)} + \text{Gain}[-X^R_{(height\ at\ t-1)} + X^R_{(measured\ height)}]$ In the preferred embodiment, C represents the state of center, L represents the state of leaning left towards the driver, and R represents the state of leaning right away from the driver. Different embodiments and different automated applications may utilize a wide variety of different shape states or shape conditions.

d. Generate Combined Shape Estimate

The last step in the repeating loop between steps 280 and steps 283 is a generate combined shape estimate step at 283. The first part of that process is to assign a probability to each shape vector estimate. The residue covariance is re-calculated, using the same formula as discussed above.

Covariance Residue Matrix=[Measurement Matrix*Prediction Covariance Matrix*transpose(Measurement Matrix)]+Measurement Noise  Equation 12:

Next, the actual likelihood for each shape vector is calculated. The system 100 determines which state the occupant is in by comparing the predicted values for the various states with the recent best estimate of what the current values for the shape variables actually are.

Equation 13:

$$\text{Likelihood}\begin{pmatrix} C \\ R \\ L \end{pmatrix} = e^{-(residue - offset)^2 / 2\sigma^2}$$

There is no offset in the preferred embodiment of the invention because it is assumed that offsets cancel each other out in the processing performed by the system 100. Sigma represents variance, and is defined in the implementation phase of the invention by a human developer. It is known in the art how to assign a useful value for sigma by looking at data.

The state with the highest likelihood determines the sideways tilt angle Φ. If the occupant 106 is in a centered state, the sideways tilt angle is 0 degrees. If the occupant 106 is tilting left, then the sideways tilt angle is −Φ. If the occupant 18 is tilting towards the right, the sideways tilt angle is Φ. In the preferred embodiment of the invention, Φ and −Φ are predefined on the basis of the type and model of vehicle using the system 100.

Next, state probabilities are updated from the likelihood generated above and the pre-defined Markovian mode probabilities discussed below.

$P^C = P^{C-C} + P^{R-C} + P^{L-C}$  Equation 14:

$P^R = P^{R-R} + P^{C-R}$  Equation 15:

$P^L = P^{L-L} + P^{C-L}$  Equation 16:

The equations for the updated mode probabilities are as follows, where L represents the likelihood of a particular mode as calculated above:

Probability of mode Left=$1/[L^L*(P^{L-L}+P^{C-L})+L^R*(P^{R-R}+P^{C-R})+L^C*(P^{C-C}+P^{R-C}+P^{L-C})]*L^L*(P^{L-L}+P^{C-L})$  Equation 17:

Probability of mode Right=$1/[L^L*(P^{L-L}+P^{C-L})+L^R*(P^{R-R}+P^{C-R})+L^C*(P^{C-C}+P^{R-C}+P^{L-C})]*L^R*(P^{R-R}+P^{C-R})$  Equation 18:

Probability of mode Center=$1/[L^L*(P^{L-L}+P^{C-L})+L^R*(P^{R-R}+P^{C-R})+L^C*(P^{C-C}+P^{R-C}+P^{L-C})]*L^C*(P^{C-C}+P^{L-C}+P^{L-C})$  Equation 19:

The combined shape estimate is ultimately calculated by using each of the above probabilities, in conjunction with the various shape vector estimates.

$X$=Probability of mode Left*$X^{Left}$+Probability of mode Right*$X^{Right}$+Probability of mode Center*$X^{Center}$  Equation 20:

X is any of the shape variables, including a velocity or acceleration derivation of a measure value.

The loop from 280 through 283 repeats continuously while the vehicle is in operation or while there is an occupant 106 in the seat 108. The process at 280 requires that an estimate be previously generated at 282, so processing at 282 and 283 is not invoked the first time through the repeating loop.

2. Motion Tracking and Predicting

FIG. 10 is a flow chart illustrating an example of the processing that can be performed by a motion tracker and predictor module 214. The motion tracker and predictor module 214 can also be referred to as a motion module 214, a motion tracker 214, or a motion predictor 214.

The motion tracker and predictor 214 in FIG. 10 functions similarly in many respects, to the shape tracker and predictor 212 in FIG. 9. However, the motion tracker and predictor 212 tracks and predicts different characteristics and vectors than the shape tracker 212. In the preferred embodiment of the invention, the x-coordinate of the centroid 256 and the forward tilt angle θ ("θ") 264, and their corresponding velocities and accelerations (collectively "motion variables") are tracked and predicted. The x-coordinate of the centroid 256 is used to determine the distance between the occupant 106 and a location within the automobile such as the instrument panel 116, the safety restraint deployment mechanism 120, or some other location in the vehicle 102. In a preferred embodiment, the instrument panel 116 is the reference point since that is where the safety restraint is generally deployed from.

The x-coordinate vector includes a position component (x), a velocity component (x'), and an acceleration component (x"). The θ vector similarly includes a position component (θ), a velocity component (θ'), and an acceleration component (θ"). Any other motion vectors will similarly have position, velocity, and acceleration components.

a. Update Motion Prediction

An update motion prediction process is performed at 284. This process takes the last motion estimate and extrapolates that estimate into a future prediction using a transition matrix as disclosed above in Equation 4:

Updated Vector Prediction=Transition Matrix*Last Vector Estimate

The transition matrix applies Newtonian mechanics to the last vector estimate, projecting forward a prediction of where the occupant 106 will be on the basis of its past position, velocity, and acceleration. The last vector estimate is produced at 286 as described below. The process from 284 to 285, from 285 to 286, and from 286 to 287, loops back to 284 on a potentially perpetual basis while the vehicle 102 is in operation. The process at 284 requires that an estimate be previously generated at 286, so processing at 284 and 285 is not invoked the first time through the repeating loop that is steps 284–287.

As disclosed above with respect to shape variables, Equation 5 can then applied for all motion variables and for all motion modes:

$$\text{Updated Vector Prediction} = \begin{pmatrix} 1 & \Delta t & 1/2\Delta t^2 \\ 0 & 1 & \Delta t \\ 0 & 0 & 1 \end{pmatrix} * \begin{pmatrix} x \\ x' \\ x'' \end{pmatrix}$$

In the preferred embodiment of the invention, there would be six updated vector predictions at 284 because there are three motion modes and two motion variables in the preferred embodiment, and 3×2=6. The updated motion predictions are:

Updated x-coordinate for crash mode.
Updated x-coordinate for human mode.
Updated x-coordinate for stationary mode.
Updated θ for crash mode.
Updated θ for human mode.
Updated θ for stationary mode.

2. Update Covariance and Gain Matrices

After the motion predictions are updated for all motion variables and all modes at 284, the motion prediction covariance matrices, motion gain matrices, and motion estimate covariance matrices must be updated at 285. The motion prediction covariance accounts for error in the prediction process. The gain, as described above, represents the weight that the most recent measurement is to receive and accounts for errors in the measurement and segmentation process. The motion estimate covariance accounts for error in the estimation process.

The prediction covariance is updated first. Equation 21 is used to update each motion prediction covariance matrix.

Motion Prediction Covariance Matrix=State Transition Matrix*Old Estimate Covariance Matrix*transpose(State Transition Matrix)+System Noise  Equation 21:

The state transition matrix is the matrix that embodies Newtonian mechanics used above to update the motion prediction. The old estimate covariance matrix is generated from the previous loop at 285. On the first loop from 284 through 287, steps 284 and 285 are skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting such constants is known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely on the past estimate instead. The role played by gain is evidenced in the basic Kalman filter equation in Equation 1 where $$X_{(new\ estimate)} = X_{(old\ estimate)} + \text{Gain}[-X_{(old\ estimate)} + X_{(measured)}]$$

The gain is not simply one number but an entire matrix because one gain exists for each combination of motion variable and motion mode. The general equation for updating the gain is Equation 22:

Gain=Motion Prediction Covariance Matrix*transpose(Measure Matrix)*inv(Residue Covariance)

The motion covariance matrix is calculated above. The measure matrix is simply a way of isolating and extracting the position component of a motion vector while ignoring the velocity and acceleration components for the purposes of determining the gain. The transpose of the measure matrix is simply [1 0 0]. The reason for isolating the position component of a motion variable is because velocity and acceleration are actually derived components. Position is the only component actually measured, and because gain is concerned with the weight that should be attributed to the actual measurement, derived variables should be isolated.

In the general representation of a Kalman filter, $X_{(new\ estimate)} = X_{(old\ estimate)} + \text{Gain}[-X_{(old\ estimate)} + X_{(measured)}]$, the residue represents the difference between the old estimate and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is Equation 8 as disclosed above:

Residue Covariance=[Measurement Matrix*Prediction Covariance*transpose(Measurement Matrix)]+Measurement Noise The measurement matrix is a simple matrix used to isolate the position component of a motion vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 134 and the segmentation process 40.

The last matrix to be updated is the motion estimate covariance matrix, which represents estimation error. As estimations are based on current measurements and past predictions, the estimate error will generally be less substantial than the prediction error. The equation for updating the motion estimation covariance matrix is Equation 23:

Motion Estimate Covariance Matrix=(Identity Matrix−Gain Matrix*Measurement Matrix)*Motion Predictor Covariance Matrix An identity matrix is known in the art, and consists merely of a diagonal line of 1's going from top left to bottom right, with zeros at every other location. The gain matrix is computed and described above. The measure matrix is also described above, and is used to isolate the position component of a motion vector from the velocity and acceleration components. The predictor covariance matrix is also computed and described above.

c. Update Motion Estimate

An update motion estimate process is invoked at 286 The first step in this process is to compute the residue using Equation 10 as disclosed above:

Residue=Measurement−(Measurement Matrix*Prediction Covariance)

Then the motion states themselves are updated.

Motion Vector Estimate=Motion Vector Prediction+ (Gain*Residue)  Equation 24:

When broken down into individual equations, the results are as follows:

$$X^H_{(x\text{-}coordinate\ at\ t)} = X^H_{(x\text{-}coordinate\ at\ t)} + \text{Gain}[-X^H_{(x\text{-}coordinate\ at\ t-1)} + X^H_{(measured\ x\text{-}coordinate)}]$$

$$X^S_{(x\text{-}coordinate\ at\ t)} = X^S_{(x\text{-}coordinate\ at\ t)} + \text{Gain}[-X^S_{(x\text{-}coordinate\ at\ t-1)} + X^S_-$$

$X^C_{(x\text{-coordinate at }t)} = X^C_{(x\text{-coordinate at }t)} + \text{Gain}[-X^C_{(x\text{-coordinate at }t-1)} + X^C_{(measured\ x\text{-coordinate})}]$ $X^H_{(\theta\ at\ t)} = X^H_{(\theta\ at\ t)} + \text{Gain}[-X^H_{(\theta at\ t-1.)} + X^H_{(measured\ \theta)}]$ $X^S_{(\theta\ at\ t)} = X^S_{(\theta\ at\ t)} + \text{Gain}[-X^S_{(\theta\ at\ t-1)} + X^S_{(measured\ \theta)}]$ $X^C_{(\theta\ at\ t)} = X^C_{(\theta\ at\ t-1)} + \text{Gain}[-X^C_{(\theta\ at\ t-1)} + X^C_{(measured\ \theta)}]$ In some preferred disablement embodiments, H represents the mode of human, C represents the mode of crash (or pre-crash braking), and S represents the mode of stationary. In some embodiments of the system 100, and especially those embodiments potentially responsible for making an affirmative deployment determination 140 in addition to various disablement determinations, it can be desirable to use a four mode model. In such an embodiment, the mode of crash and pre-crash braking are modes that are distinct from one another. For an example of a four-mode model, please see the application titled "IMAGE PROCESSING SYSTEM FOR DETERMINING WHEN AN AIRBAG SHOULD BE DEPLOYED" (Ser. No. 10/052,152) that was filed on Jan. 17, 2002, the contents of which are incorporated herein in its entirety.

d. Generate Combined Motion Estimate

The last step in the repeating loop between steps 284 and steps 287 is a generate combined motion estimate step at 287. The first part of that process is to assign a probability to each motion vector estimate. The residue covariance is re-calculated, using Equation 25 as discussed above.

Covariance Residue Matrix=[Measurement Matrix*Prediction Covariance Matrix*transpose(Measurement Matrix)]+Measurement Noise Next, the actual likelihood for each motion vector is calculated.

Equation 26:

$$\text{Likelihood}\begin{pmatrix} C \\ H \\ S \end{pmatrix} = e^{-(residue-offset)^2/2\sigma^2}$$

There is no offset in a preferred embodiment of the invention because it can be assumed that offsets cancel each other out, and that system 100 processing can be zero-mean Gaussian signals. Sigma represents variance, is defined in the implementation phase of the invention by a human developer. It is known in the art how to assign a useful value for sigma by looking at data.

Next, mode probabilities are updated from the likelihood generated above and the pre-defined Markovian mode probabilities discussed below.

$P^C = P^{C-C} + P^{S-C} + P^{H-C}$  Equation 27:

$P^H = P^{H-H} + P^{S-H} + P^{C-H}$  Equation 28:

$P^S = P^{S-S} + P^{H-S} + P^{C-S}$  Equation 29:

The equations for the updated mode probabilities are as follows, where L represents the likelihood of a particular mode as calculated above:

Probability of mode Stationary=$1/[L^{S*}(P^{S-S}+P^{H-S}+P^{C-S})+L^{H*}(P^{H-H}+P^{S-H}+P^{C-H})+L^{C*}(P^{C-C}+P^{S-C}+P^{H-C})]*L^{S*}(P^{S-S}+P^{H-S}+P^{C-S})$  Equation 30:

Probability of mode Human=$1/[L^{S*}(P^{S-S}+P^{H-S}+P^{C-S})+L^{H*}(P^{H-H}+P^{S-H}+P^{C-H})+L^{C*}(P^{C-C}+P^{S-C}+P^{H-C})]*L^{H*}(P^{H-H}+P^{S-H}+P^{C-H})$  Equation 31:

Probability of mode Crash=$1/[L^{S*}(P^{S-S}+P^{H-S}+P^{C-S})+L^{H*}(P^{H-H}+P^{S-H}+P^{C-H})+L^{C*}(P^{C-C}+P^{S-C}+P^{H-C})]*L^{C*}(P^{C-C}+P^{S-C}+P^{H-C})$  Equation 32:

The combined motion estimate is ultimately calculated by using each of the above probabilities, in conjunction with the various motion vector estimates.

$X$=Probability of mode Human*$X^{Human}$+Probability of mode Crash*$X^{crash}$+Probability of mode Stationary*$X^{Stationary}$  Equation 33:

X is any of the motion variables, including a velocity or acceleration derivation.

The loop from 284 through 287 repeats continuously while the vehicle 102 is in operation or while there is an occupant 106 in the seat 108.

3. Outputs from the Tracking and Predicting Subsystem

Returning to FIG. 5, the output from the tracking and predicting subsystem 210 are the occupant characteristics 190 (which can also be referred to as image characteristics), including attribute types 186 and their corresponding attribute values 188, as discussed above. Occupant characteristics 190 can be used to make crash determinations (e.g. whether an event has occurred that could potentially make deployment of the safety restraint desirable), as well as disablement determinations, such as whether the occupant 106 is too close to an At-Risk-Zone or whether the kinetic energy (or other impact assessment metric) would be too substantial for the deployment (or at least full strength deployment) of the safety restraint.

E. Crash Determination

A crash determination subsystem 220 can generate the output of a deployment flag 226 or a crash flag from the input of the various image characteristics 190 discussed above. In some embodiments, the impact of a crash flag 226 sent to crash (or pre-crash braking) is not "binding" upon the safety restraint controller 118. In those embodiments, the safety restraint controller 118 may incorporate a wide variety of different crash determinations, and use those determinations in the aggregate to determine whether a deployment-invoking event has occurred. In other embodiments, the determinations of the crash determination subsystem 220 are binding upon the safety restraint controller 118. The crash determination subsystem 220 can generate crash determinations in a wide variety of different ways using a wide variety of different crash determination heuristics. Multiple heuristics can be combined to generate aggregated and probability-weighted conclusions. The patent application titled "IMAGE PROCESSING SYSTEM FOR DETERMINING WHEN AN AIRBAG SHOULD BE DEPLOYED" (Ser. No. 10/052,152) was filed on Jan. 17, 2002 and is hereby incorporated by reference in its entirety, discloses various examples of crash determination heuristics.

1. Process-Flow View of a Crash Determination

Figure 11:
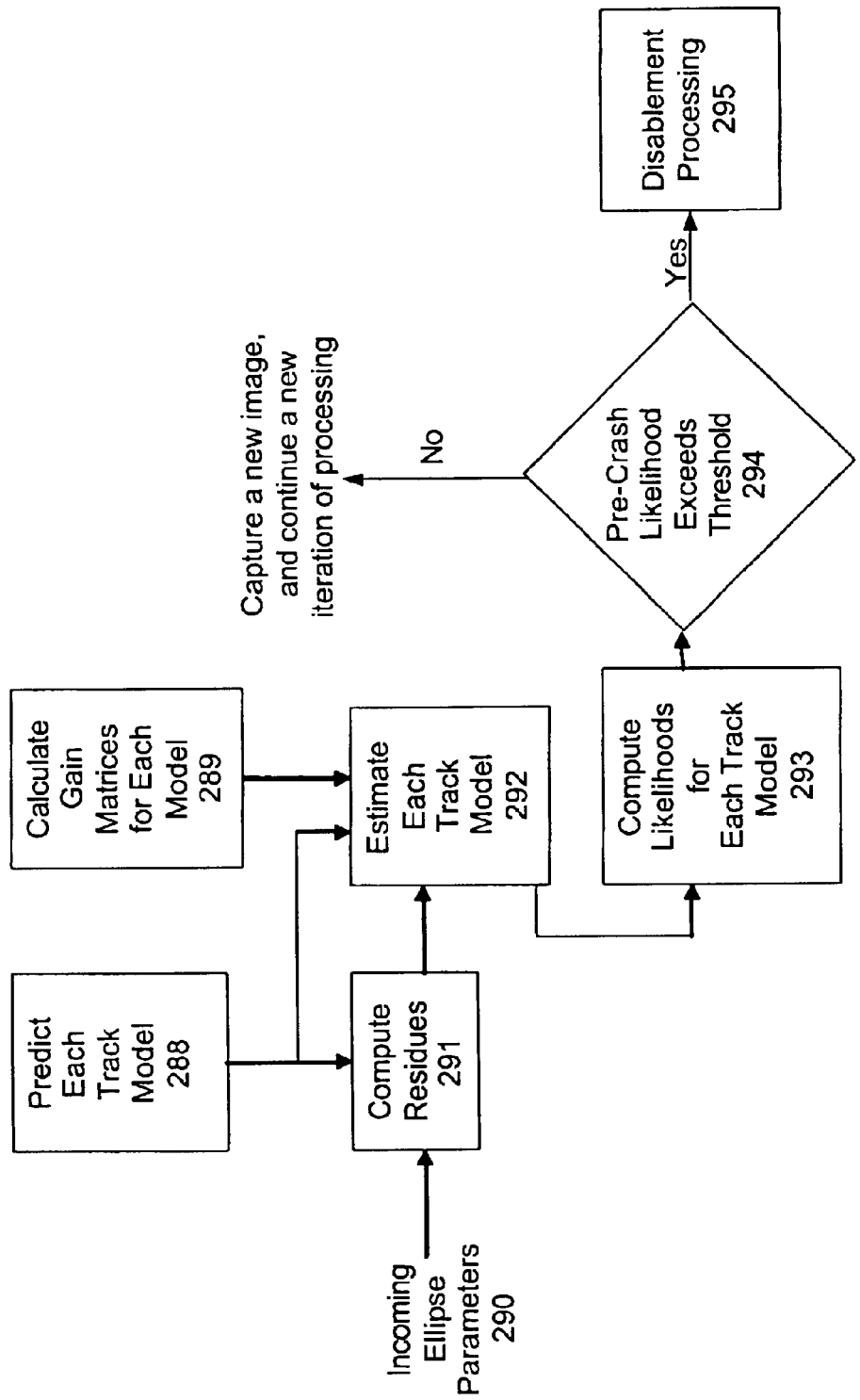
FIG. 11 is a process flow diagram illustrating an example an occupant tracking process that concludes with a crash determination and the invocation of disablement processing.

FIG. 11 is a process flow diagram illustrating an example an occupant tracking process that concludes with a crash determination heuristic and the invocation of one or more disablement processes 295. The process flow disclosed in FIG. 11 is a multi-threaded view to the shape tracking and predicting heuristic of FIG. 9 and the motion tracking and predicting heuristic of FIG. 10.

Incoming ellipse parameters 290 or some other representation of the segmented image 174 is an input for computing residue values at 291 as discussed above. A past prediction (including a probability assigned to each state or mode in the various models) at 288 is also an input for computing the residue values 291.

At 289, gain matrices are calculated for each model and those gain matrices are used to estimate a new prediction for each model at 292. The residues at 291 and the estimates at 292 are then used to calculate likelihoods for each model at 293. This involves calculating a probability associated with each "condition" such as "mode" and "state."

At 294, the system 100 compares the probability associated with the condition of crashing (or in some cases, pre-crash braking), to a predefined crash condition threshold. If the relevant probability exceeds the predefined crash condition threshold, a crash is deemed to have occurred, and the system 100 performs disablement processing at 295. If no crash is deemed to have occurred, a new ambient image 136 is captured, and the looping process of the tracking and predicting subsystem 210 continues.

In a preferred embodiment of the system 100, disablement process 295 such as the processing performed by the impact assessment subsystem 222 and the At-Risk-Zone detection subsystem 224 are not performed until after the crash determination subsystem 220 determines that a crash (or in some embodiments, pre-crash braking) has occurred.

In some embodiments of the system 100, the sensor 134 can operate at a relatively slow speed in order to utilize lower cost image processing electronics. Moreover, the system 100 can utilize a sensor 134 that operates at a relatively lower speed for crash detection while operating at a relatively higher speed for ARZ detection, as described in greater detail below.

2. Input-Output View of Crash Determination

Figure 12:
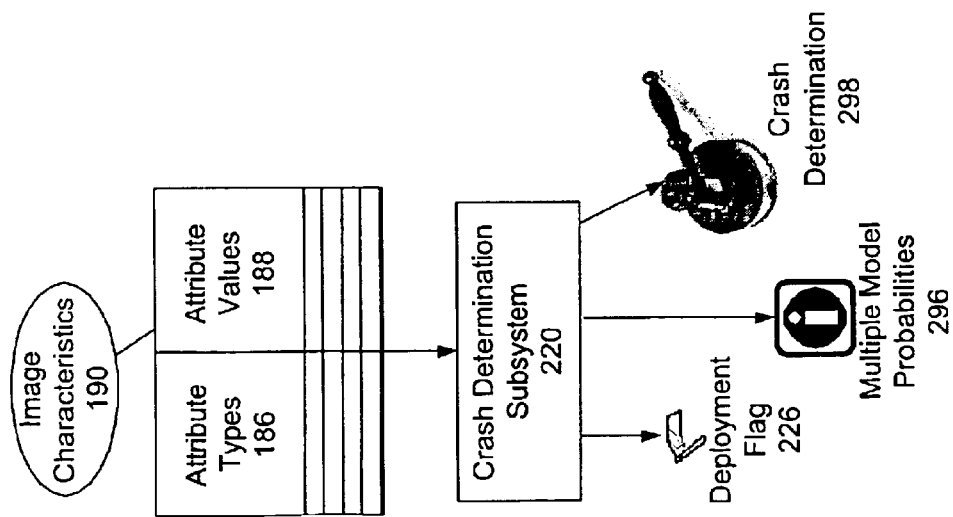
FIG. 12 is an input-output diagram illustrating an example of the inputs and outputs associated with the crash determination subsystem.

FIG. 12 is an input-output diagram illustrating an example of the inputs and outputs associated with the crash determination subsystem 220. The inputs are the image characteristics 190 identified by the tracking and predicting subsystem 210. The outputs can include a crash determination 298, a deployment flag 226, and various probabilities associated with the various models ("multiple model probabilities") 296. As discussed above, the crash determination 298 can be made by comparing a probability associated with the model for "crash" or "pre-crash braking" with a predefined threshold value. The deployment flag 226 can be set to a value of "yes" or "crash" on the basis of the crash determination.

3. Probability-Weighted Condition Models a. Modeling Shape States

A preferred embodiment of the system 100 uses a multiple-model probability weighted implementation of a Kalman filter for all shape characteristics and motion characteristics. In a preferred embodiment, each shape characteristic has a separate Kalman filter equation for each shape state. Similarly, each motion characteristic has a separate Kalman filter equation for each motion mode. In a preferred embodiment of the invention, the occupant 106 has at least one shape state and at least one motion mode. There are certain predefined probabilities associated with a transition from one state to another state. These probabilities can best be illustrated through the use of Markov chains.

Figure 13:
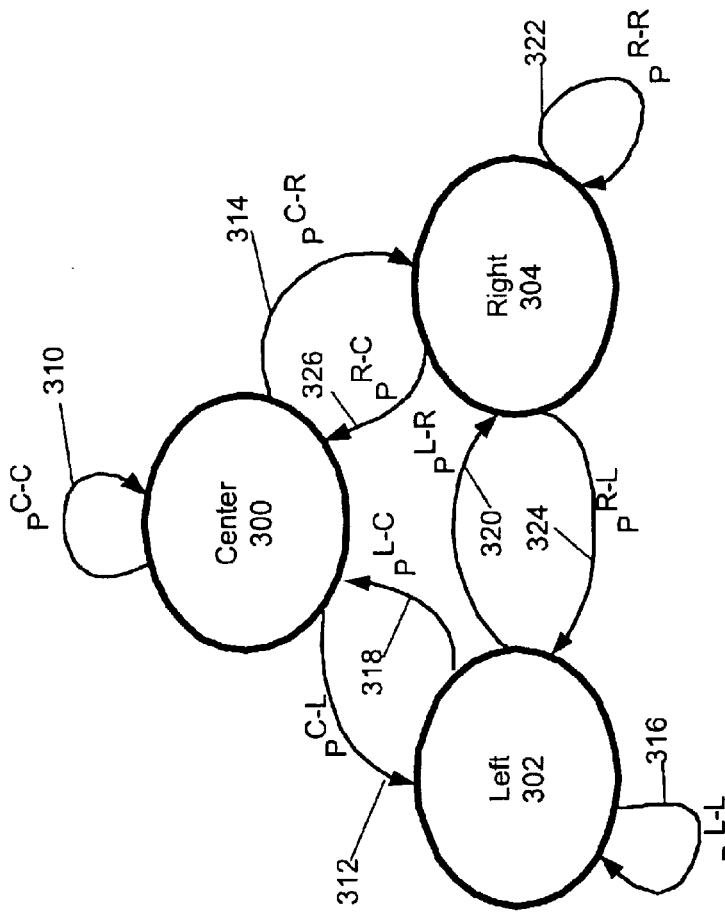
FIG. 13 is a Markov chain diagram illustrating an example of interrelated probabilities relating to the "shape" or tilt of the occupant.

FIG. 13 is a Markov chain diagram illustrating an example of interrelated probabilities relating to the "shape" or tilt of the occupant 106. The three shape "states" illustrated in the Figure are the state of sitting in a centered or upright fashion ("center" 300), the state of leaning to the left ("left" 302), and the state of leaning to the right ("right" 304).

The probability of an occupant being in a particular state and then ending in a particular state can be identified by lines originating at a particular shape state with arrows pointing towards the subsequent shape state. For example, the probability of an occupant in center state remaining in center state $P^{C-C}$ is represented by the arrow at 310. The probability of moving from center to left $P^{C-L}$ is represented by the arrow 312 and the probability of moving from center to right $P^{C-R}$ is 314. The total probabilities resulting from an initial state of center 300 must add up to 1.

$$P^{C-C}+P^{C-L}+P^{C-R}=1.0 \qquad \text{Equation 34:}$$

Furthermore, all of the probabilities originating from any particular state must also add up to 1.0.

The arrow at 318 represents the probability that a left tilting occupant 106 will sit centered $P^{L-C}$, by the next interval of time. Similarly, the arrow at 320 represents the probability that a left tilting occupant will tilt right $P^{L-R}$ by the next interval of time, and the arrow at 316 represents the probability that a left tilting occupant will remain tilting to the left $P^{L-L}$. The sum of all possible probabilities originating from an initial tilt state of left must equal 1.

$$P^{L-C}+P^{L-L}+P^{L-R}=1.0 \qquad \text{Equation 35:}$$

Lastly, the arrow at 322 represents the probability that a right tilting occupant will remain tilting to the right $P^{R-R}$, the arrow at 326 represents the probability that a right tilting occupant will enter a centered state $P^{R-C}$, and the arrow at 324 represents the probability that an occupant will tilt towards the left $P^{R-L}$. The sum of all possible probabilities originating from an initial tilt state of right equals 1.

$$P^{R-C}+P^{R-L}+P^{R-R}=1.0 \qquad \text{Equation 36:}$$

As a practical matter, a preferred embodiment of the system 100 utilizes a standard commercially available video camera as the sensor 134. A typical video camera captures between 50 and 100 sensor readings each second. Even though the system 100 is preferably configured to perform crash detection heuristics in a low-speed mode (capturing between 5 and 15 images per second) and disablement heuristics in high-speed mode (capturing between 30 and 50 images per second), the speed of the video camera is sufficiently high such that it is essentially impossible for a left 302 leaning occupant to become a right 304 leaning occupant, or for a right 304 leaning occupant to become a left 302 leaning occupant, in a mere 1/50 of a second. Thus, it is far more likely that a left 302 leaning occupant will first enter a center state 300 before becoming a right 304 leaning occupant, and similarly, it is far more realistic for a right 304 leaning occupant to become a centered 300 occupant before becoming a left 302 leaning occupant. Thus, in the preferred embodiment of, $P^{L-R}$ at 320 is always set at zero and $P^{R-L}$ at 324 will also always be set at zero. The three probability equations relating to shape state are thus as follows:

$$P^{C-C}+P^{C-L}+P^{C-R}=1.0 \qquad \text{Equation 37:}$$

$$P^{R-C}+P^{R-R}=1.0 \qquad \text{Equation 38:}$$

$$P^{L-C}+P^{L-L}=1.0 \qquad \text{Equation 39:}$$

The values above are populated in a predefined manner based on empirical data, and generally useful assumptions about human behavior. In highly specialized contexts, additional assumptions can be made.

b. Modeling Motion Modes

Figure 14:
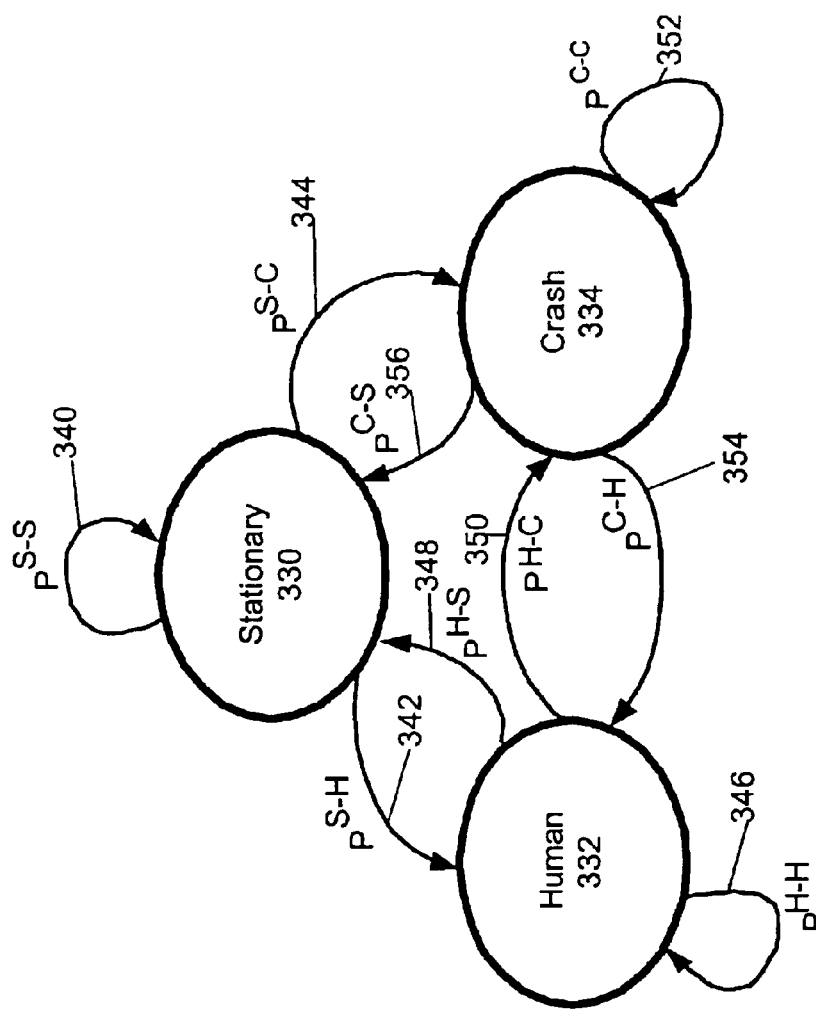
FIG. 14 is a Markov chain diagram illustrating an example of interrelated probabilities relating to the motion of the occupant.

FIG. 14 is a Markov chain diagram illustrating an example of interrelated probabilities relating to the motion of the occupant. One preferred embodiment of the system 100 uses three motion modes: a stationary mode 330 represents a human occupant 106 in a mode of stillness, such as while asleep; a human mode 332 represents a occupant 106 behaving as a typical passenger in an automobile or other vehicle 106, one that is moving as a matter of course, but not in an extreme way; and a crash mode 334, represents the occupant 106 of a vehicle that is in a mode of crashing. In many embodiments of the system 100, the mode of crashing can also be referred to as "pre-crash braking." In some embodiments, there are four motion modes, with separate and distinct modes for "pre-crash braking" and the mode of "crash." For an example of a four motion mode embodiment, see the patent application titled "IMAGE PROCESSING SYSTEM FOR DETERMINING WHEN AN AIRBAG SHOULD BE DEPLOYED" (Ser. No. 10/052,152) that was filed on Jan. 17, 2002, the contents of which are hereby incorporated by reference in its entirety.

The probability of an occupant 106 being in a particular motion mode and then ending in a motion mode can be identified by lines originating in the current mode with arrows pointing to the new mode. For example, the probability of an occupant in a stationary state remaining in stationary mode $P^{S-S}$ is represented by the arrow at 340. The probability of moving from stationary to human $P^{S-H}$ is represented by the arrow 342 and the probability of moving from stationary to crash $P^{S-C}$ is 344. The total probabilities resulting from an initial state of stationary 330 must add up to 1.

$$P^{S-S}+P^{S-H}+P^{S-C}=1.0 \qquad \text{Equation 40:}$$

Similarly, the probability of human to human is $P^{H-H}$ at 346, the probability of human to stationary is $P^{H-S}$ at 348, and the probability of human to crash is $P^{H-C}$ at 350. The total probabilities resulting from an initial state of human 332 must add up to 1.

$$P^{H-H}+P^{H-C}+P^{H-S}=1.0 \qquad \text{Equation 41:}$$

Lastly, the probability of going from crash to crash is $P^{C-C}$ at 352, crash to stationary is $P^{C-S}$ at 356, and crash to human is $P^{C-H}$ at 354. The total probabilities resulting from an initial state of crash 344 must add up to 1.

$$P^{C-C}+P^{C-S}+P^{C-H}=1.0 \qquad \text{Equation 42:}$$

As a practical matter, it is highly unlikely (but not impossible) for an occupant 106 to ever leave the state of crash at 334 once that state has been entered. Under most scenarios, a crash at 334 ends the trip for the occupant 106. Thus, in a preferred embodiment, $P^{C-H}$ is set to nearly zero and $P^{C-S}$ is also set to nearly zero. It is desirable that the system 100 allow some chance of leaving a crash mode 334 or else the system 100 may get stuck in a crash mode 334 in cases of momentary system 100 "noise" conditions or some other unusual phenomenon. Alternative embodiments can set $P^{C-H}$ and $P^{C-S}$ to any desirable value, including zero, or a probability substantially greater than zero.

The transition probabilities associated with the various shape states and motion modes are used to generate a Kalman filter equation for each combination of characteristic and state/mode/condition. The results of those filters can then be aggregated in to one result, using the various probabilities to give the appropriate weight to each Kalman filter. All of the probabilities are predefined by the implementer of the system 100.

The Markov chain probabilities provide a means to weigh the various Kalman filters for each characteristic and for each state, mode, or other condition. The tracking and predicting subsystem system 210 incorporates the Markov chain probabilities in the form of the shape tracker and predictor 212 and the motion tracker and predictor 214.

C. Examples of Occupant Crash Determinations

Figure 15:
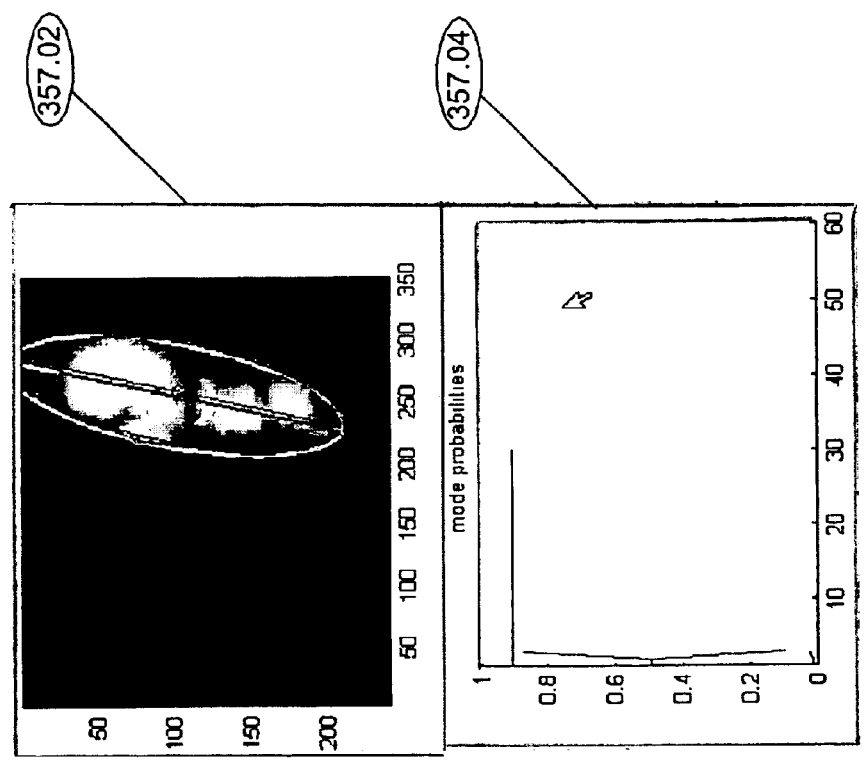
FIG. 15 is a block diagram illustrating an example of an occupant in an initial at rest position.

FIG. 15 is a block diagram illustrating an example of an occupant 106 in an initial at rest position. At 357.02, the block diagram includes the segmented image 174 of the upper torso (including the head) of an occupant 106, an upper ellipse 250 fitted around the upper torso of the occupant 106. At 357.04 is a probability graph corresponding to the image at 357.02. The probability graph at 357.04 relates the image at 357.02 to the various potential motion modes. There are three lines representing three probabilities relating to the three motion modes. The dotted line representing the condition of "crash" or "pre-crash braking" begins with a probability of 0 and is slowly sloping upward to a current value that is close to 0. The line beginning at 0.5 and sloping downward pertains to the stationary mode 330. The line slopes downward because the occupant 106 is moving, making it readily apparent that the stationary mode 330 is increasingly unlikely, although still more likely than a "crash" or "pre-crash" breaking mode 334. The full line sloping upward exceeds a probability of 0.9 and represents the probability of being in a human mode 332.

Figure 16:
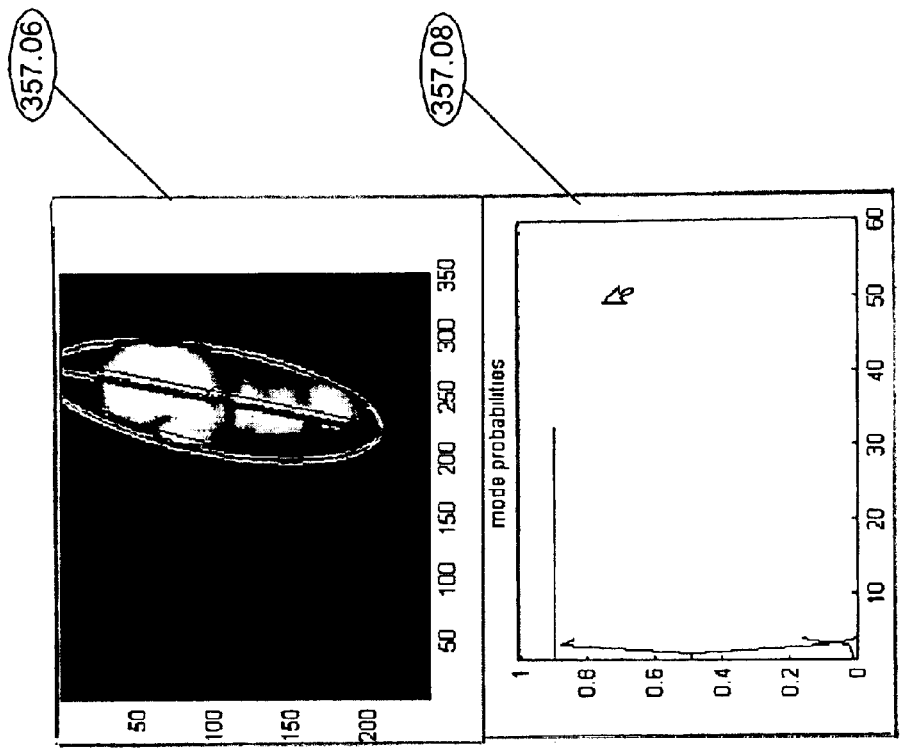
FIG. 16 is a block diagram illustrating an example of an occupant experiencing a normal level of human motion.

FIG. 16 is a block diagram illustrating an example of an occupant 106 experiencing a "normal" level of human motion. Similar to FIG. 15, the probability graph at 357.08 corresponds to the image at 357.06. The probability of a crash determination has increased to a value of 0.2 given the fact that the vehicle 102 and occupant 106 are no longer stationary. Accordingly, the probability of being in the stationary mode 330 has dropped to 0, with probability of human mode 332 peaking at close to 0.9 and then sloping downward to 0.8 as the severity of the occupant's motion increases. A comparison of 357.06 with 357.02 reveals forward motion, but not severe forward motion.

Figure 17:
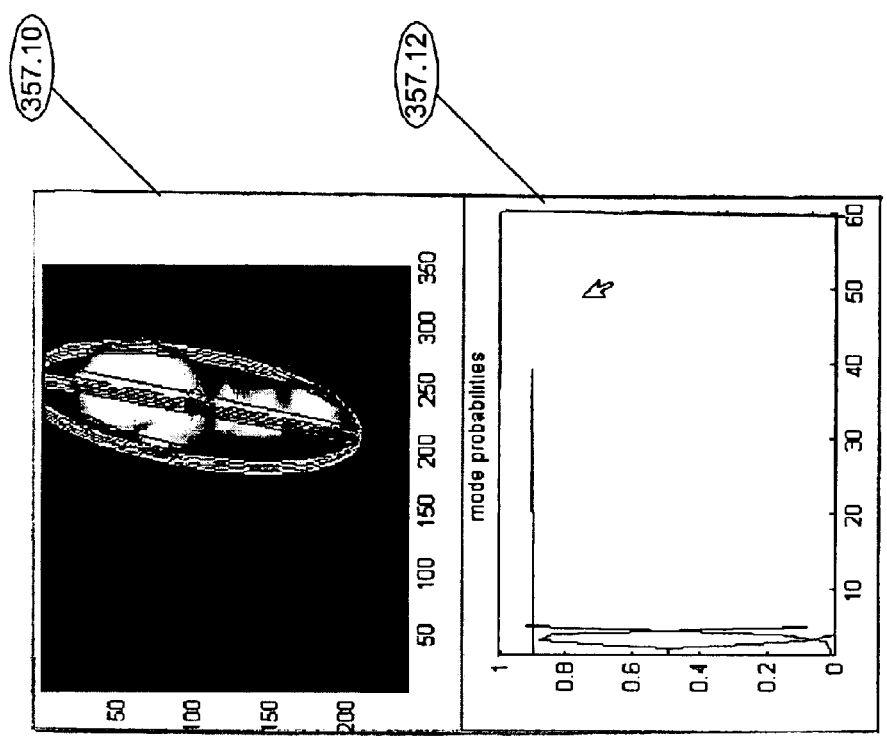
FIG. 17 is a block diagram illustrating an example of an occupant that has been identified as being in a condition potentially requiring the deployment of an automated vehicle safety restraint.

FIG. 17 is a block diagram illustrating an example of an occupant 106 that has been identified as being in a condition potentially requiring the deployment of an automated vehicle safety restraint. Similar to FIGS. 15 and 16, the probability graph at 357.12 corresponds to the image at 357.10. The graph at 357.12 indicates that the probability of a crash (or pre-crash breaking) has exceeded the predefined threshold evidenced by the horizontal line at the probability value of 0.9. The probability associated with the human mode 332 is approximately 0.1, after a rapid decline from 0.9, and the probability associated with the stationary mode 330 remains at 0. A comparison of the image at 357.10 with the images at 357.02 and 357.06 reveals that the image at 357.10 is moving in the forward direction. In contrast to the ellipses in FIGS. 15 and 16, the thickness of the lines making up the ellipse (e.g. the differences between the multiple ellipses) is evidence that the motion in FIG. 17 is more severe than the motion in FIGS. 15 and 16, with the ellipse fitting heuristic being less able to precisely define the upper ellipse representing the upper torso of the occupant 106.

III. Disablement Processing

As illustrated in FIG. 11, an indication of a "crash" condition at 294 (e.g. a mode of either crash 334 or pre-crash breaking) results in the performance of various disablement processing 295 in the form of one or more disablement heuristics. As indicated in FIG. 5, two examples of disablement heuristics are an At-Risk-Zone detection heuristic ("ARZ heuristic") performed by an At-Risk-Zone Detection Subsystem ("ARZ subsystem") 224 and an impact assessment heuristic performed by an impact assessment subsystem 222. Both the impact assessment subsystem 222 and the ARZ subsystem 222 can generate disablement flags indicating that although a crash has occurred, it may not be desirable to deploy the safety restraint device. The ARZ subsystem 224 can set an At-Risk-Zone disablement flag 230 to a value of "yes" or "disable" when the occupant 106 is predicted to be within the At-Risk-Zone at the time of the deployment. Similarly, the impact assessment subsystem 222 can set an impact assessment disablement flag 228 to a value of "yes" or "disable" when the occupant 106 is predicted to impact the deploying safety restraint device with such a severe impact that the deployment would be undesirable.

A. Impact Assessment

FIG. 18 is an input-output diagram illustrating an example of the types of inputs and outputs that relate to an impact assessment subsystem 222. In a preferred embodiment, the impact assessment subsystem 222 is not invoked unless and until an affirmative crash determination 296 has been made. Some or all of the occupant characteristics 190 discussed above, including information relating to the various shape states and motion modes can also be used as input.

The outputs of the impact assessment subsystem 222 can include an impact assessment metric. In a preferred embodiment, the impact assessment metric 360 is a kinetic energy numerical value relating to the point in time that the occupant 106 is estimated to impact into the deploying safety restraint. In alternative embodiments, momentum, or a weighted combination of kinetic energy and momentum can be used as the impact metric. Alternative embodiments can utilize any impact metric incorporating the characteristics of mass, velocity, or any of the other motion or shape variables, including any characteristics that could be derived from one or more motion and/or shape variables. In some alternative embodiments, the impact assessment metric could be some arbitrary numerical construct useful for making impact assessments.

The impact assessment subsystem 222 uses the shape and motion variables above to generate the impact metric 360 representing the occupant 106 impact that an airbag, or other safety restraint device, needs to absorb.

If the impact assessment metric 360 exceeds an impact assessment threshold value, then the impact disablement flag 228 can be set to a value of "yes" or "disable." In some embodiments, the impact assessment threshold is a pre-defined value that applies to all occupants 106. In other embodiments, the impact assessment threshold is a "sliding scale" ration that takes into consideration the characteristics of the occupant 106 in setting the threshold. For example, a larger person can have a larger impact assessment threshold than a smaller person.

In some embodiments of the system 100, the impact assessment can be associated with an impact assessment confidence value 362. Such a confidence value 362 can take into consideration the likely probabilities that the impact assessment metric 360 is a meaningful indicator as generated, in the particular context of the system 100.

Three types of occupant characteristics 190 are commonly useful in generating impact assessment metrics 360. Such characteristics 190 are typically derived from the images captured by the sensor 134, however, alternative embodiments may include additional sensors specifically designed to capture information for the impact assessment subsystem 222. The three typically useful attributes are mass, volume, and width.

1. Mass

As disclosed in Equation 43 below, mass is used to compute the impact metric. The density of a human occupant 106 is relatively constant across broad spectrum of potential human occupants 106. The average density of a human occupant 106 is known in the art as anthropomorphic data that can be obtained from NHTSA (National Highway Traffic Safety Administration) or the IIA (Insurance Institute of America). The mass of an occupant 106 is substantially a function of volume.

$$\text{Mass} = \text{Volume} * \text{Density} \qquad \text{Equation 43:}$$

In a preferred embodiment, the system 100 determines whether or not the occupant 106 is restrained by a seat belt. This is done in by comparing the velocity (x') of the occupant 106 with the rate of change in the forward tilt angle (θ'). If the occupant is restrained by a seat belt, the rate of change in the forward tilt angle should be roughly two times the velocity of the occupant 106. In contrast, for an unbelted occupant, the ratio of θ'/x' will be roughly zero, because there will be an insignificant change in the forward tilt angle for an unbelted occupant. If an occupant 106 is restrained by a functional seatbelt, the mass of the occupant's 106 lower torso should not be included in the impact metric of the occupant 106 because the mass of the lower torso is restrained by a seal belt, and thus that particular portion of mass will not need to be constrained by the safety restraint deployment mechanism 120. If the occupant 106 is not restrained by a seatbelt, the mass of the lower torso needs to be included in the mass of the occupant 106. Across the broad spectrum of potential human occupants 106, the upper torso is consistently between 65% and 68% of the total mass of a human occupant 106. If the occupant 106 is not restrained by a seat belt in a preferred embodiment, the mass of both the occupant 106 (including the lower torso) is calculated by taking the mass of the upper torso and dividing that mass by a number between 0.65 and 0.68. A preferred embodiment does not require the direct calculation of the volume or mass of the lower ellipse 252.

The volume of an ellipsoid is well known in the art.

$$\text{Volume} = 4/3 * \pi * \text{major} * \text{minor}_1 * \text{minor}_2 \qquad \text{Equation 44:}$$

Major is the major axis 260. $\text{Minor}_1$ is the minor axis 262. The 2-D ellipse is known to be a projection from a particular angle and therefore allows the system 100 to decide what the originating 3-D Ellipsoid should be. Shape characteristics tracked and predicted by the shape tracker and predictor module 212 can be incorporated into the translation of a 3-D ellipsoid from a 2-D ellipse. In a preferred embodiment, the "width" of the ellipsoid is capped at the width of the vehicle seat 108 in which the occupant 106 sits. The width of the vehicle seat 108 can be easily measured for any vehicle before the system 100 is used for a particular vehicle model or type.

$\text{Minor}_2$ is derived from the major axis 260 and the minor axis 262. Anthropomorphic data from NHTSA or the Insurance Institute of America is used to create electronic "look-up" tables deriving the z-axis information from the major axis 260 and minor axis 262 values.

FIGS. 19a, 19b, and 19c illustrate different formats of a "look-up" table that could be electronically stored in the enhancement device 112. These tables can be used to assist the impact assessment subsystem 22 to generate impact assessment metrics 360.

2. Velocity

Velocity is a motion characteristic derived from the differences in occupant 18 position as described by Newtonian mechanics and is described in greater detail above. The relevant measure of occupant 18 velocity is the moment of impact between the occupant 106 and the airbag (or other form of safety restraint device). The movement of the airbag towards the occupant 106 is preferably factored into this analysis in the preferred embodiment of the system 100.

$$\int Velocity_{occupant} \delta t = \int Velocity_{airbag} \delta t \quad \text{Equation 45:}$$

3. Additional Alternative Variations and Embodiments

The underlying calculations of motion and shape variables can be updated very quickly using the outputted state transition matrix which allows the system 100 to predict the position and shape in advance, and at a rate more quickly than the rate in which the sensor 134 collects data. The impact metric prediction is thus similarly updated at a quicker rate than the rate at which the sensor 134 collects data. In alternative embodiments of the invention that classify the occupant 106 into different occupant types, each occupant type could have a distinct density. In a preferred embodiment, the impact assessment subsystem 222 is not invoked until after a crash condition is detected, or the probability of a crash condition is not lower that some predefined cautious threshold.

B. At-Risk-Zone Detection

Returning to FIG. 5, the At-Risk-Zone detection subsystem 224 is disclosed sending the At-Risk-Zone flag 230 to the safety restraint controller 118. Like all disablement flags, some disablement flags are "mandatory" in certain embodiments of the system 100, while other disablement flags in other system embodiments are "discretionary" or "optional" with final control residing within the safety restraint controller 118.

1. Input-Output View

Figure 20:
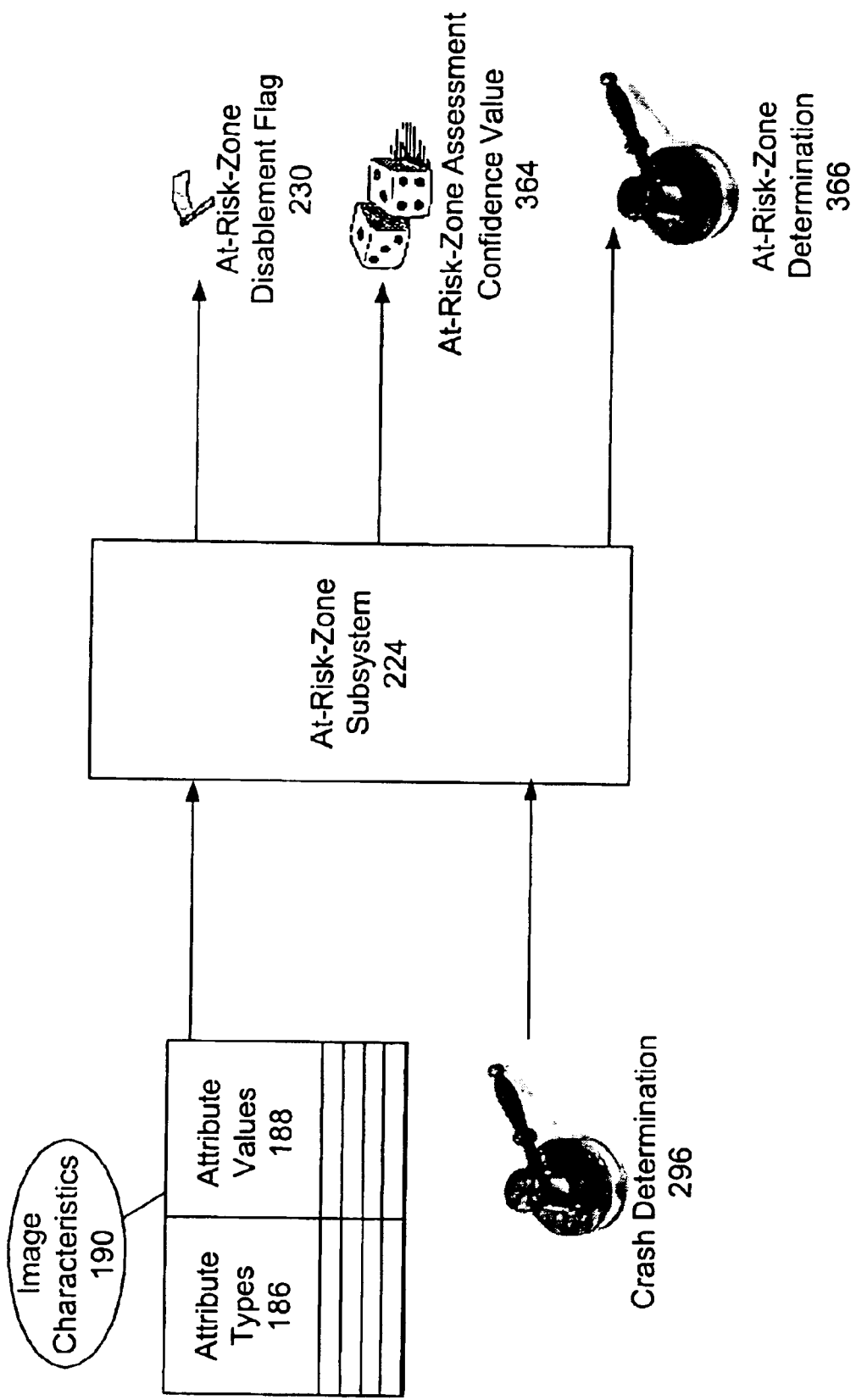
FIG. 20 is an input-output diagram illustrating an example of the types of inputs and outputs that relate to an at-risk-zone detection subsystem.

FIG. 20 is an input-output diagram illustrating an example of the types of inputs and outputs that relate to an at-risk-zone detection subsystem 224. As illustrated in the diagram, the inputs for the ARZ detector subsystem 224 are the various occupant characteristics 190 (including the probabilities associated with the various state and mode models) and the crash determination 296. In a preferred embodiment, the ARZ detector subsystem 224 is not invoked until after the crash determination 296 is generated.

The primary output of the ARZ detector subsystem 224 (which can also be referred to as a detection subsystem 224) is an At-Risk-Zone determination 366. The outputs of the ARZ detector subsystem 224 can also include an At-Risk-Zone disablement flag 230 that can be set to a value of "yes" or "disable" in order to indicate that at the time of deployment, the occupant 106 will be within the At-Risk-Zone. In some embodiments, the At-Risk-Zone assessment is associated with a confidence value 364 utilizing some type of probability value.

2. Process Flow View

Figure 21:
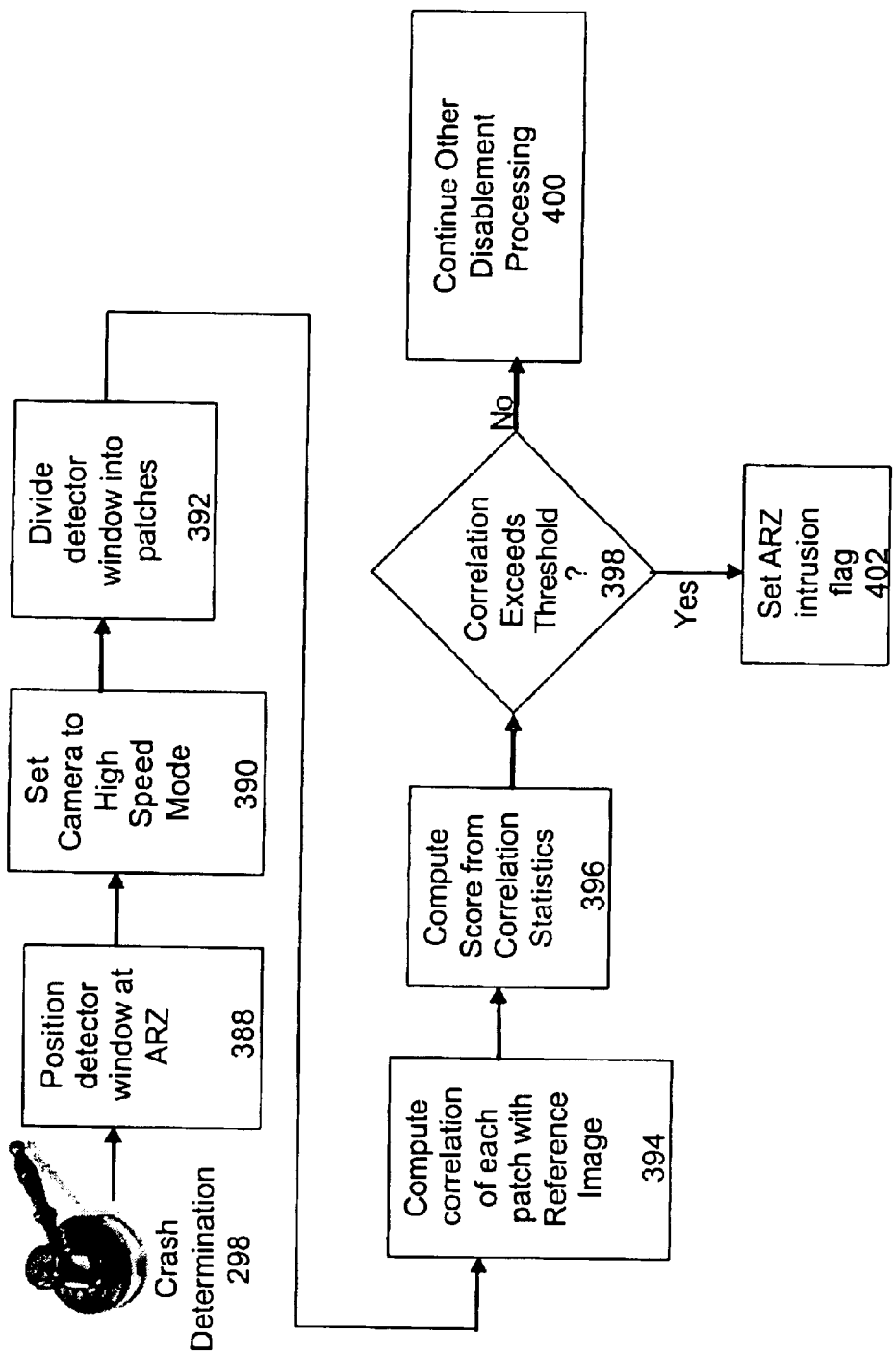
FIG. 21 is a flow chart illustrating an example of an at-risk-zone detection heuristic that can be performed by the at-risk-zone detection subsystem.

FIG. 21 is a flow chart illustrating an example of an At-Risk-Zone detection heuristic that can be performed by the At-Risk-Zone detection subsystem 224.

At 388, the input of the crash determination 298 is used to invoke the creation of a detector window for the At-Risk-Zone. As discussed above, in a preferred embodiment, the ARZ detection subsystem 224 is not invoked unless there is some reason to suspect that a crash or pre-crash breaking is about to occur. In alternative embodiments, ARZ processing can be performed without any crash determination 298, although this may result in the need for more expensive electronics within the decision enhancement device 112.

Figure 22:
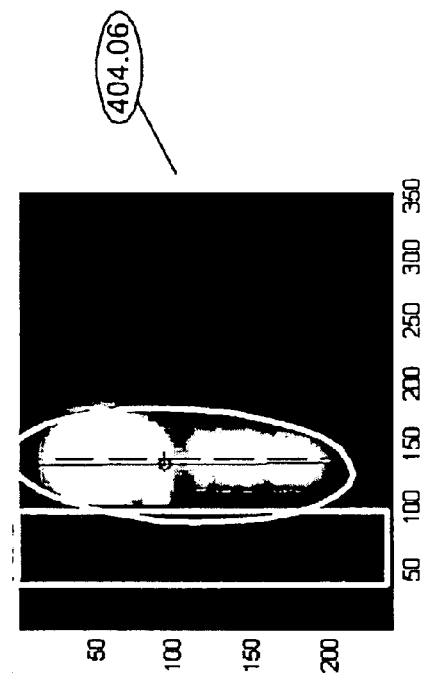
FIG. 22 is a block diagram illustrating an example of a detection window where the occupant is not within the at-risk-zone.
Figure 23:
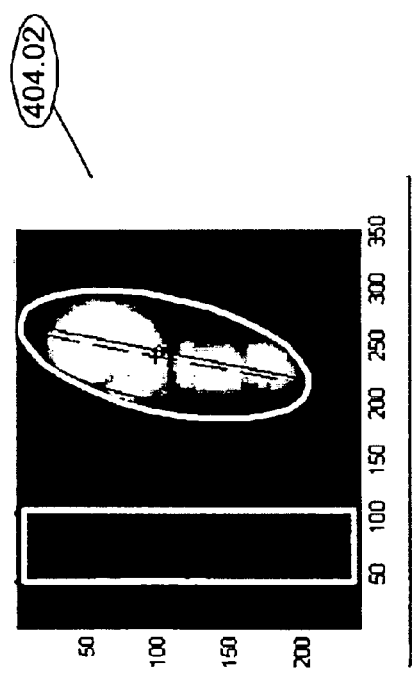
FIG. 23 is a block diagram illustrating an example of a detection window that includes an occupant who is closer to that at-risk-zone than the occupant of FIG. 22.
Figure 24:
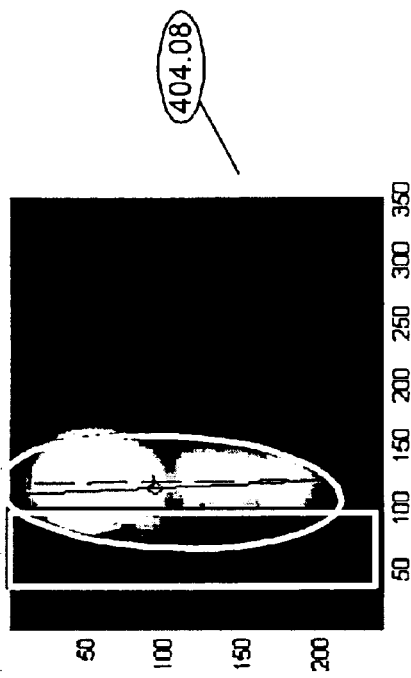
FIG. 24 is a block diagram illustrating an example of a detection window where the occupant is just about to cross the at-risk-zone.
Figure 25:
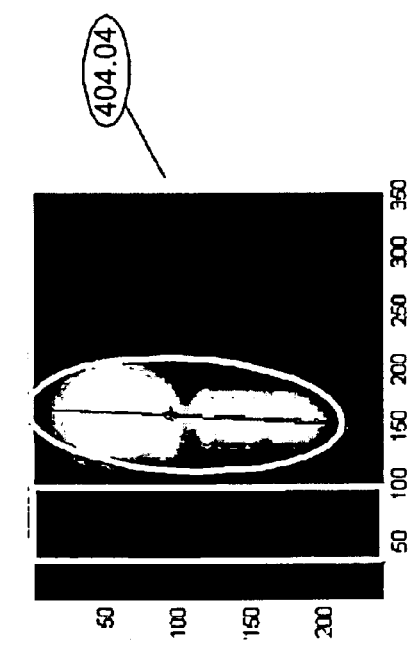
FIG. 25 is a block diagram illustrating an example of a detection window with an occupant who has crossed into the at-risk-zone as determined by the correlation metric.

In a preferred embodiment, the ARZ is predefined, and takes into consideration the internal environment of the vehicle 102. In this process step, a window of interest is pre-defined to enclose the area around and including the At Risk Zone. The window is intentionally set slightly towards the occupant in front of the ARZ to support a significant correlation statistic. FIGS. 22–25 illustrate an example of the detection window. The detection window is represented by the white rectangle to the part of the vehicle 102 in front of the occupant 106. Subsequent processing by the ARZ heuristic can ignore image pixels outside of the window of interest. Thus, only the portions of the ellipse (if any) that are within the window of interest require the system's attention with respect to ARZ processing. In FIG. 22, the occupant 106 is in a seated position that is a significant distance from the window of interest. In FIG. 23, the occupant 106 is much closer to the ARZ, but is still entirely outside the window of interest. In FIG. 24, a small portion of the occupant 106 is within the window of interest, and only that small portion is subject to subsequent processing for ARZ purposes in a preferred embodiment. In FIG. 25, a larger portion of the occupant 106 resides within the window of interest, with the occupant 106 moving closer to the window of interest and the ARZ as the position of the occupant 106 progresses from FIGS. 22 through 35.

At 390, the sensor 134 (preferably a video camera) can be set from a low-speed mode (for crash detection) to a high speed mode for ARZ instrusion detection. Since the ARZ heuristics can ignore pixels outside of the window of interest, the ARZ heuristic can process incoming images at a faster frame rate. This can be beneficial to the system 100 because it reduces the latency with which the system 100 is capable of detecting an intrusion into the ARZ. In a typical embodiment, the "low-speed" mode of the video camera captures between approximately 5–15 (preferably 8) frames per second. In a typical embodiment, the "high-speed" mode of the video camera captures between approximately 20–50 (preferably 30–40) frames per second.

At 392, the ARZ heuristic can divide the detector window (e.g. window of interest) into patches 152. In this step the incoming image in the region of the ARZ detector window is divided into N×M windows where M is the entire width of the detector window and N is some fraction of the total vertical extent of the window. The purpose of processing at 392 is to allow the ARZ heuristic to compute the correlation between the incoming ambient image 136 and a reference image in "bands" (which can also be referred to as "strings") which improves system 100 sensitivity. Reference images are images used by the system 100 for the purposes of comparing with ambient images 136 captured by the system 100. In a preferred embodiment, references images are captured using the same vehicle enterior 102 as the vehicle utilizing the system 100. In alternative embodiments, reference images may be captured after the system 100 is incorporated into a vehicle 102. For example, after the occupant 106 leaves the vehicle 102, a sensor reading of an empty seat 108 can be captured for future reference purposes.

The processing at 392 allows a positive detection to be made when only a portion of the ARZ detection window is filled as is the case in FIGS. 24 and 25 where only the occupant's head is in the detection window and there is no change in the lower half of the window. In a preferred embodiment, the reference image is that of a empty occupant seat 108 corresponding to a similar vehicle 102 interior. Such a reference image can also be useful for segmentation and occupant-type classifying heuristics. In alternative embodiments, the reference image can be the image or sensor reading received immediately prior the current sensor reading.

At 394, the system 100 generates a correlation metric for each patch 152 with with respect to the reference image using one of a variety of correlation heuristics known in the art of statistics. This process step can include the performance of a simple no-offset correlation heuristic between the reference image and the incoming window of interest image.

At 396, a combined or aggregate correlation metric is calculated from the various patch-level correlation metrics generated at 394. The individual scores for each of the sub-patches in the ARZ detection window provide an individual correlation value. All of these values must then be combined in an optimal way to minimize false alarms and maximize the detection probability. In embodiments where the ARZ heuristic is only invoked after a crash determination 296 (or at least a greater than X % likelihood of being in a state of crash of pre-crash breaking), the likelihood of a false alarm is less than in a normal detection situation so the correlation threshold can be set lower to ensure a higher probability of detection.

At 398, the aggregate correlation metric from 396 is compared to a test threshold value that is typically predefined.

If the correlation metric exceeds the test threshold value, the system 100 can at 402 can set the ARZ disablement flag to a value of "yes" or "disable" to indicate that the occupant 106 is believed to be within the ARZ. As discussed above, in some embodiments, the setting of the flag is "binding" on the safety restraint controller 118, while in other embodiments, the safety restraint controller 118 can utilize the information to generate an independent conclusion. As discussed above, it is preferable that the detection window be defined so that it is slightly in front of the ARZ. The relative time of the initial excessive motion is known and the number of frames are known until the occupant has entered the ARZ Detection Window, and the relative distance from the initial point of the occupant 116 to the ARZ detection window is known from the Multiple Model Tracker, it is possible to estimate the speed of the occupant 106 and provide some predictive capability for the system 100 as well. In other words, since the occupant 106 has not yet entered the ARZ and the system 100 knows their speed, the system 100 can predict the time to entry and send an ARZ Intrusion Flag 230 in anticipation to the safety restraint controller 118. This allows the system 100 to remove some of the overall system latency in the entire vehicle due to vehicle bus (e.g. vehicle computer device(s)) latencies and the latency in the decision enhancement device 112 and the safety restraint controller 118. In other words, by setting the window of interest closer to the occupant 106 than the ARZ, the timing of decisions generated by the system 100 can compensate for a slower processing architecture incorporated into the system 100.

3. Subsystem-Level Views for ARZ Embodiments

Figure 26:
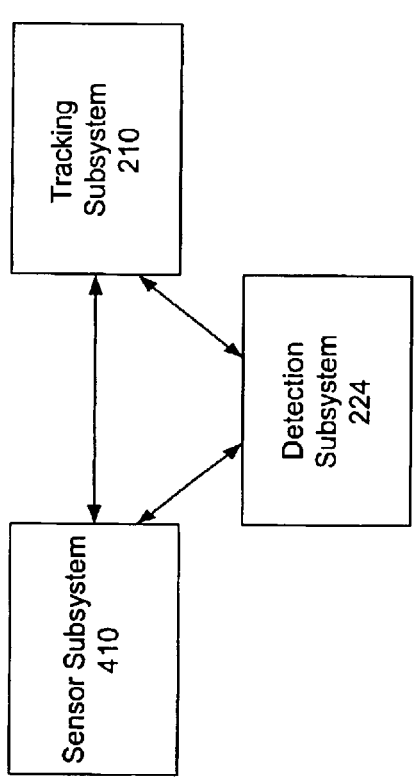
FIG. 26 is a subsystem-level view illustrating an example of an at-risk-zone detection embodiment of the decision enhancement system.

FIG. 26 is a subsystem-level view illustrating an example of an at-risk-zone detection embodiment of the decision enhancement system 100.

a. Sensor Subsystem

A sensor subsystem 410 can include the one or more sensors 134 used to capture sensor readings used by the tracking and predicting heuristics discussed above. In a preferred embodiment, there is only one sensor 134 supporting the functionality of the decision enhancement system 100. In a preferred embodiment, the sensor 134 is a standard video camera, and is used in a low-speed mode by a tracking subsystem 210 and is used in a high-speed mode by the ARZ detection subsystem ("detection subsystem" 224). The sensor subsystem 410 need not coincide with the physical boundaries of the sensor component 126 discussed above.

b. Tracking Subsystem

The tracking and predicting subsystem ("tracking subsystem") 210 is discussed in detail above, and is illustrated in FIG. 5. The tracking subsystem 210 is responsible for tracking occupant characteristics 190, and preferably includes making future predictions of occupant characteristics 190. The tracking subsystem 210 processes occupant information in the context of various "conditions" such as the "states" and "modes" discussed above. Such conditions are preferably predetermined, and probability-weighted. When the tracking subsystem 210 determines that the occupant 106 is in a condition of crashing, pre-crash breaking, or is otherwise on the threshold of potentially requiring the deployment of the safety restraint mechanism 120 (collectively "deployment situation"), the tracking subsystem 210 can initiate the processing performed by the detection subsystem 224. The tracking subsystem 210 can also initiate the switch in the sensor 134 from a low-speed mode to a high-speed mode.

c. Detection Subsystem

The detection subsystem 224 and the various detection heuristics are discussed in detail above. The detection subsystem 224 can be configured in a wide variety of different ways, with certain variables such as the location and size of the At-Risk-Zone being configured to best suit the particular vehicle 102 environment in which the decision enhancement system 100 is being utilized. Various iterations of the detection heuristics that can be performed by the detection subsystem 224 are disclosed in the patent application titled "IMAGE PROCESSING SYSTEM FOR DYNAMIC SUPPRESSION OF AIRBAGS USING MULTIPLE MODEL LIKELIHOODS TO INFER THREE DIMENSIONAL INFORMATION" (Ser. No. 09/901,805) that was filed on Jul. 10, 2001, and is hereby incorporated by reference in its entirety.

d. Category Subsystem

Figure 27:
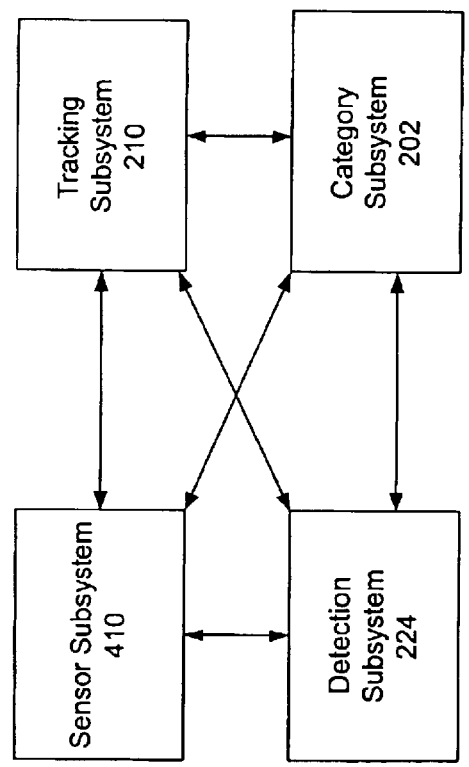
FIG. 27 is a subsystem-level view illustrating an example of an at-risk-zone detection embodiment of the decision enhancement system.

FIG. 27 is a subsystem-level view illustrating an example of an at-risk-zone detection embodiment of the decision enhancement system 100 that includes a category subsystem 202. As discussed above and in the patent application titled "SYSTEM OR METHOD FOR CLASSIFYING IMAGES" (Ser. No. 10/625,208) that was filed on Jul. 23, 2003 and is herein incorporated by reference in its entirety, the disablement of the safety restraint can be based on the type of occupant 106 sitting in the seat 108. For example, deployment of an airbag can be undesirable when the occupant 106 is an infant, child, or even a small adult. In a preferred embodiment, there are a number of predefined occupant-types between which the system 100 can distinguish in its decision making.

e. Integrated Decision Making

Although various functions performed by the system 100 such as occupant tracking, crash determination, impact assessment, ARZ detection, and occupant-type classification, the system 100 can incorporate certain conclusions into the processing of other conclusions. For example, it may be desirable to take into consideration the probability of crash in determining whether the ARZ flag 230 should be set to a value of "yes" or "disable." If the system 100 is relatively unsure about whether a crash has occurred (e.g. the probability associated with a crash condition is just barely at the predefined threshold value), the "borderline" conclusion can be used to properly evaluated impact assessment, ARZ detection, and even occupant-type classification processing as well as the results of those processes.

4. Implementation Methodology

Figure 28:
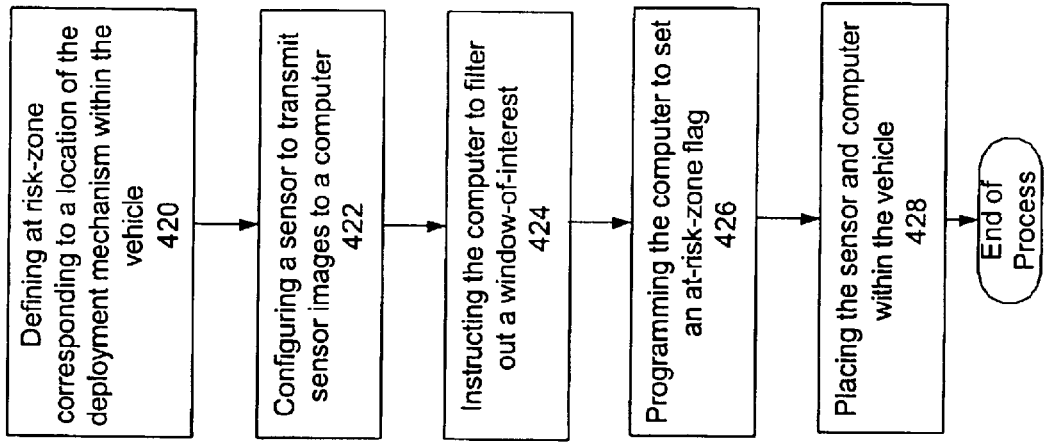
FIG. 28 is a flow chart diagram illustrating an example of a decision enhancement system being configured to provide at-risk-zone detection functionality.

FIG. 28 is a flow chart diagram illustrating an example of a decision enhancement system 100 being configured to provide At-Risk-Zone detection functionality.

At 420, the At-Risk-Zone is defined to correspond to a location of the deployment mechanism 120 within the vehicle 102. In some embodiments, this may also correspond to the location of the safety restraint controller 118.

At 422, the sensor 134 is configured for transmitting sensor readings to the decision enhancement device 422. The sensor configuration in a preferred embodiment is discussed below, in a component-level view of the system 100.

At 424, one or more computer components within the decision enhancement device 112 are programmed to filter out a window-of-interest. The window-of-interest should preferably be defined to be slightly in front to the ARZ so that the system 100 has sufficient time to react to a predicted ARZ intrusion.

At 426, one or more computer components with the decision enhancement device 112 are programmed to set at At-Risk-Zone flag if the component(s) determines that the occupant 106 would be within the At-Risk-Zone at the time of deployment. This determination can be "binding" or merely "discretionary" with respect to the safety restraint controller 118.

At 428, the decision enhancement device 112 including the sensor 134 and other components is installed within the vehicle 102 in accordance with the contextual information leading up to the definition of the At-Risk-Zone within the vehicle 102.

IV. Component-Based Views of The Decision Enhancement System

A. Component-Based Subsystem-Level Views

Figure 29:
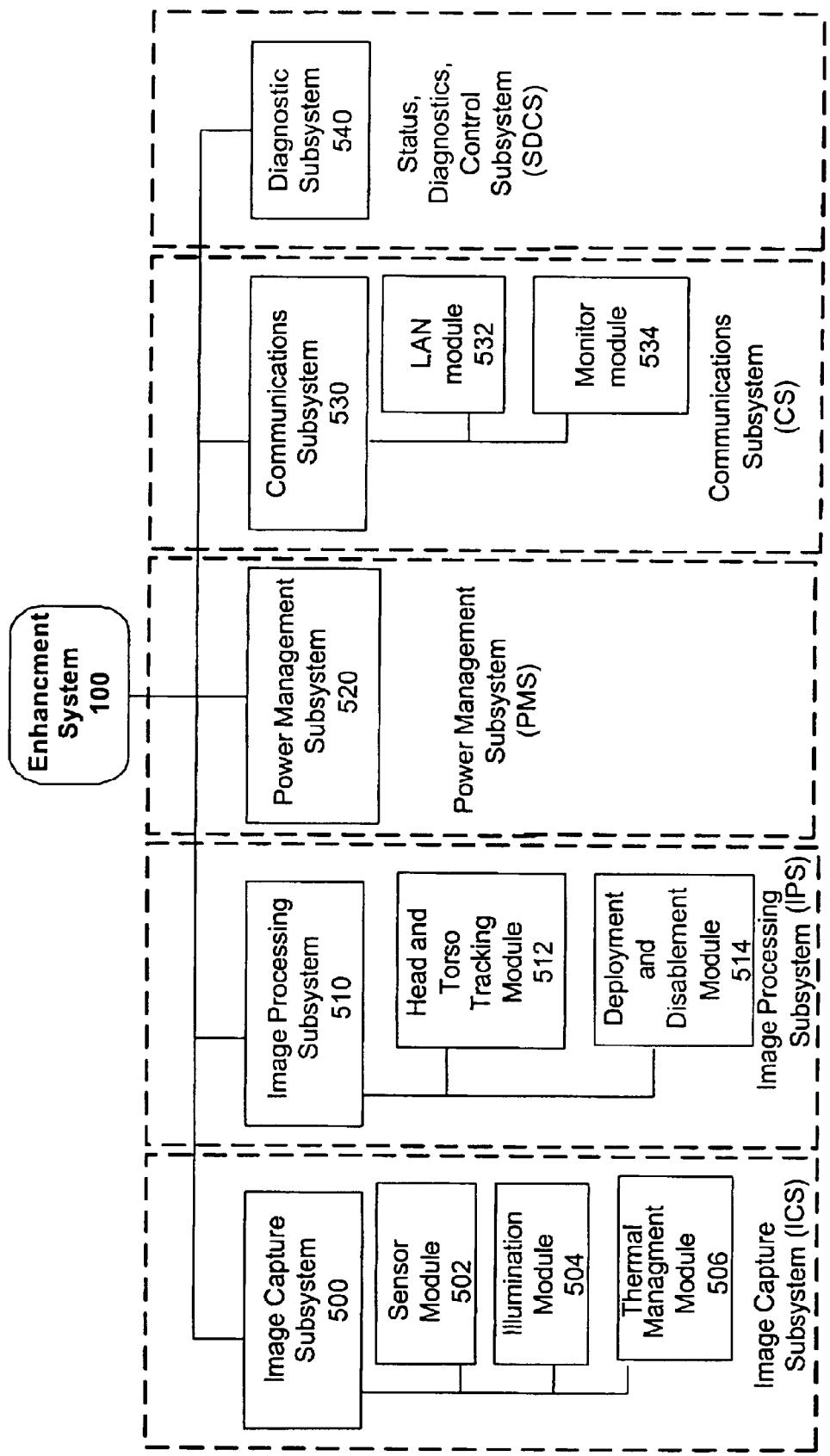
FIG. 29 is a component-based subsystem-level diagram illustrating an example of the some of the components that can be included in the decision enhancement system.

FIG. 29 is a component-based subsystem-level diagram illustrating an example of the some of the components that can be included in the decision enhancement system.

The decision enhancement system 100 can be composed of five primary subsystems: an image capture subsystem (ICS) 500; an image processing subsystem (IPS) 510; a power management subsystem (PMS) 520; a communications subsystem (CS) 530; and a status, diagnostics, control subsystem (diagnostic subsystem or simply SDCS) 540.

1. Image Capture Subsystem

The image capture subsystem 500 can include: a sensor module 502 for capturing sensor readings; an illumination module 504 to provide illumination within the vehicle 504 to enhance the quality of the sensor readings; and a thermal management module 506 to take either manage or take into consideration the impact of heat on the sensor 134. The ICS 500 preferably uses a custom state-of-the-art CMOS imager providing on-chip exposure control, pseudo-logarithmic response and histogram equalization to provide high-contrast, low-noise images for the IPS 510. The CMOS imager can provide for the electronic adding, subtracting, and scaling of a polarized signal (e.g. a "difference" image).

The interior vehicle 102 environment can be one of the most difficult for image collection. The environment includes wide illumination levels, high clutter (shadows), and a wide temperature range This environment requires the imager to have wide dynamic range, low noise thermal noise, fast response to changing illumination, operation in dark conditions, and high contrast images. These characteristics are achieved in the system 100 by incorporating on-chip exposure control, pseudo-logarithmic response and histogram equalization. The imager can operate at modest frame rates (30–40 Hz) due to the predictive nature of the tracking and predicting heuristics. This is a significant advantage (lower data rates, less data, longer exposure time) over non-predictive systems would require frame rates up to 1000 hz to meet the ARZ intrusion timing requirements.

The large range of occupant positions, sizes and the limited system locations possibilities created a requirement for a very wide angle lens. A custom lens design was undertaken to generate a lens which has a 130 degree horizontal by 100 degree vertical field-of-view (FOV). This FOV is made slightly oversized to accommodate routine mounting uncertainties in the vehicle installation process. The lens has specific requirements for modulation transfer function (MTF) and image distortion important for forming high contrast images with the least amount of deformity over the wide spectral band of the system 100.

Operation in dark conditions typically requires the use of infrared illumination. The particular wavelength selected (880 nm) is a compromise in the tradeoff between matching the imager spectral sensitivity, minimizing distraction to the occupant, and using currently available LED (light emitting diode) technology. A key feature of the system 100 is the design of the illuminator. A preferred embodiment of the design incorporates a cylindrical shape in the vertical axis. In some embodiments, a distribution of LED's which directs more light to the extremes of the image is used. For example an LED configuration of 8-6-4-4-6-8 (with each number representing the number of LED's in a particular row) could provide more light at the outside extremities (8 LED's per row on the outer extremes) than for the center of the image (there would only be 4 LED's per row in the inner two rows). In a preferred embodiment, 5 rows of 4 LED's are used. The illuminator preferably incorporates a diffusing material which more evenly distributes the LED output while providing a larger apparent source size which is important for eye-safety. A requirement for the illuminator is that is must be safe for the occupant 106 by meeting eye and skin safe exposure standards. This requirement is met with this design through mechanical means (diffuser) and electrically via over-current protection and electromagnetic compatibility (EMC) immunity. Reliability can be improved through randomization of the electrical drive circuit thus preventing a large portion of the image from being darkened in the case of the failure of a group of LED's.

The ICS 500 includes the sensor component 127 discussed above. It can also include the illumination component 128 discussed above. A portion of the analysis component 124 discussed above is part of the ICS 500.

B. Image Processing Subsystem

The image processing subsystem 510 can include a head and torso tracking module 512 that provides the functionality of the tracking and predicting subsystem 210 discussed above. The image processing subsystem 514 can also include a deployment and disablement module 514 to house the deployment and disablement heuristics discussed above.

In a preferred embodiment, the IPS 510 is comprised of a digital signal processor (DSP) and local memory. The configuration of using a DSP coupled with local memory that is distinct from the analysis component 124 discussed above can be a desirable architecture for timely processing. The IPS 510 provides for object segmentation, classification, tracking, calibration, and image quality. The IPS 510 is also typically the interface to the communication subsystem 530.

The IPS executes the various imaging processing heuristics discussed above. The heuristics are initially stored in flash memory and loaded by the MCU (microcontroller unit) into the DSP during initialization. This boot method allows the system to be updated through the external communications bus providing the ability to accommodate upgrades and changes to occupant types (child and infant seats for example) or federal requirements. The IPS uses a pipelined dual processor/internal dual-port RAM DSP coupled to external SRAM. This architecture allows for efficient processing with intermediate results and reference images stored in external memory.

C. Power Management Subsystem

The power management subsystem 520 provides incoming power conditioning, transient suppression, and power sequencing for starting and shutting down the system 100 and potentially one or more of the automated applications for the vehicle 102.

The power management subsystem 520 provides the interface to the vehicle power source, watchdog and reset function for the microcontroller unit (MCU) and reserve power during a loss of power situation. The vehicle interface includes the typical automotive requirements, under/over voltage, reverse polarity, double voltage, load-dump, etc. The watchdog expects a timed reset from the MCU, lack of which causes the system 100 to reset. The reserve power maintains operation of the MCU and communications after power loss to allow for possible reception of a crash notification and subsequent recording of last transmitted classification and ARZ intrusion status.

The power management subsystem (PMS) 520 can include one or more power components 122 as discussed above.

D. Communications Subsystem

The communications subsystem (CS) 530 provides communication over a bus to the vehicle controller and uses the system microcontroller unit (MCU) resource. The communications subsystem (CS) 530 can include a vehicle 102 local area network (LAN) module 532 and a monitor module 534 for accessing the various components of the decision enhancement device 112 while they are installed in the vehicle 102.

Occupant characteristics 190 such as classification-type, ARZ intrusion status, impact assessment, other disablement information, and/or deployment information can be communicated by the CS 530 to the safety restraint controller 118 through the MCU (part of the CS) to the vehicle controller area network (CAN) bus. A CAN is an information technology architecture comprised of independent, intelligent modules connected by a single high-speed cable, known as a bus, over which all the data in the system flows. While this protocol has some inherent and non-deterministic delay, the predictive nature of the ARZ intrusion heuristic accommodates the delay while meeting the NHTSA ("National Highway Transportation Safety Administration") airbag suppression delay specification. Tracking and predicting data can also transmitted at a lower rate over the bus. While the CAN bus is used in this implementation the communication of ARZ intrusion status is not limited to this technique. Any alternate transmission form providing verification feedback may be used. The CS 530 provides for transmission of unit identifier data, error conditions and reception of crash notification for recording of last transmitted classification and ARZ status.

E. Diagnostic Subsystem

The SDCS 540 provides for system 100 diagnostics, and controls the image and illuminator of the ICS 500. The functionality of the SDCS 540 includes monitoring: the accuracy of the sensor 134, the internal temperature within the various components of the enhancement device 112

B. Hardware Functionality View

Figure 30:
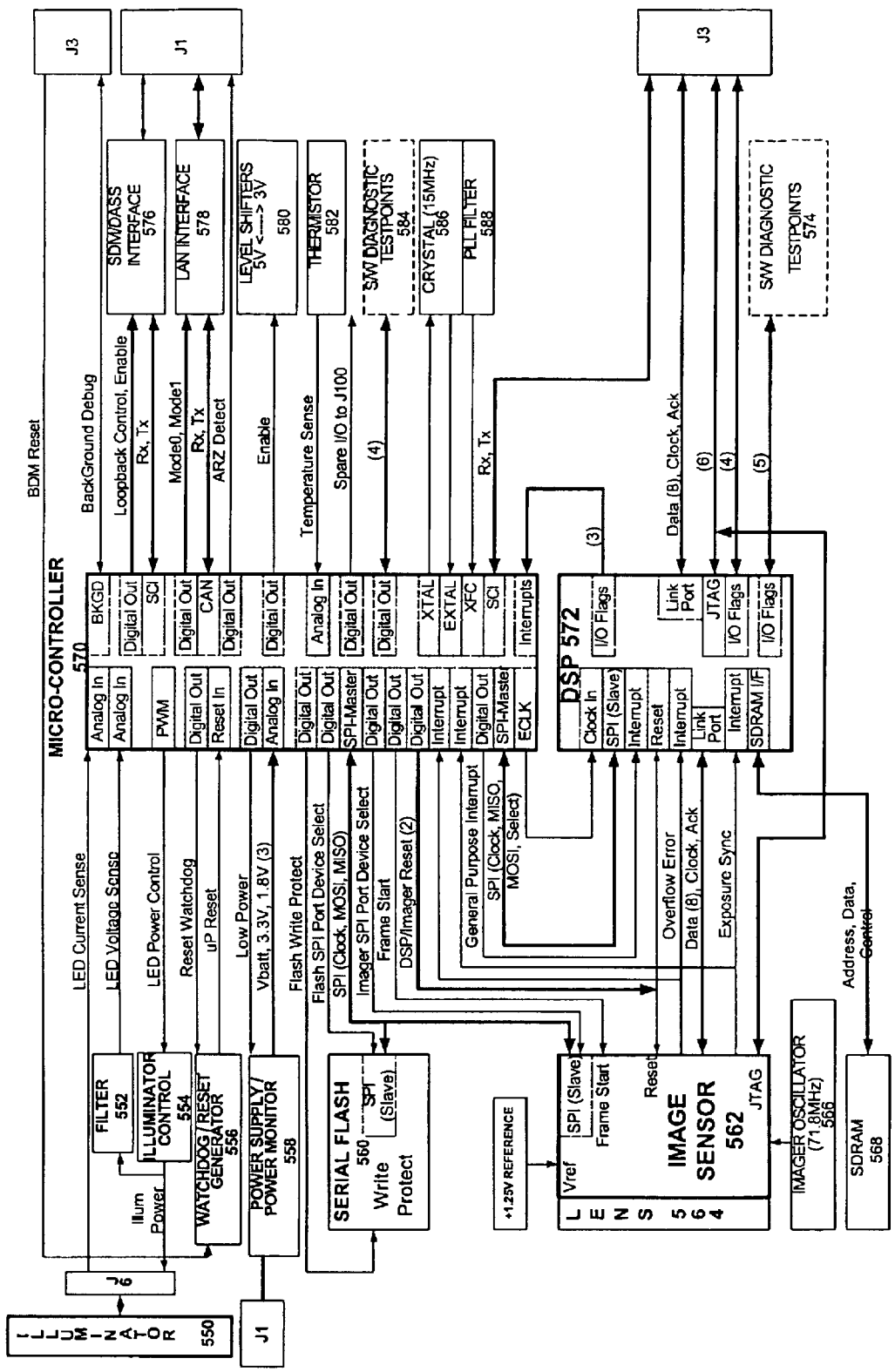
FIG. 30 is a hardware functionality block diagram illustrating an example of a decision enhancement system.

FIG. 30 is a hardware functionality block diagram illustrating an example of a decision enhancement system 100.

1. Infrared Illuminator

An infrared illuminator 550 can be used to illuminate the interior area 104 to facilitate better image quality. In a preferred embodiment, the illuminator 550 should operate at a wavelength that balances the following goals: matching the imager spectral sensitivity; minimizing the distraction to the occupant 105; and using commercially available "off-the-shelf" LED technology.

2. Filter

A filter 552 can be used to filter or regulate the power sent to the micro-controller unit 570.

3. Illuminator/Control

An illuminating control 554 is the interface between the micro-controller (MCU) 570 and the illuminator 550.

4. Watchdog/Reset Generator

A watchdog/reset generator 556 is part of the SDCS 540, and is responsible for "resetting" the system 100 as discussed above.

5. Power Supply/Power Monitor

A power supply/power monitor 558 supports the functionality of the PMS 520 discussed above.

6. Serial Flash

A serial flash component 560 is the flash memory unit discussed above. It serves as a local memory unit for image processing purposes.

7. Image Sensor

An image sensor 562 is the electronic component that receives the image through a lens 564. The sensor readings from the image sensor 562 are sent to the DSP 572. The image sensor 562 is part of the sensor component 126 and ICS 500 that are discussed above.

8. Lens

The lens 564 is the "window" to the outside world for an image sensor 562. As discussed above, the lens 564 should have a horizontal field-of-view (FOV) between about 100 degrees and 160 degrees (preferably 130 degrees) and a vertical FOV between about 80 degrees and 120 degrees (preferably 100 degrees).

9. Imager Oscillator

An imager oscillator 566 produces electric oscillations for the image sensor 562.

10. SDRAM

An SDRAM 568 is a local memory unit used by the DSC 572.

11. Micro-Controller

The micro-controller 570 is the means for communicating with the vehicle 102, and other devices on the vehicle 102 such as the safety restraint controller 118 and deployment mechanism 120. The micro-controller 570 operates in conjunction with the Digital Signal Processor (DSP) 572.

12. Digital Signal Processor

The DSP 572, unlike a microprocessor, is designed to support high-speed, repetitive, numerically intensive tasks used by the IPS 510 to perform a variety of image processing functions. It is the DSP 572 that sets various disablement flags, and makes other application-level processing decisions as discussed above. The DSP 572 is part of the analysis component 124 discussed above.

13. SDM/DASS Interface

An SDM/DASS Interface 576 is part of the SDCS 540 responsible for monitoring the performance of the sensor 134.

14. LAN Interface

A LAN interface 578 is part of the CS 530 that facilitates communications between the system 100 and the computer network on the vehicle 102.

15. Level Shifters

A voltage level shifter 580 is enabled by the used to control the voltage for the micro-controller 570 between 5 and 7 volts.

16. Thermistor

A thermistor 582 is used to monitor the temperature surrounding the various components of the system 100. It is part of the SDCS 540 discussed above.

17. S/W Diagnostic Testpoints

An S/W diagnostic testpoints 584 and 586 refers to a part of the SDCS 540 used to confirm the proper processing of software used by the system 100 by "testing" certain "reference points" relating to the software processing. The testpoints 584 for the micro-controller 570 are distinct from the testpoints 574 for the DSP 572.

18. Crystal

A crystal oscillator 586 can be used to tune or synthesize digital output for communication by the CS 530 to the other vehicle applications, such as the safety restraint controller 118.

19. PLL filter

A phase-locked loop filter (PLL filter 588) is used to perform the gradient calculations of the Kalman filter.

C. One Example of a Hardware Configuration

Figure 31:
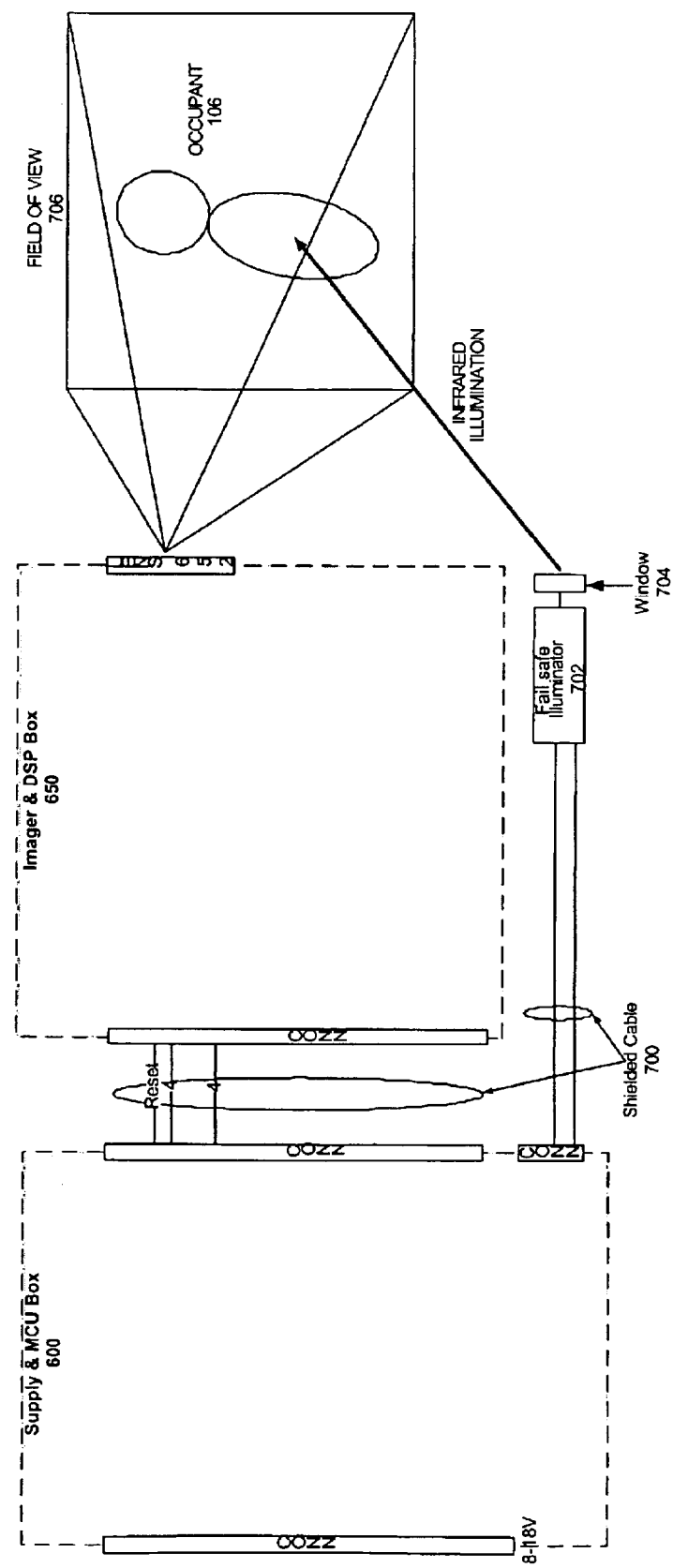
FIG. 31 is a hardware component diagram illustrating an example of a decision enhancement system made up of three primary components, a power supply/MCY box, an imager/DXP box, and an illuminator.

FIG. 31 is a hardware component diagram illustrating an example of a decision enhancement system made up of three primary components, a power supply/MCY box 600, an imager/DSP box 650, and a fail safe illuminator 702. The various components are connected by shielded cables 700. The fail safe illuminator 702 operates through a window 704, and generates infrared illumination for a field of view (FOV) 706 discussed above.

The configuration in FIG. 31 is just one example of how the different components illustrated in FIG. 2 can be arranged. In other embodiments, all of the different components of FIG. 2 can possess their own distinct component units or boxes within the system 100. On the other side of the continuum, all of the components in FIG. 2 can be located within a single unit or box.

1. Power Supply/MCU Box

Figure 32A:
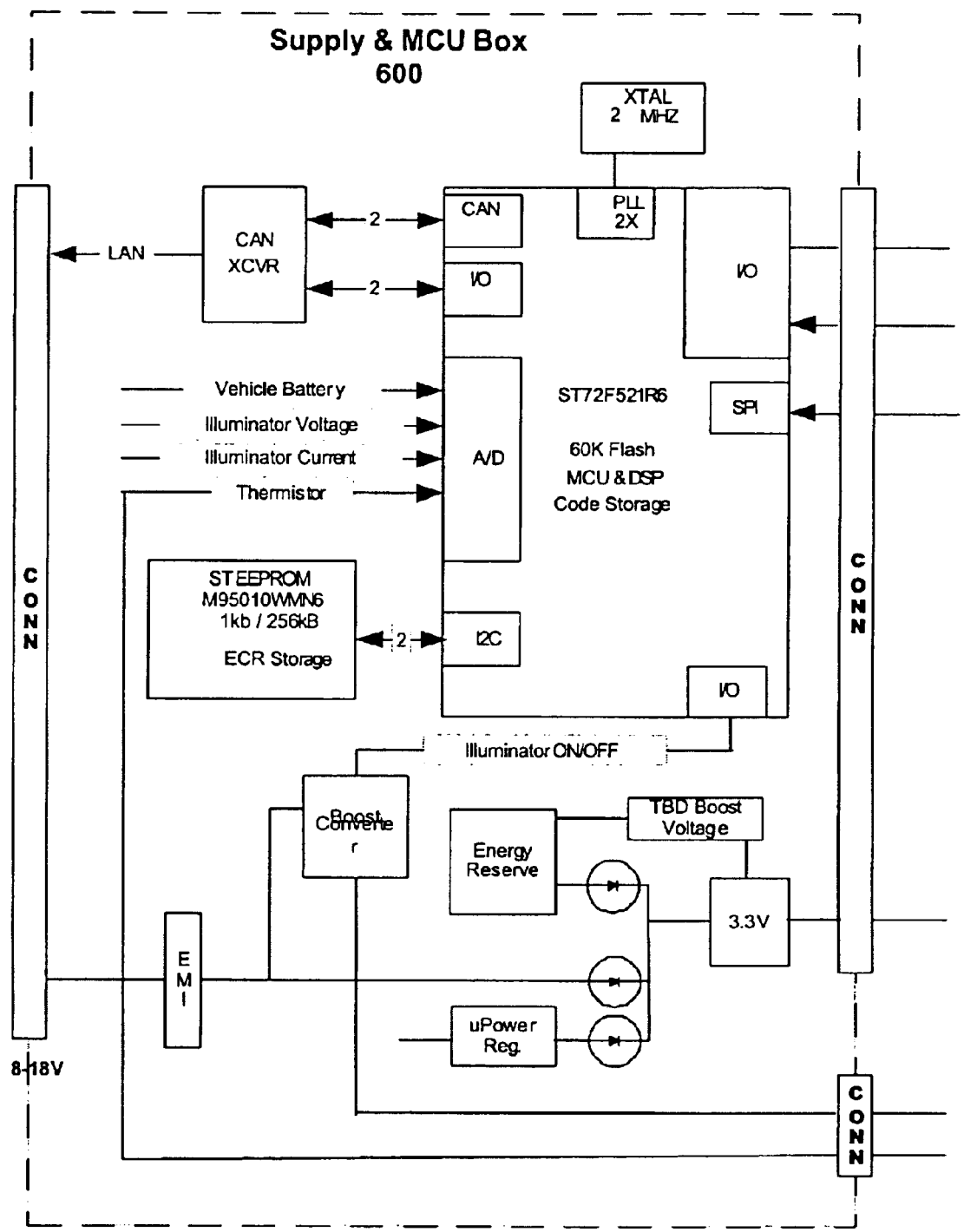
FIG. 32a is a detailed component diagram illustrating an example of a power supply/MCU box.

FIG. 32a is a detailed component diagram illustrating an example of a power supply/MCU box 600. The power supply/MCU box 600 includes the power component 122, analysis component 124, and communication component 126 discussed above. The power supply/MCU Box 600 also includes various diagnostic components 130 such as the thermistor 582.

2. Imager/DSP Box

Figure 32B:
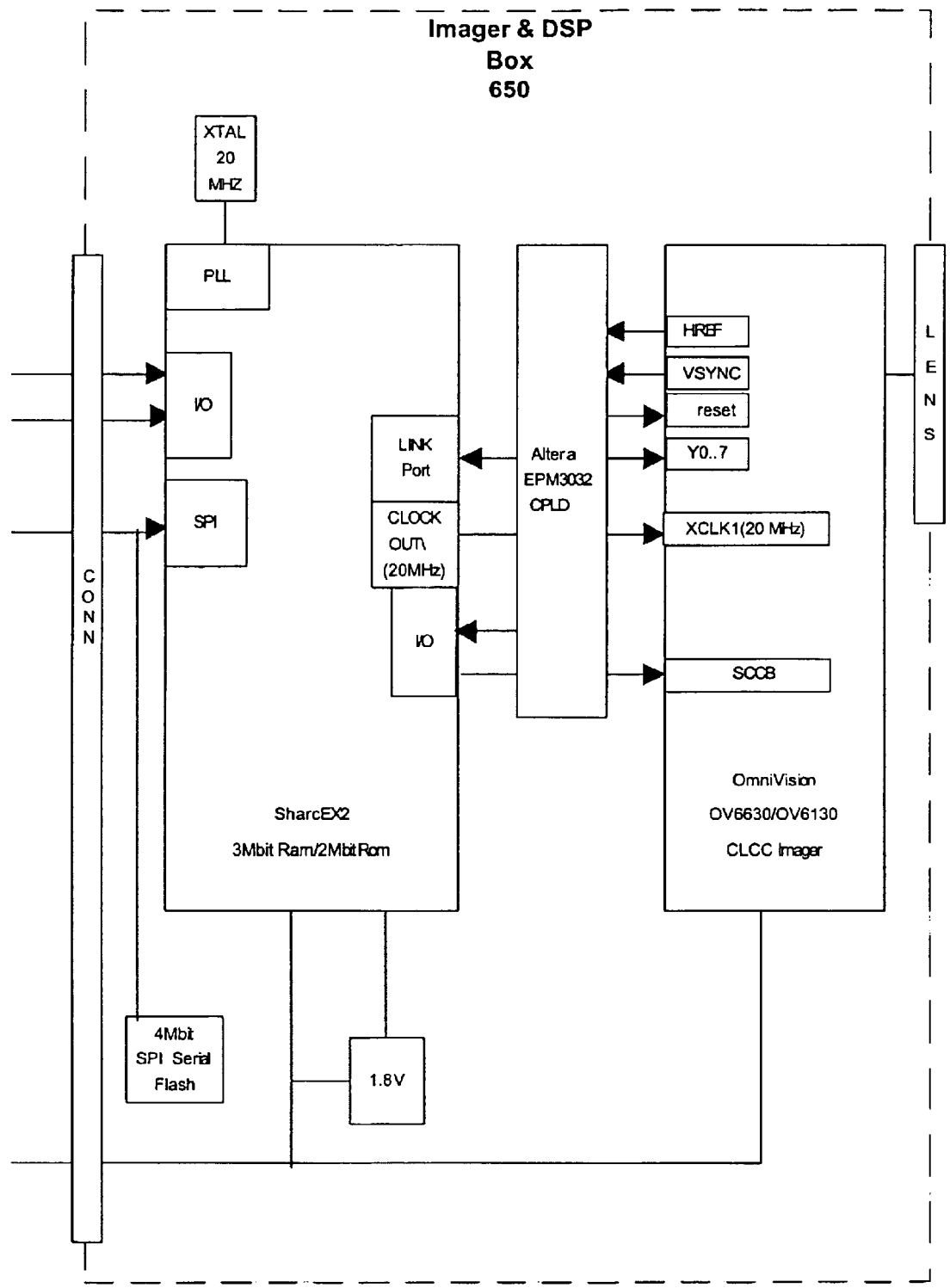
FIG. 32b is a detailed component diagram illustrating an example of an imager/DSP box.

FIG. 32b is a detailed component diagram illustrating an example of an imager/DSP box 650. As disclosed in the Figure, the imager is supported by a local memory unit, providing for distributed processing with the enhancement device 112. Certain functionality, such as segmentation, is performed using the local memory unity within the imager/DSP box 650.

3. Component Examples

Figure 33:
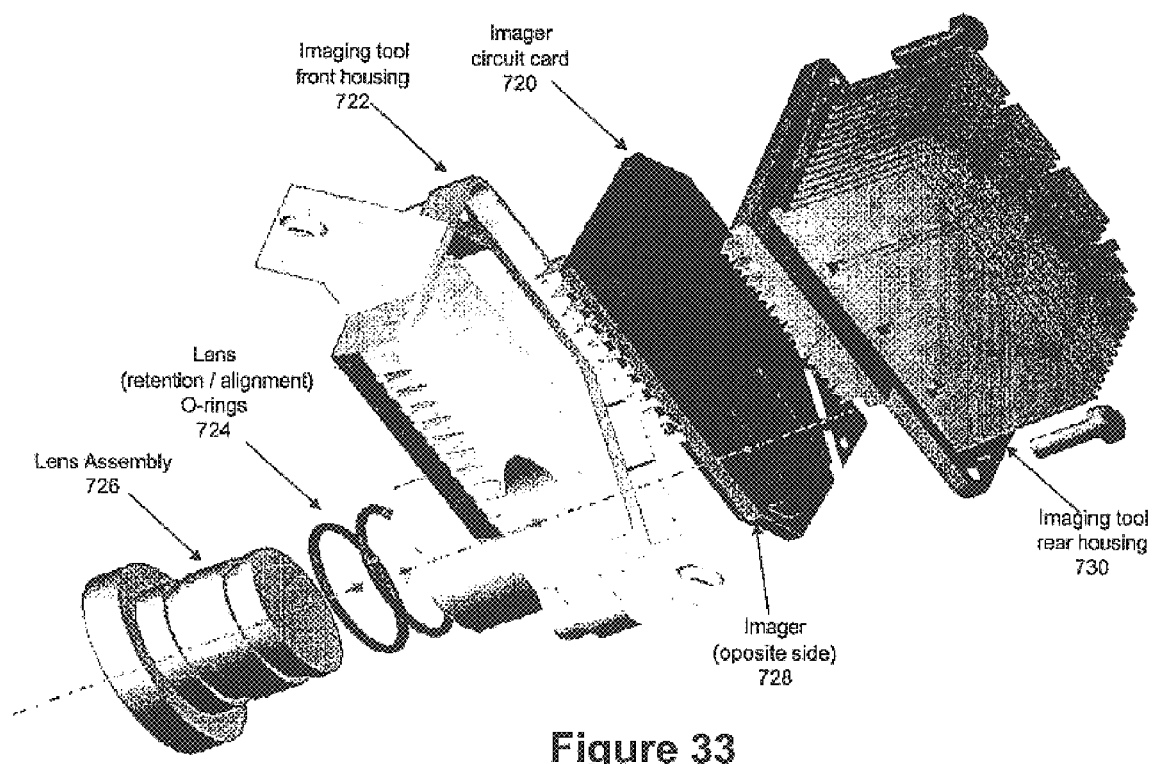
FIG. 33 is a subcomponent diagram illustrating an example of an imaging tool.

FIG. 33 show an example of an imaging tool that includes a tab that can be manipulated in order to configure the imaging tool while it is assembled. In a manipulatable tab embodiment of the imaging tool, the imaging tool and its housing components 730 and 722 can be permanently attached before the imaging tool is configured for use by the system 100.

The example in FIG. 33 includes two housing components 722 and 730 and an imager circuit card 720 that includes tabs for configuring the imaging tool while it is assembled and installed. Parts of the imaging tool can be focused and aligned by the movement of "tabs" that are accessible from outside the imaging tool. The tabs can resemble various linear adjustment mechanisms in other devices.

On the left side of the diagram is a lens assembly 726 that includes the various lenses incorporated into the imaging tool. The number and size of lenses can vary widely from embodiment to embodiment. A lens o-ring 724 is used to secure the position and alignment of the lens assembly 726. Some embodiments may not involve the use of o-rings 724, while other embodiments may incorporate multiple o-rings 724. A front housing component 164 and a rear housing component 166 are ultimately fastened together to keep the imaging tool in a fully aligned and focused position. In between the two housing components is an imager circuit board 720 with the imager 728 on the other side, hidden from view.

Figure 34:
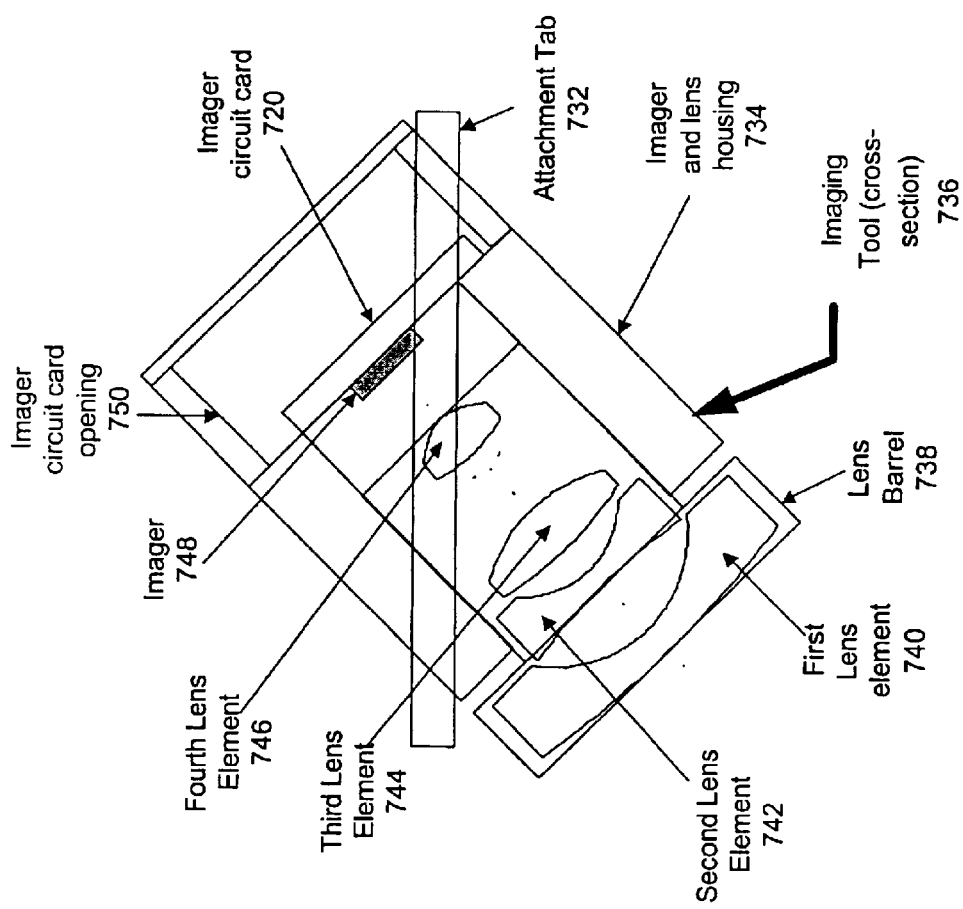
FIG. 34 is a subcomponent diagram illustrating an example of an imaging tool.

FIG. 34 shows a cross-section of the imaging tool 736. A lens barrel 738 holds in place a first lens element 740 that is followed by a second lens element 742, a third lens element 744, and a fourth lens element 746. The number, type, and variety of lens elements will depend on the particular application that is to incorporate the particular imaging tool 736. The imager 748 resides on an imager circuit card 720 or circuit board. An imager circuit card opening 750 provides for the initial installation and alignment of the imager circuit board 720 in the imaging tool 736.

Figure 35:
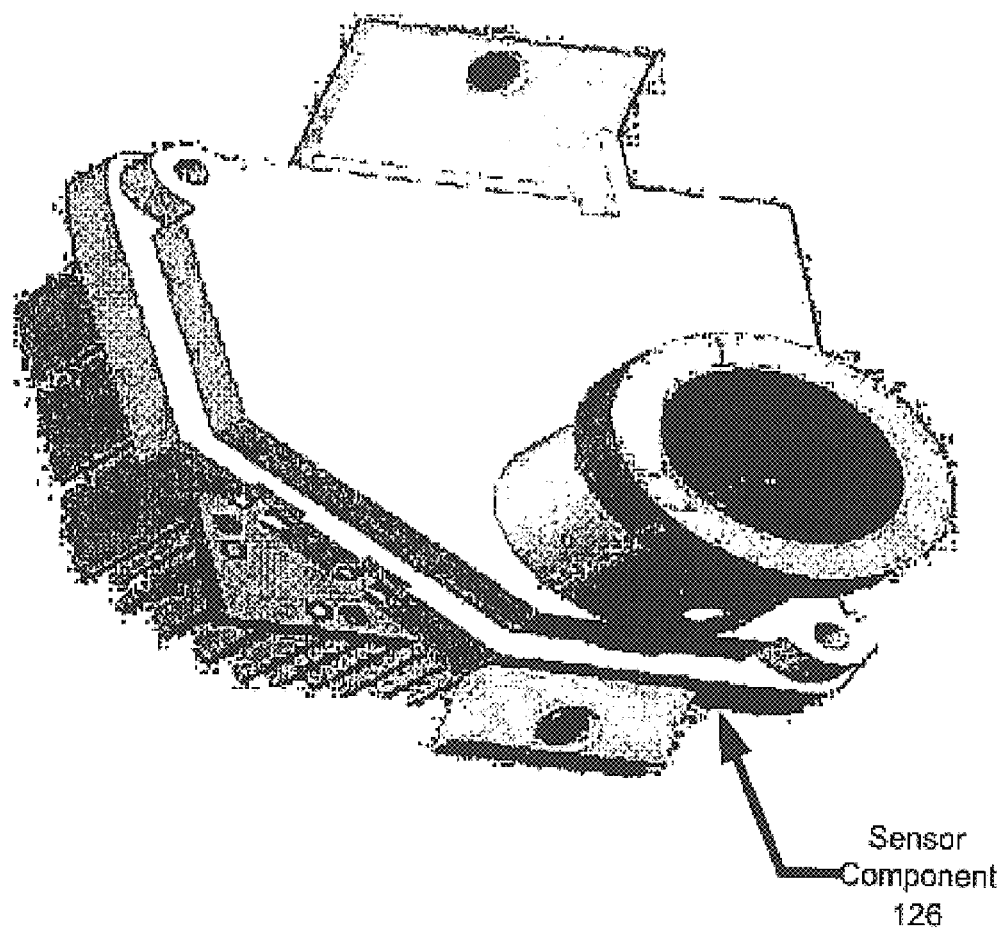
FIG. 35 is diagram illustrating an example of a fully assembled sensor component.

FIG. 35 shows a component diagram illustrating a fully assembled view of the imaging tool 736 of FIGS. 33 and 34. The imaging tool 736 is part of the sensor component 126 discussed above.

Figure 36:
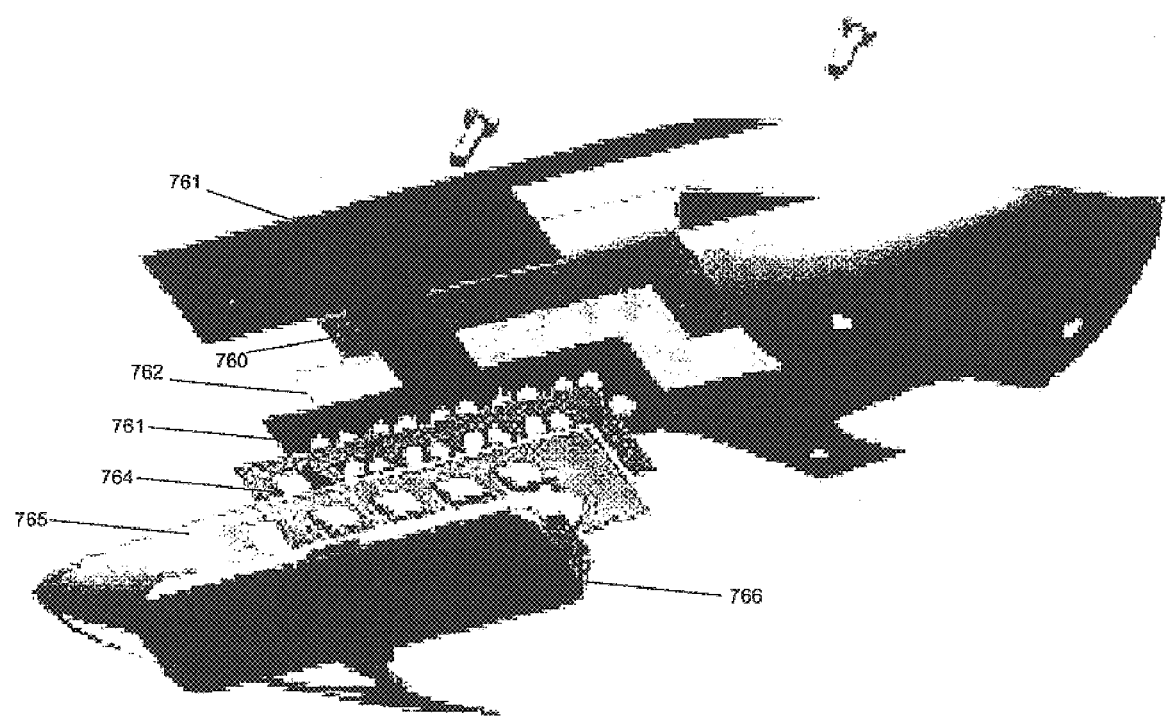
FIG. 36 is subcomponent diagram illustrating an example of the different subcomponents that can make up the illuminator.

FIG. 36 is subcomponent diagram illustrating an example of an illuminator component 128. A conformingly shaped heat spreader 760 is used to spread the head from the drive circuitry. In a preferred embodiment, the head spreader 760 should be colored in such a way as to blend into the shape and color of the overhead console.

A power circuit board (PCB) 761 that actually holds the LED's (light emitting diodes) is also shown in the Figure. In a preferred embodiment, the PCB 761 is in an "H" shape that includes a flexible material in the middle of the "H" so that one side can be bent over the other.

A heat conducting bond ply tape 762 is used to attach the PCB 761 with the heat spreader 760. A separate piece of heat conducting bond ply type 764 is used to connect an illuminator heat spreader 765 (which serves just the LED's in contrast to the heat spreader 760 for the drive circuitry) to the LED's on the PCB 761. A surface 766 underneath the illuminator is what is visible to the occupant 106. The surface 766 is preferably configured to blend into the internal environment of the vehicle 102.

Figure 37:
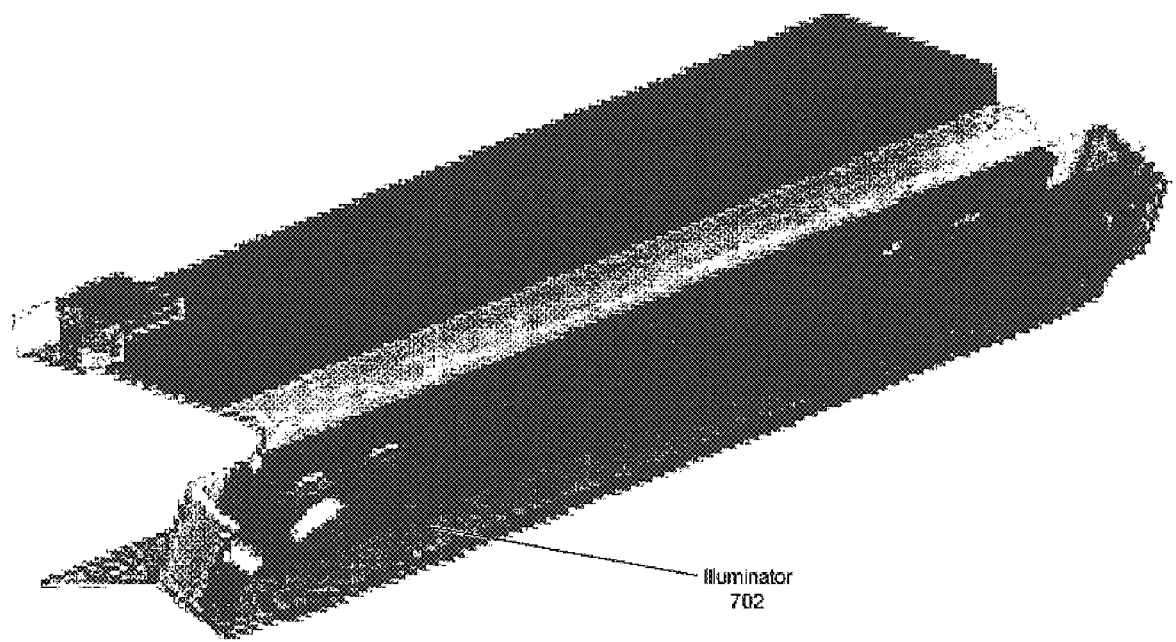
FIG. 37 is a diagram illustrating an example of an illuminator.
Figure 38:
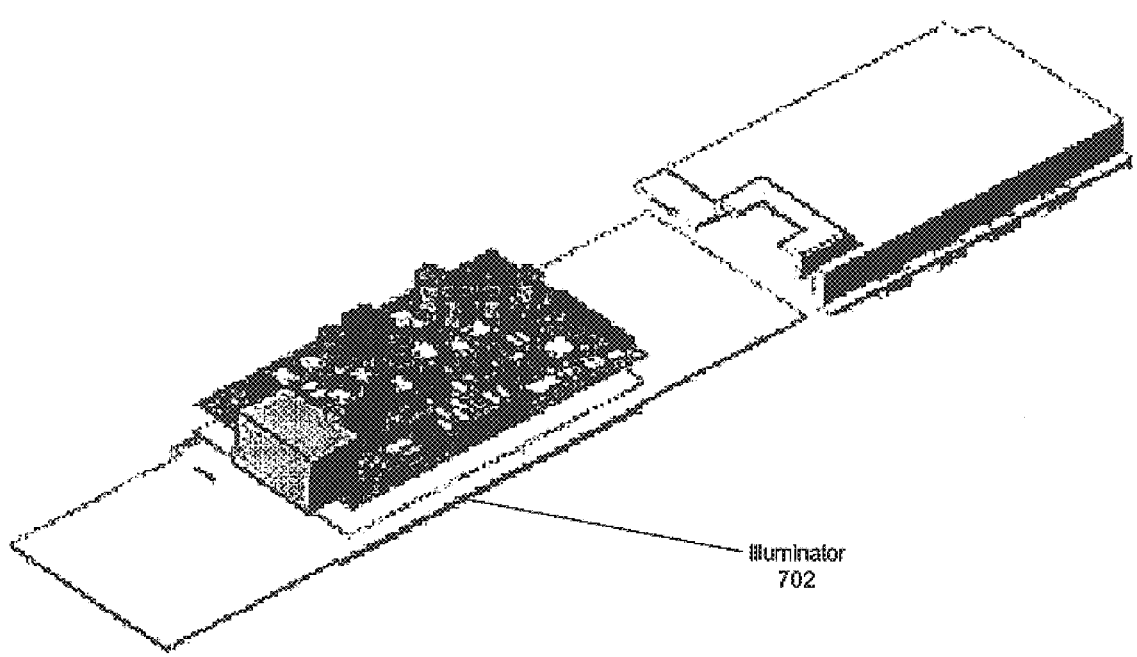
FIG. 38 is a diagram illustrating an example of an illuminator.
Figure 39:
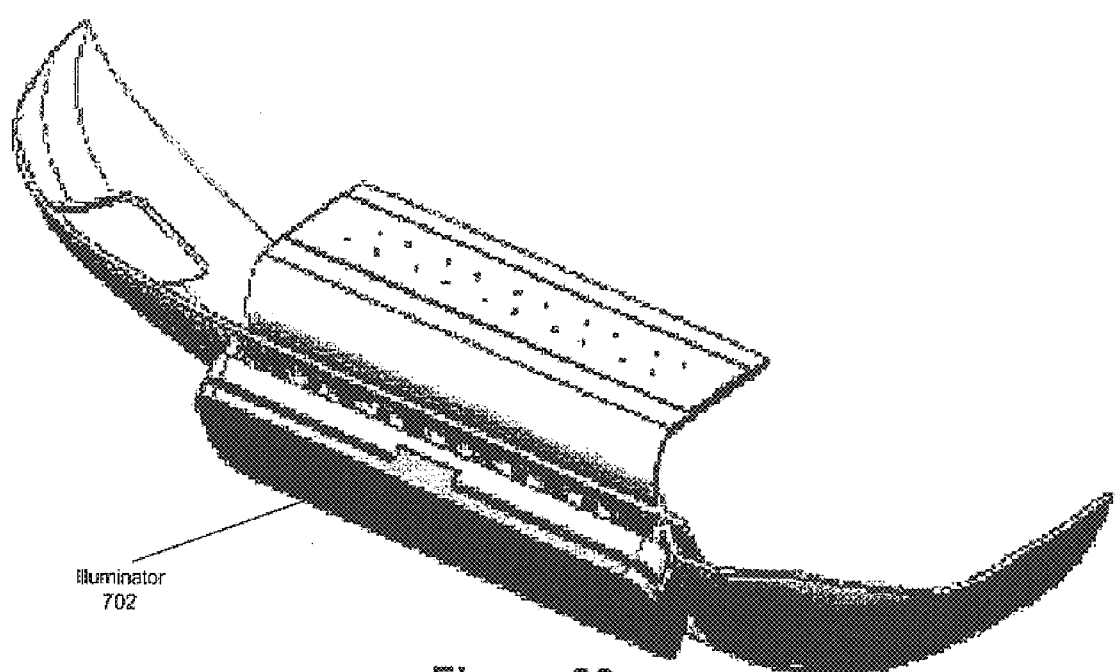
FIG. 39 is a diagram illustrating an example of an illuminator.

FIGS. 37, 38, and 39 are diagrams illustrating different views of the illuminator 702.

D. Implementation of Hardware Configuration Process

Figure 40:
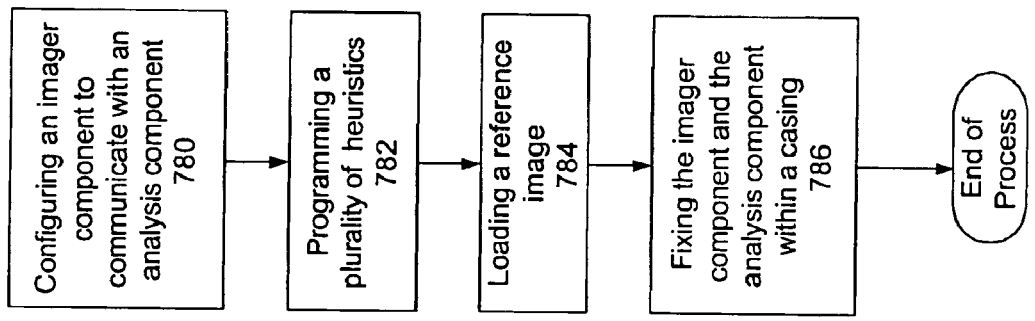
FIG. 40 is flow chart diagram illustrating an example of a hardware configuration process that can be used to implement a decision enhancement system.

FIG. 40 is flow chart diagram illustrating an example of a hardware configuration process that can be used to implement a decision enhancement system.

At 780, the imager is configured to communicate with one or more analysis components 124.

At 782, the various image processing heuristics, including the tracking and predicting heuristics, the disablement heuristics, the deployment heuristics, and the segmentation heuristics.

At 784, a reference image is loaded onto the system 100. In some embodiments, this is stored on the local memory unit connected to the imager to facilitate quick processing.

At 786, the imager and analysis components are fixed within one or more casings that can then be installed into a vehicle.

V. Alternative Embodiments

While the invention has been specifically described in connection with certain specific embodiments thereof, it is to be understood that this is by way of illustration and not of limitation, and the scope of the appended claims should be construed as broadly as the prior art will permit. For example, the system 100 is not limited to particular types of vehicles 102, or particular types of automated applications.

What is claimed is:

1. A decision enhancement system configured to influence a deployment determination of a safety restraint application for a vehicle by communicating an at-risk-zone determination to the safety restraint application, said decision enhancement system comprising:
   a sensor subsystem, said sensor subsystem providing for a sensor to capture a plurality of sensor readings, said plurality of sensor readings including a first sensor reading and a second sensor reading;
   a tracking subsystem, wherein said tracking subsystem provides for selectively identifying a tracked condition from a plurality of pre-defined conditions, said plurality of pre-defined conditions including a crash condition, wherein said tracked condition is selectively identified using said first sensor reading; and
   a detection subsystem, wherein said detection subsystem is invoked only after said tracking subsystem selectively identifies said crash condition as said tracked condition, wherein said detection subsystem generates said at-risk-zone determination, from said second sensor reading, and wherein said second sensor reading is not captured earlier than said first sensor reading.

2. The system of claim 1, wherein said second sensor reading is not said first sensor reading, and wherein said second sensor reading is captured after said first sensor reading.

3. The system of claim 1, wherein the sensor includes a high-speed mode and a low-speed mode, wherein said sensor is configured to operate in said low-speed mode before said tracking subsystem selectively identifies said crash condition as said tracked condition, and wherein said sensor is configured to operate in said high-speed mode after said tracking subsystem selectively identifies said crash condition as said tracked condition.

4. The system of claim 3, a subset of said plurality of sensor images being a plurality of filtered sensor images, said plurality of filtered sensor images including said second sensor image, and wherein said sensor readings captured by said sensor in said high-speed mode are said plurality of filtered sensor images.

5. The system of claim 4, wherein at least two or more of said plurality of sensor images are used to selectively identify said tracked condition, and wherein at least two or more of said plurality of filtered sensor images are used to generate said at-risk-zone determination.

6. The system of claim 3, wherein said sensor in said high-speed mode captures between about 25 and 40 sensor readings per second, and wherein said sensor in said low-speed mode captures fewer sensor readings per second than said sensor in said high-speed mode.

7. The system of claim 6, wherein said sensor in said low-speed mode captures fewer than about 11 sensor readings per second.

8. The system of claim 3, further comprising a pre-defined detection window, and wherein said plurality of filtered sensor images are filtered in accordance with said pre-defined detection window.

9. The system of claim 1, further comprising a zone intrusion and a window-of-interest, wherein said detection subsystem generates said at-risk-zone determination by identifying said zone intrusion with said second sensor reading, wherein said at-risk-zone determination is generated from the portion of said second sensor reading that is within said window-of-interest.

10. The system of claim 9, wherein said window-of-interest is divided into a plurality of patches.

11. The system of claim 10, further comprising a reference image and a correlation metric, wherein said correlation heuristic is performed on said plurality of patches and said reference image to generate a correlation metric.

12. The system of claim 11, wherein said at-risk-zone determination is generated with said correlation metric.

13. The system of claim 1, said detection subsystem further including a detection window module, a correlation module, and a window-of-interest;
   wherein said detection window module generates said window-of-interest with said second sensor reading, and wherein said correlation module generates a correlation metric from said window-of-interest and a reference image, wherein said detection subsystem generates said at-risk-determination using said correlation metric.

14. The system of claim 13, said detection subsystem further including a test threshold, wherein said detection subsystem generates said at-risk-determination by comparing said correlation metric with said test threshold.

15. The system of claim 1, wherein said sensor is a standard video camera, wherein said tracking subsystem selectively identifies said tracked condition by invoking a multiple-model probability-weighted heuristic, and wherein said safety restraint is an airbag.

16. The system of claim 1, further comprising a future prediction wherein said at-risk-determination is said future prediction.

17. The system of claim 1, said plurality of pre-defined conditions including a stationary condition and human motion condition.

18. The system of claim 1, further comprising a pre-crash braking condition, wherein said crash condition is said pre-crash braking condition.

19. The system of claim 1, said sensor subsystem including an infrared illuminator for providing light in low illumination environments.

20. The system of claim 1, further comprising a power supply for providing a duration of keep-alive power.

21. The system of claim 1, wherein said detection subsystem provides for:
   filtering at least one sensor reading with a pre-defined window of interest;
   setting said sensor to a higher speed;
   dividing at least one of the filtered sensor readings into a plurality of patches;
   defining a correlation metric between said plurality of patches and a reference image; and
   comparing the correlation metric with a test threshold to generate said at-risk-determination.

22. A safety restraint system for a vehicle, comprising:
   a sensor, a plurality of sequential sensor images, a spatial area, a computer, a plurality of occupant attributes, a current condition, a plurality of pre-defined conditions, a deployment condition, a non-deployment condition, a detection heuristic, an at-risk-zone flag value, a safety restraint deployment mechanism;
   wherein said sensor is configured to capture said plurality of sequential sensor images of said spatial area;

wherein said computer provides for:
 tracking said plurality of occupant attributes from said plurality of sequential images;
 selectively identifying said current condition from said plurality of pre-defined occupant conditions, wherein said plurality of pre-defined conditions includes said deployment condition and said non-deployment condition;
 invoking said detection heuristic after selectively identifying said deployment condition as said occupant condition;
 using said detection heuristic to set said at-risk-zone flag value;
 communicating said at-risk-zone flag value to said safety restraint deployment mechanism;
wherein said safety restraint deployment mechanism selectively precludes the deployment of said safety restraint when said occupant condition is said deployment condition, and when said at-risk-zone flag value is yes.

23. The system of claim 22, further comprising a video camera, a maximum shutter speed of about 50 images per second, a vehicle, a multiple-model probability-weighted tracking heuristic, and an airbag;
 said sensor being said video camera with said maximum shutter speed of about 50 images per second, said vehicle being said automobile, said multiple-model probability-weighted tracking heuristic being invoked to selectively identifying said current condition, said safety restraint being said airbag, wherein said safety restraint system has only one said sensor.

24. A method for installing a decision enhancement application into a vehicle that includes a deployment mechanism for a safety restraint device, the method comprising:
 defining an at-risk-zone corresponding to a location of the deployment mechanism within the vehicle;
 configuring a sensor to transmit sensor images to a computer;
 instructing the computer to filter out all areas within the image that are not part of a window-of-interest corresponding to the defined at-risk-zone after receiving a preliminary determination that a deployment of the safety restraint device is necessary;
 programming the computer to set an at-risk-zone flag corresponding to a detection of an occupant within the at-risk-zone, wherein the at-risk-zone flag is set using at least one window-of-interest image filtered by the computer; and
 placing the sensor and computer within the vehicle.

25. The method of claim 24, further comprising adapting the adapting the sensor to function in a low-speed mode to generate the preliminary determination and a high-speed mode to set the at-risk-zone flag.

26. The method of claim 24, wherein only one sensor is used to generate the preliminary determination and set the at-risk-zone flag.

27. The method of claim 24, further comprising loading a occupant tracking heuristic into said computer to generate said preliminary determination.

28. The method of claim 24, wherein setting an at-risk-zone flag includes:
 dividing at least one of the window-of-interest images into a plurality of patches;
 invoking a correlation heuristic to generate a correlation metric relating to the patches and a template image; and
 comparing the correlation metric to a predetermined test threshold to set the at-risk-flag.

* * * * *